(12) United States Patent
Ikuta

(10) Patent No.: US 10,936,187 B2
(45) Date of Patent: Mar. 2, 2021

(54) ELECTRONIC ALBUM APPARATUS, AND OPERATION METHOD AND OPERATION PROGRAM FOR THE SAME

(71) Applicant: FUJIFILM Corporation, Tokyo (JP)

(72) Inventor: Mayuko Ikuta, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/986,547

(22) Filed: Aug. 6, 2020

(65) Prior Publication Data

US 2020/0363947 A1 Nov. 19, 2020

Related U.S. Application Data

(63) Continuation of application No. PCT/JP2019/001485, filed on Jan. 18, 2019.

(30) Foreign Application Priority Data

Feb. 8, 2018 (JP) .............................. JP2018-020906

(51) Int. Cl.
*G06F 3/0488* (2013.01)
*G06F 3/0486* (2013.01)
*G06T 11/60* (2006.01)

(52) U.S. Cl.
CPC ........ *G06F 3/04883* (2013.01); *G06F 3/0486* (2013.01); *G06T 11/60* (2013.01)

(58) Field of Classification Search
CPC ..... G06F 3/04883; G06F 3/0486; G06T 11/60
See application file for complete search history.

(56) References Cited

U.S. PATENT DOCUMENTS

| 8,595,653 | B2 * | 11/2013 | Glaser-Seidnitzer ....................... G16H 40/63 715/862 |
| 2007/0209025 | A1 * | 9/2007 | Jing .................... G06F 16/9038 |
| 2008/0165390 | A1 * | 7/2008 | Kim ..................... H04N 1/3875 358/451 |
| 2020/0366798 | A1 * | 11/2020 | Ikuta ...................... G06T 11/60 |

FOREIGN PATENT DOCUMENTS

| JP | 2005-141584 A | 6/2005 |
| JP | 2007-124304 A | 5/2007 |
| JP | 2013-092974 A | 5/2013 |
| JP | 2017-117479 A | 6/2017 |

OTHER PUBLICATIONS

International Search Report issued in PCT/JP2019/001485; dated Feb. 19, 2019.
Written Opinion issued in PCT/JP2019/001485; dated Feb. 19, 2019.

* cited by examiner

*Primary Examiner* — Shen Shiau
(74) *Attorney, Agent, or Firm* — Studebaker & Brackett PC

(57) ABSTRACT

An inquiring unit displays, before execution of a deletion process of deleting a to-be-deleted image IMP from an album page, a to-be-deleted image list for inquiring whether or not to execute a deletion process on the to-be-deleted image IMP on an album screen. A user selects an image display cell CE of a to-be-deleted image IMP to be kept in the album page and selects a keep button. Accordingly, the to-be-deleted image IMP whose image display cell CE has been selected is kept in the album page. This is user-friendly compared with a case were a to-be-deleted image IMP is deleted without any notice to the user.

12 Claims, 36 Drawing Sheets

FIG. 4
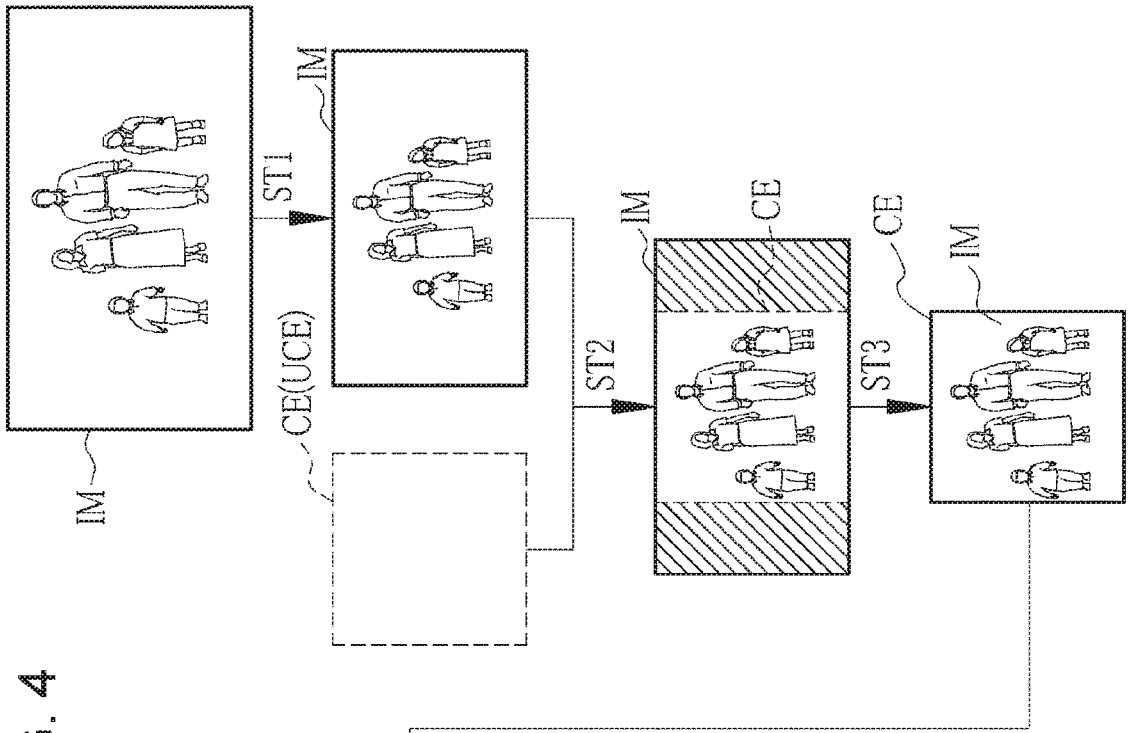
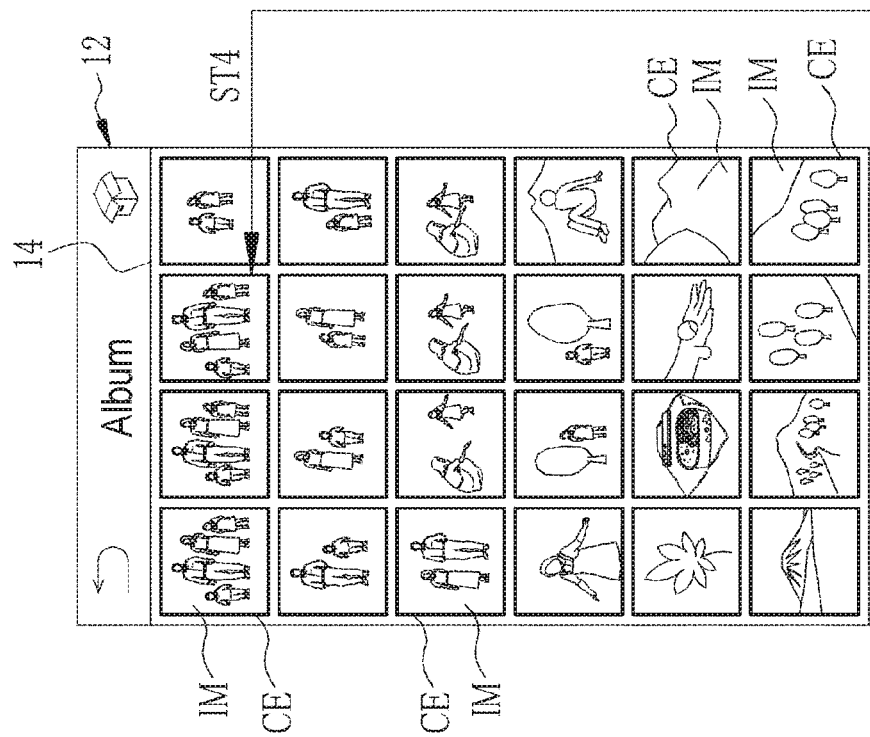

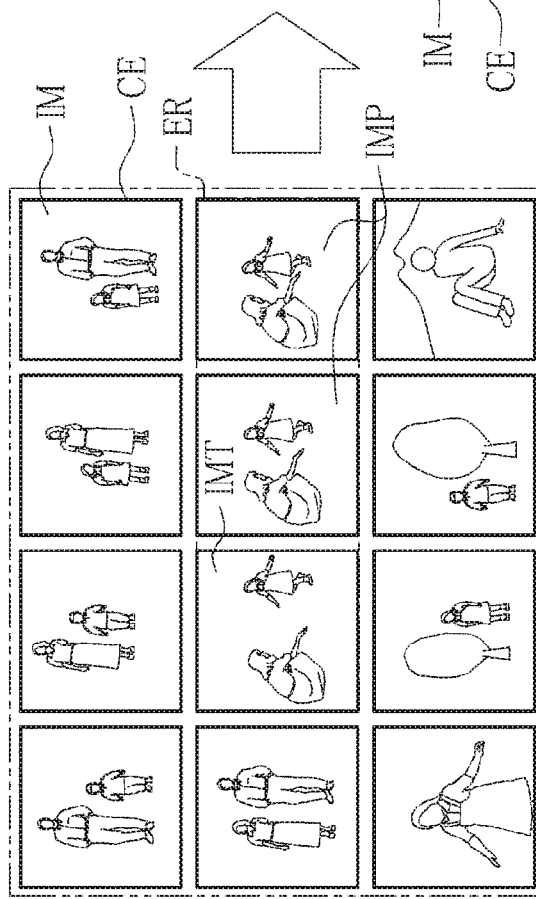
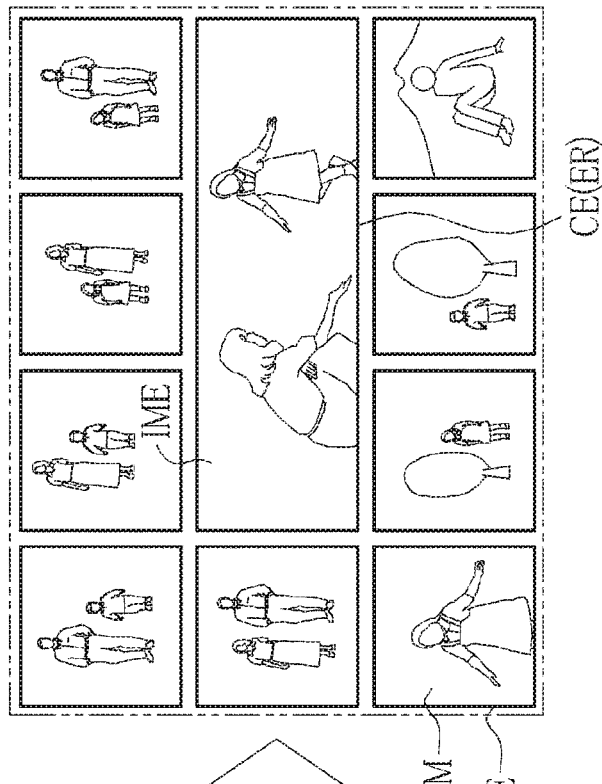
FIG. 8A
FIG. 8B

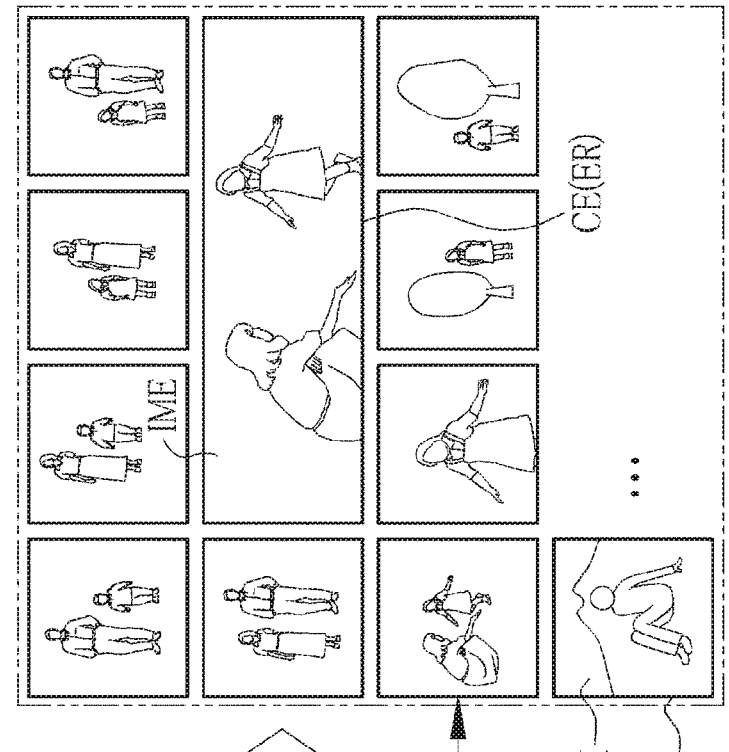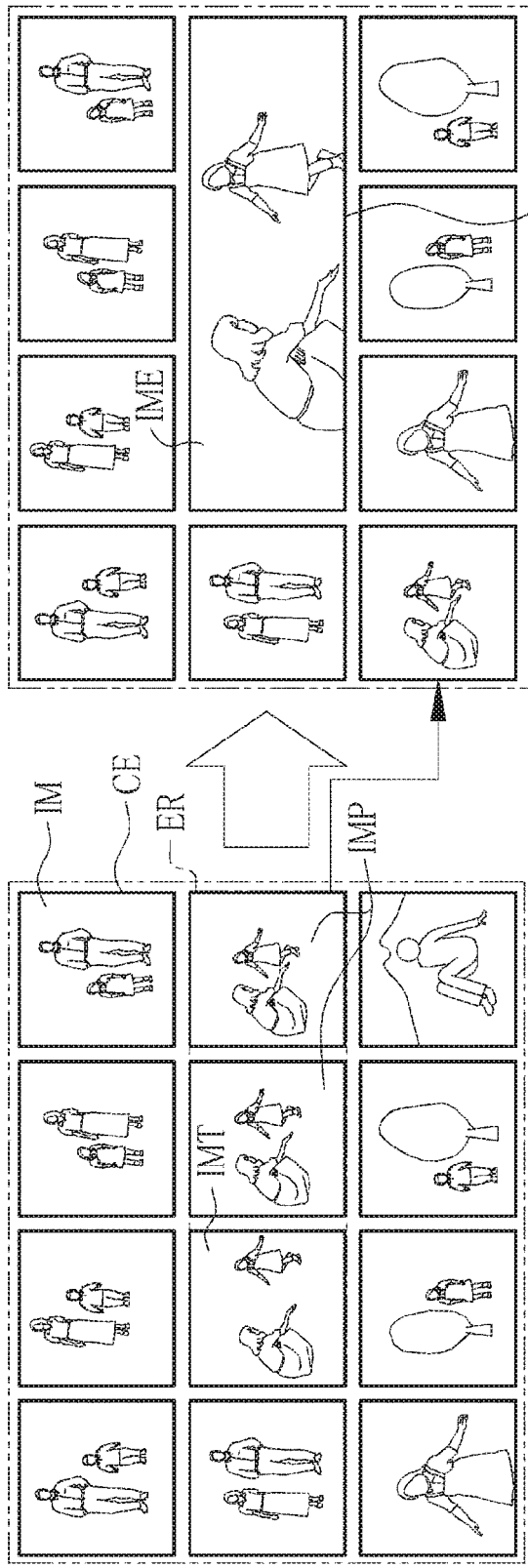

FIG. 14

| IMAGES DISPLAYED ON ALBUM PAGE ~31 | |
|---|---|
| IMAGE ID | LAYOUT INFORMATION (ADDRESS INFORMATION) OR THE LIKE |
| IM001 | CE11 ··· |
| IM002 | CE12 ··· |
| IM003 | CE13 ··· |
| IM009 | CE31 ··· |
| IM010 | CE32,CE33,CE34 ··· |
| IM012 | CE41 ··· |
| IM013 | CE42 ··· |
| DELETED IMAGES | |
| IM011 | DCE11 ··· |
| IM050 | DCE12 ··· |

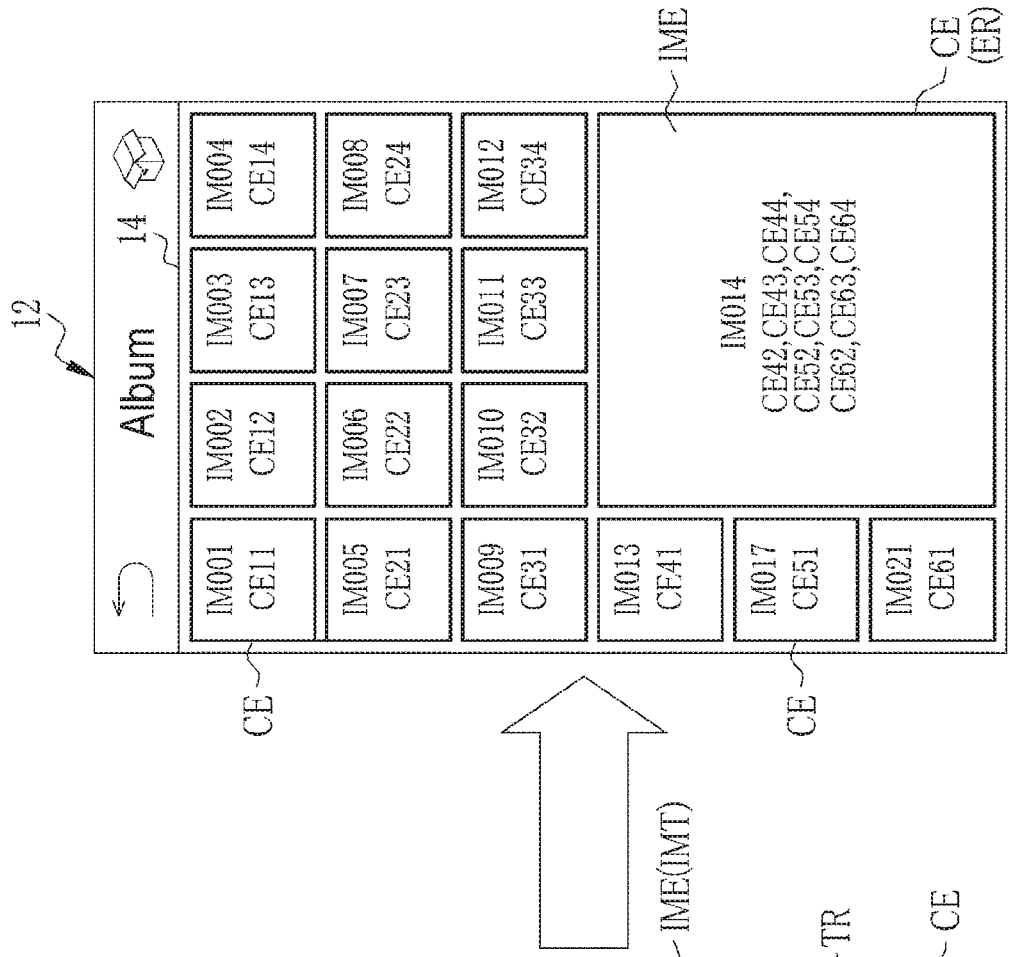
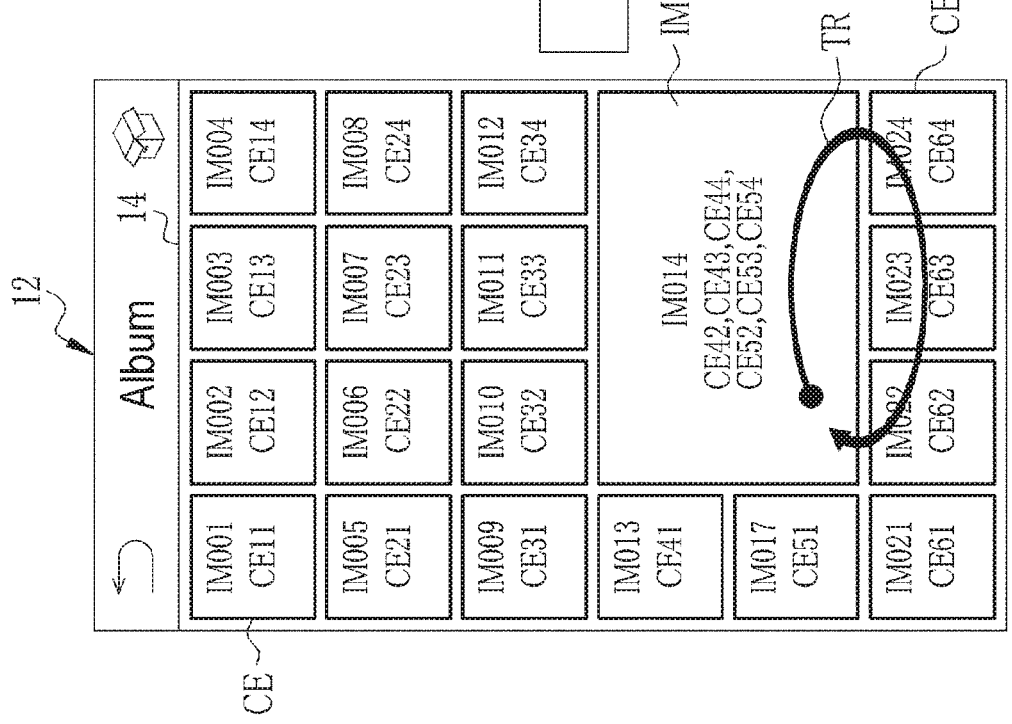

| IMAGE ID | FIRST EVALUATION VALUE |
|---|---|
| IM050 | 9.8 |
| IM051 | 4.0 |
| IM052 | 6.8 |
| IM053 | 8.9 |
| IM054 | 7.1 |
| IM055 | 3.2 |
| IM056 | 1.9 |
| IM057 | 2.2 |

73

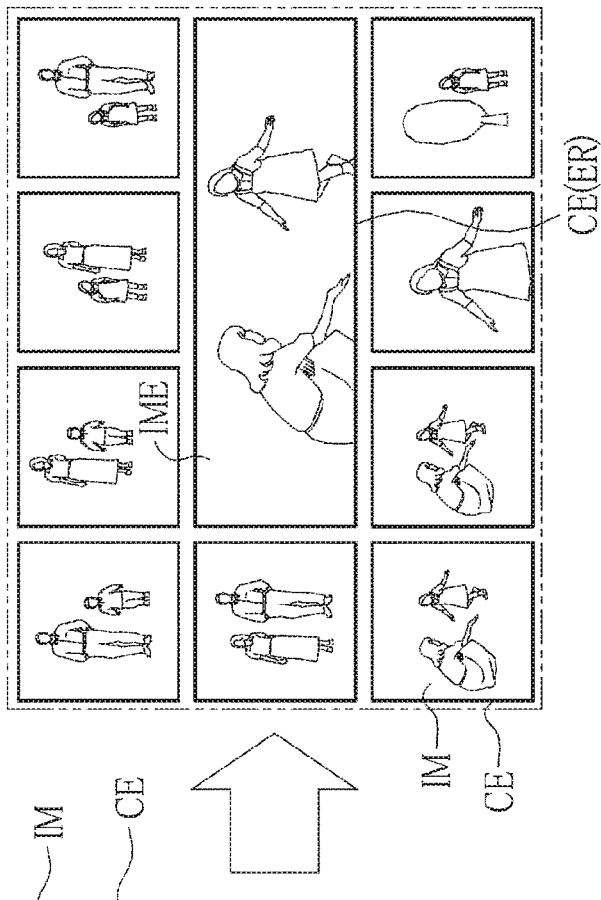
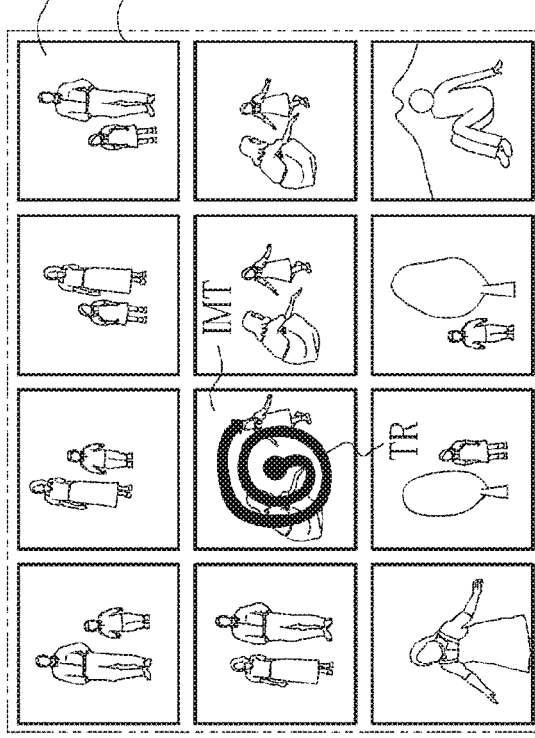
FIG. 38B
FIG. 38A

ELECTRONIC ALBUM APPARATUS, AND OPERATION METHOD AND OPERATION PROGRAM FOR THE SAME

CROSS-REFERENCE TO RELATED APPLICATIONS

This application is a Continuation of PCT International Application No. PCT/JP2019/001485 filed on 18 Jan. 2019, which claims priority under 35 U.S.0 § 119(a) to Japanese Patent Application No. 2018-020906 filed on 8 Feb. 2018. The above application is hereby expressly incorporated by reference, in its entirety, into the present application.

BACKGROUND OF THE INVENTION

1. Field of the Invention

The present invention relates to an electronic album apparatus, and an operation method and operation program for the same.

2. Description of the Related Art

There are widespread electronic album apparatuses that generate an album screen to be displayed on a touch panel display (hereinafter abbreviated as a touch panel) and including an album page in which a plurality of images are arranged in accordance with preferences of a user (see JP2017-117479A). In JP2017-117479A, paragraph [0264] of the specification and FIG. 21 describe that, in response to an enlargement instruction from a user, an image for which the enlargement instruction has been provided (hereinafter referred to as an enlargement target image) is displayed in an enlarged view within an album page.

SUMMARY OF THE INVENTION

A series of images consecutively captured at the same shooting location during consecutive shooting or the like have similar content. In a case where one of the series of images is an enlargement target image, it is preferable that the other images having similar content be deleted from an album page for visual simplicity.

Accordingly, the inventor has considered an electronic album apparatus that deletes from an album page an image overlapping an enlargement region, which is a region of the enlargement target image that has been enlarged. In this case, however, if the image is deleted without any notice to a user who has provided an enlargement instruction only intending to display the image in an enlarged view, the user may be troubled.

An object of the present invention is to provide a user-friendly electronic album apparatus, and an operation method and operation program for the same.

To achieve the above object, an electronic album apparatus according to the present invention includes: a screen generating unit that generates an album screen to be displayed on a touch panel display, the album screen including an album page in which a plurality of images are arranged; an instruction receiving unit that receives a gesture instruction to the touch panel display, the instruction receiving unit receiving, as the gesture instruction, an enlargement instruction to display an image among the plurality of images in an enlarged view within the album page; a recognizing unit that recognizes an enlargement target image which is the image for which the enlargement instruction has been provided; an album editing unit that executes an album editing process including an enlargement process of enlarging the enlargement target image recognized by the recognizing unit and a deletion process of deleting one or more images among the plurality of images from the album page, the one or more images being different from the enlargement target image and overlapping an enlargement region which is a region of the enlargement target image that has been enlarged; and an inquiring unit that inquires, before execution of the deletion process, whether or not to execute the deletion process on the one or more images which overlap the enlargement region and which are to be deleted from the album page, the one or more images being one or more to-be-deleted images.

Preferably, the inquiring unit displays a list of the one or more to-be-deleted images on the album screen and receives, through the list, a first selection instruction to select, from among the one or more to-be-deleted images, an image to be kept in the album page without executing the deletion process, or a second selection instruction to select, from among the one or more to-be-deleted images, an image to be deleted from the album page by executing the deletion process.

Preferably, the electronic album apparatus further includes an obtaining unit that obtains, for each to-be-deleted image, a first evaluation value indicating whether to execute the deletion process on the to-be-deleted image or a second evaluation value indicating whether to keep the to-be-deleted image in the album page without executing the deletion process, and the inquiring unit displays, on the list, the to-be-deleted image in a display format corresponding to the first evaluation value or the second evaluation value.

Preferably, the inquiring unit displays, on the list, only the to-be-deleted image whose first evaluation value is within a preset first range or only the to-be-deleted image whose second evaluation value is within a preset second range.

Preferably, the inquiring unit displays, on the list, the to-be-deleted image in a display format in which a magnitude of the first evaluation value or the second evaluation value is identifiable.

Preferably, the inquiring unit displays, on the list, all the one or more to-be-deleted images in a display format in which magnitudes of the first evaluation values or the second evaluation values are identifiable.

Preferably, the first evaluation value or the second evaluation value is derived on the basis of at least any one of an image quality of the to-be-deleted image, a photographic subject of the to-be-deleted image, a shooting date and time of the to-be-deleted image, or a shooting location of the to-be-deleted image.

Preferably, the screen generating unit generates the album page in which image display cells are arranged in a grid pattern on the basis of a unit cell whose size is defined in advance, the image display cells displaying the plurality of images, each image display cell having a size that is changed to a positive integral multiple of the unit cell.

Preferably, the enlargement region is a region having a size that is a positive integral multiple of the unit cell.

Preferably, the instruction receiving unit receives, as the enlargement instruction, a swipe instruction of moving one finger along the enlargement region within the album page starting from the enlargement target image.

An operation method for an electronic album apparatus according to the present invention includes: a screen generation step of generating an album screen to be displayed on a touch panel display, the album screen including an album page in which a plurality of images are arranged; an instruction reception step of receiving a gesture instruction to the touch panel display, the instruction reception step receiving, as the gesture instruction, an enlargement instruction to display an image among the plurality of images in an enlarged view within the album page; a recognition step of recognizing an enlargement target image which is the image for which the enlargement instruction has been provided; an album editing step of executing an album editing process including an enlargement process of enlarging the enlargement target image recognized in the recognition step and a deletion process of deleting one or more images among the plurality of images from the album page, the one or more images being different from the enlargement target image and overlapping an enlargement region which is a region of the enlargement target image that has been enlarged; and an inquiry step of inquiring, before execution of the deletion process, whether or not to execute the deletion process on the one or more images which overlap the enlargement region and which are to be deleted from the album page, the one or more images being one or more to-be-deleted images.

An operation program for an electronic album apparatus according to the present invention causes a computer to execute: a screen generation function of generating an album screen to be displayed on a touch panel display, the album screen including an album page in which a plurality of images are arranged; an instruction reception function of receiving a gesture instruction to the touch panel display, the instruction reception function receiving, as the gesture instruction, an enlargement instruction to display an image among the plurality of images in an enlarged view within the album page; a recognition function of recognizing an enlargement target image which is the image for which the enlargement instruction has been provided; an album editing function of executing an album editing process including an enlargement process of enlarging the enlargement target image recognized by the recognition function and a deletion process of deleting one or more images among the plurality of images from the album page, the one or more images being different from the enlargement target image and overlapping an enlargement region which is a region of the enlargement target image that has been enlarged; and an inquiry function of inquiring, before execution of the deletion process, whether or not to execute the deletion process on the one or more images which overlap the enlargement region and which are to be deleted from the album page, the one or more images being one or more to-be-deleted images.

The present invention is capable of providing a user-friendly electronic album apparatus, and an operation method and operation program for the same, because whether or not to execute a deletion process is inquired before execution of the deletion process of deleting from an album page a to-be-deleted image overlapping an enlargement region of an enlargement target image.

BRIEF DESCRIPTION OF THE DRAWINGS

FIG. 4 is an explanatory diagram of a process of arranging images in an album page;

FIGS. 6A and 6B are diagrams illustrating a state where the trimming position of an image is adjusted, in which FIG. 6A illustrates a state before adjustment and FIG. 6B illustrates a state after adjustment;

FIGS. 8A and 8B are diagrams of a part of the album page, in which FIG. 8A illustrates a state before an enlargement process and FIG. 8B illustrates a state after the enlargement process;

FIGS. 11A and 11B are diagrams of a part of the album page, in which FIG. 11A illustrates a state before an enlargement process and FIG. 11B illustrates a state after the enlargement process;

FIG. 14 is a diagram illustrating album management information;

FIGS. 16A and 16B are diagrams illustrating an example in which unit cells are combined in a column direction to perform enlarged display in response to an enlargement instruction of linearly moving a finger in the column direction, in which FIG. 16A illustrates a state before an enlargement process and FIG. 16B illustrates a state after the enlargement process;

FIGS. 17A and 17B are diagrams illustrating an example in which unit cells are combined over a plurality of rows and a plurality of columns to perform enlarged display in response to an enlargement instruction of moving a finger over the plurality of rows and the plurality of columns, in which FIG. 17A illustrates a state before an enlargement process and FIG. 17B illustrates a state after the enlargement process;

FIGS. 18A and 18B are diagrams illustrating an example in which an enlargement instruction and enlarged display are performed a plurality of times within the album page, in which FIG. 18A illustrates a state before an enlargement process and FIG. 18B illustrates a state after the enlargement process;

FIGS. 19A and 19B are diagrams illustrating an example in which an enlarged image is designated as an enlargement target image, in which FIG. 19A illustrates a state before an enlargement process and FIG. 19B illustrates a state after the enlargement process;

FIGS. 20A and 20B are diagrams illustrating an example in which a finger is moved along image display cells to draw a loop, in which FIG. 20A illustrates a state before an enlargement process and FIG. 20B illustrates a state after the enlargement process;

FIGS. 21A and 21B are diagrams illustrating another example in which a finger is moved along image display cells to draw a loop, in which FIG. 21A illustrates a state before an enlargement process and FIG. 21B illustrates a state after the enlargement process;

FIG. 26 is a diagram illustrating to-be-deleted image information;

FIGS. 35A and 35B are diagrams illustrating a case where the image display cell of an enlarged image as a target of undoing of an enlargement process is present in a hidden portion, in which FIG. 35A illustrates a state before undoing and FIG. 35B illustrates a state after undoing;

FIGS. 36A and 36B are diagrams illustrating a case where the image display cell of an enlarged image as a target of undoing of an enlargement process is present in a hidden portion, in which FIG. 36A illustrates a state before undoing and FIG. 36B illustrates a state after undoing;

FIGS. 38A and 38B are diagrams illustrating a mode in which a spiral gesture instruction for the image display cell of an enlargement target image is received as an enlargement instruction, in which FIG. 38A illustrates a state before an enlargement process and FIG. 38B illustrates a state after the enlargement process.

DESCRIPTION OF THE PREFERRED EMBODIMENTS

First Embodiment

Figure 1:
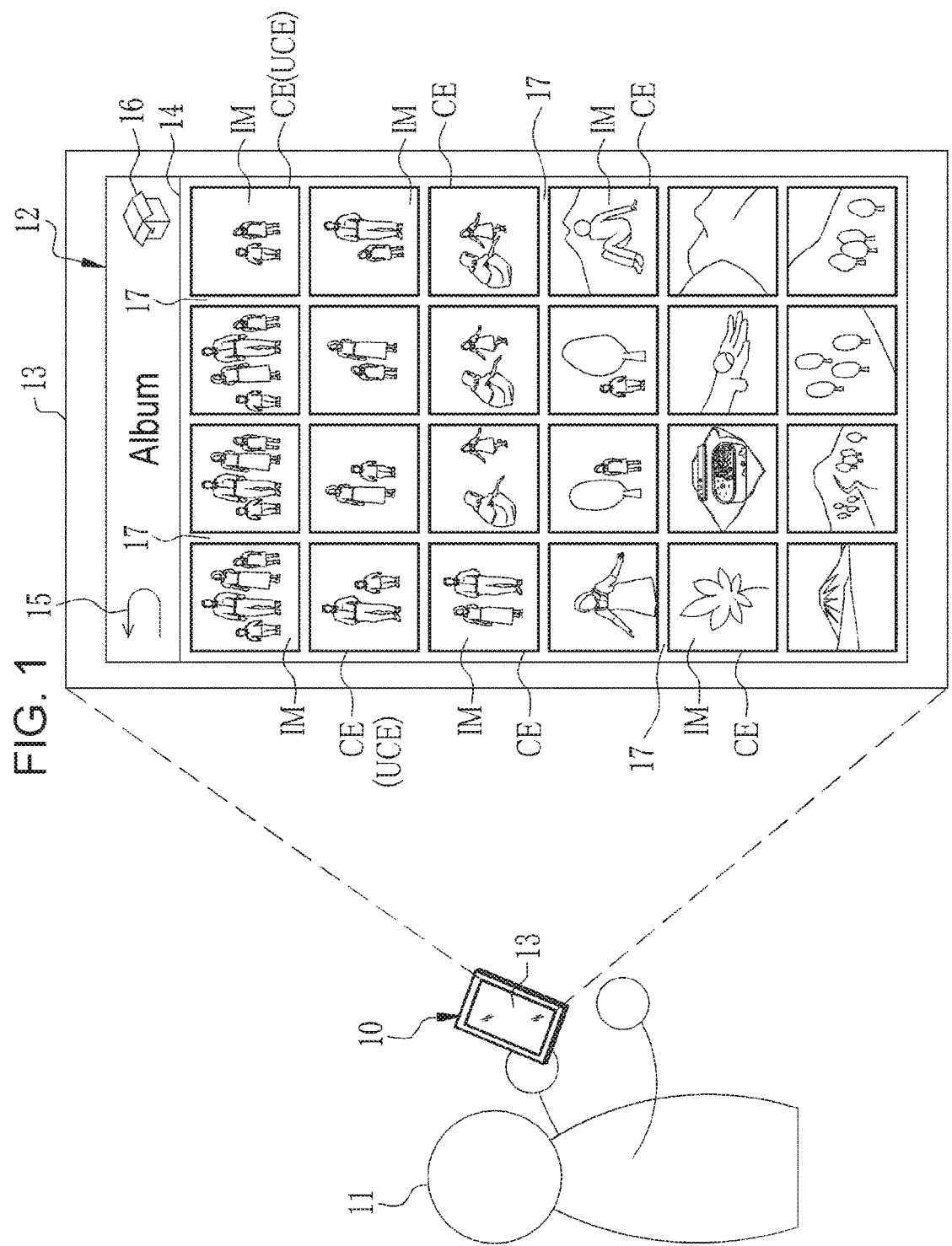
FIG. 1 is a diagram illustrating a smartphone functioning as an electronic album apparatus and an album screen displayed on the touch panel thereof.

In FIG. 1, a smartphone 10 corresponding to an electronic album apparatus according to the present invention is a kind of mobile information terminal carried by and used by a user 11. The smartphone 10 functions as a mobile phone or a digital camera as well known.

The smartphone 10 also functions as a computer that executes various application programs (hereinafter abbreviated as applications). The smartphone 10 has, installed therein, an electronic album application 30 (see FIG. 3) serving as one of applications and corresponding to an operation program for the electronic album apparatus according to the present invention. When the electronic album application 30 is activated, the smartphone 10 serving as a computer functions as an electronic album apparatus. The electronic album application 30 is an application that allows the user 11 to view images IM, such as photographs captured by the smartphone 10 or photographs obtained from a website, and to create an electronic album in which a plurality of images IM are arranged in accordance with preferences of the user 11.

Each image IM has an exchangeable image file format (Exif) region of the data constituting the image IM. The Exif region stores various pieces of accessory information, such as a shooting date and time and a shooting location (longitude, latitude, and altitude information obtained from the Global Positioning System (GPS)), in association with image identification data (ID) for identifying the image IM.

The electronic album application 30 generates an album screen 12 and displays the generated album screen 12 on a touch panel 13 provided on a front surface of the smartphone 10. The album screen 12 includes an album page 14 in which a plurality of images IM are arranged.

An upper portion of the album screen 12 is provided with an undo button 15 and a deleted image list display button 16. The undo button 15 is a button for undoing an enlargement process of enlarging an image IM. The deleted image list display button 16 is a button for displaying a deleted image list 60 (see FIG. 12), which is a list of deleted images IMD, which are images IM deleted from the album page 14. The deleted image list display button 16 has an external appearance like a corrugated box to which a deleted image IMD is casually thrown away.

In the album page 14, image display cells CE are arranged in a grid pattern. Each image display cell CE is a rectangular frame displaying an image IM of one frame. In an initial state illustrated in FIG. 1, each image display cell CE is a square-shaped frame having a width that allows four image display cells CE to be arranged in a row direction (a lateral direction) of the album page 14 with gaps 17 therebetween. The image display cell CE with a square-shaped frame is the minimum unit of the image display cell CE and corresponds to a unit cell UCE whose size is defined in advance. As the details will be described below, the size of the image display cell CE changes to a positive integral multiple (1, 2, 3, 4, or the like) of the unit cell UCE.

In the initial state, not all the image display cells CE may be unit cells UCE. For example, in a case where an evaluation of each image IM by the user 11 is stored as accessary information, an enlargement process may be automatically performed on an image IM having an evaluation higher than a threshold value, and the image display cell CE of the image IM may be enlarged to several times (for example, four times of two rows x two columns) the unit cell UCE in the initial state. Alternatively, a similar process may be performed on an image IM whose evaluation value based on the image quality is larger than a threshold value, which will be described below in a second embodiment and so forth.

The individual image display cells CE are arranged with the gaps 17 therebetween also in a column direction (a vertical direction). The above "image display cells CE are arranged in a grid pattern" means a state where the gaps 17 that partition the individual image display cells CE extend in the row direction and the column direction of the album page 14 and the individual image display cells CE constitute cells of the grid.

In the electronic album application 30, an image IM can be displayed in an enlarged view in response to a gesture instruction to the touch panel 13 using a finger F (for example, a forefinger, see FIG. 6A) of the user 11. The user 11 causes the electronic album application 30 to execute a desired album editing process by providing a gesture instruction.

Figure 2:
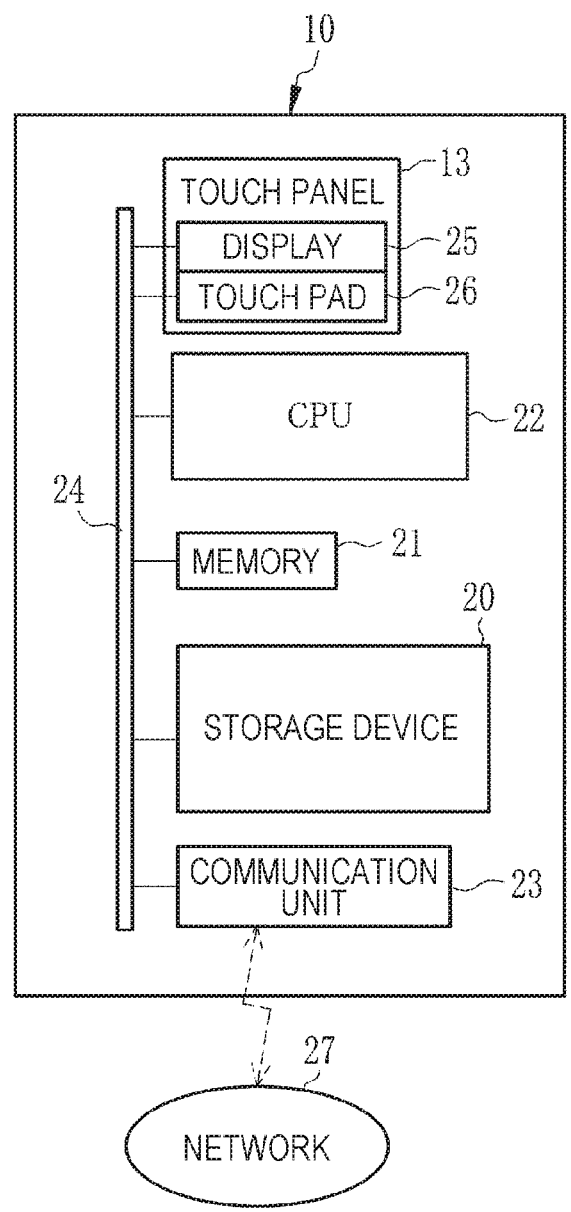
FIG. 2 is a block diagram of a computer constituting the smartphone.

In FIG. 2, the smartphone 10 includes, in addition to the above-described touch panel 13, a storage device 20, a memory 21, a central processing unit (CPU) 22, and a communication unit 23. These devices are connected to each other via a data bus 24.

The touch panel 13 is constituted by a thin flat display 25, such as a liquid crystal display or an organic electroluminescence (EL) display, and a thin flat touch pad 26 disposed on the display 25. Various screens including the album screen 12 is displayed on the display 25. The touch pad 26 detects a touch of the finger F of the user 11 and recognizes a gesture instruction.

The storage device 20 is a nonvolatile semiconductor memory, such as a flash memory or a solid state drive (SSD). The storage device 20 stores a control program such as an operating system, various applications including the electronic album application 30, graphical user interface (GUI) data of various screens accompanying these programs, and the like. The applications include those preinstalled in the smartphone 10 and those optionally downloaded and installed by the user 11 from an application distribution server to the smartphone 10 through a network 27, such as a mobile communication network or the Internet, such as the electronic album application 30.

The memory 21 is a work memory for the CPU 22 to execute a process and is constituted by a random access memory (RAM). The CPU 22 loads a program stored in the storage device 20 to the memory 21 and executes a process in accordance with the program, thereby centrally controlling each component of the smartphone 10.

The communication unit 23 is an interface for wireless communication and performs transmission control related to wireless communication. The interface for wireless communication includes a mobile communication interface to connect to a mobile communication network, an interface of a wireless local area network (LAN) standard of the Institute of Electrical and Electronics Engineers, Inc. (IEEE) 802.11 series to connect to a wireless router, an interface for near field wireless communication using infrared or the like, and the like. The smartphone 10 connects to the network 27 via the communication unit 23.

Figure 3:
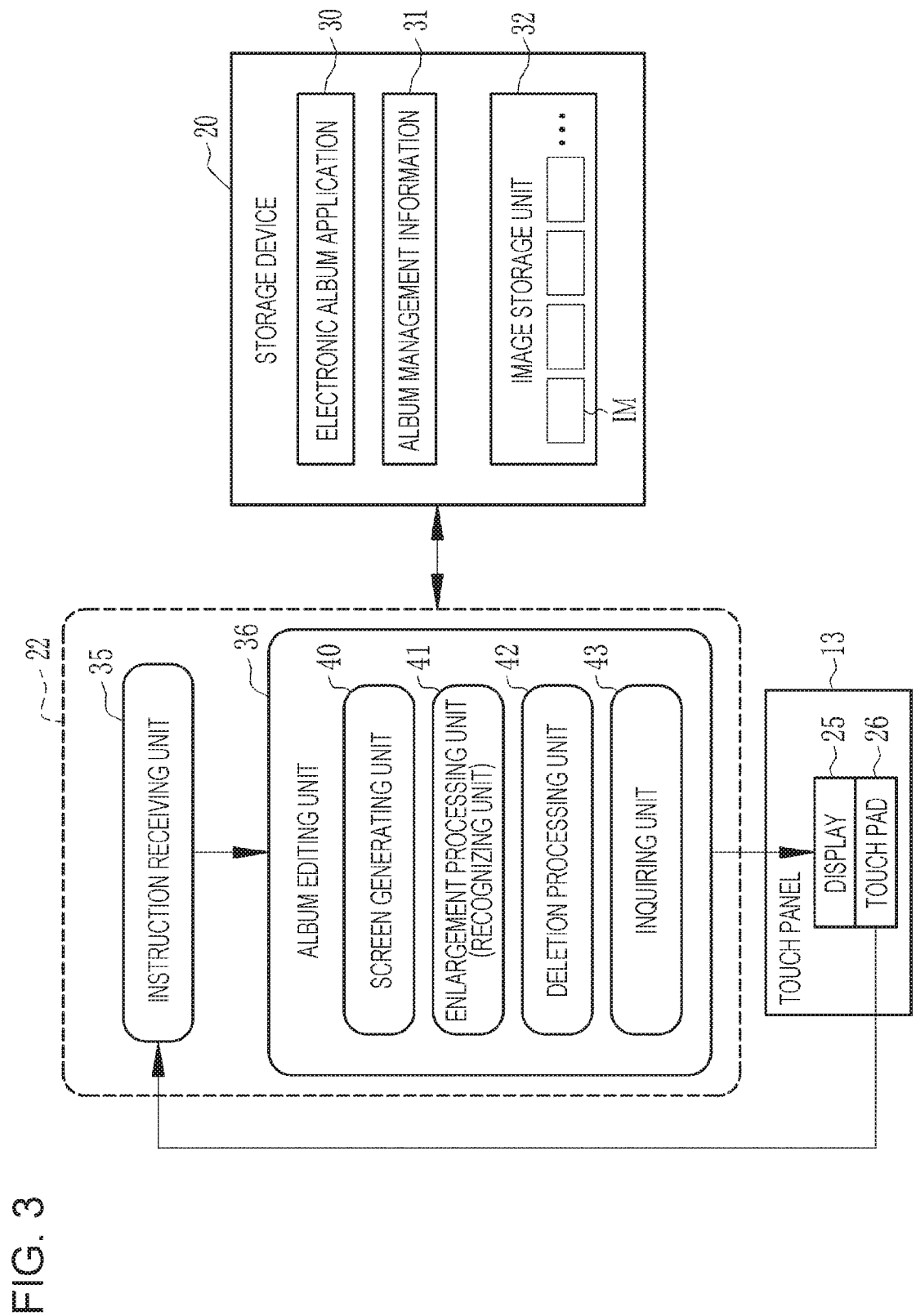
FIG. 3 is a block diagram of a storage device and CPU of the smartphone.

In FIG. 3, the storage device 20 stores the electronic album application 30 and album management information 31 generated by the electronic album application 30. In addition, the storage device 20 has an image storage unit 32 that stores images IM together with image IDs and accessory information.

When the electronic album application 30 is activated, the CPU 22 functions as an instruction receiving unit 35 and an album editing unit 36. The album editing unit 36 includes a screen generating unit 40, an enlargement processing unit 41, a deletion processing unit 42, and an inquiring unit 43.

The instruction receiving unit 35 has an instruction reception function of receiving a gesture instruction input via the touch pad 26. The instruction receiving unit 35 outputs information about a received gesture instruction to the album editing unit 36. The gesture instruction mainly relates to edit of an electronic album, and includes an enlargement instruction to display an image IM in an enlarged view within the album page 14.

The album editing unit 36 has an album editing function of executing various album editing processes in accordance with information about a gesture instruction received from the instruction receiving unit 35.

The screen generating unit 40 has a screen generation function of generating the album screen 12. The screen generating unit 40 outputs the album screen 12 that has been generated to the display 25.

The enlargement processing unit 41 executes, as an album editing process, an enlargement process of enlarging an enlargement target image IMT (see FIG. 7), which is an image IM for which an enlargement instruction has been provided. The deletion processing unit 42 executes, as an album editing process, a deletion process of deleting an image IM from the album page 14.

Here, an image IM as a target of a deletion process is an image IM other than the enlargement target image IMT and is an image IM that overlaps an enlargement region ER (see FIG. 7), which is a region of the enlargement target image IMT that has been enlarged. Hereinafter, the image IM that overlaps the enlargement region ER and that is to be deleted from the album page 14 will be referred to as a to-be-deleted image IMP (see FIG. 7). The enlargement target image IMT that has undergone an enlargement process by the enlargement processing unit 41 will be referred to as an enlarged image IME (see FIG. 8B).

The inquiring unit 43 has an inquiry function of inquiring whether or not to execute a deletion process on a to-be-deleted image IMP.

Prior to output of the album screen 12, the screen generating unit 40 outputs to the display 25 a reception screen (not illustrated) that receives designation about an attribute of images IM to be arranged in the album page 14. In a case where no designation is received from the user 11 on this reception screen, the album editing unit 36 reads out all the images IM from the image storage unit 32 and arranges all the read out images IM in the album page 14. On the other hand, in a case where designation of an attribute, for example, a specific shooting date and time or shooting location, is received on the reception screen from the user 11, the album editing unit 36 searches the image storage unit 32 for an image IM captured on the designated shooting date and time or an image IM captured at the designated shooting location and arranges the image IM obtained through the search in the album page 14.

The album editing unit 36 arranges the images IM in the album page 14 in accordance with a display order based on an attribute. For example, the album editing unit 36 arranges the images IM in order from the image IM of the oldest shooting date and time to the image IM of the newest shooting date and time from the top to the bottom and from the left to the right of the album page 14. In this case, the image IM displayed in the image display cell CE at the left end of the top row of the album page 14 has the oldest shooting date and time, and the image IM displayed in the image display cell CE at the right end of the bottom row of the album page 14 has the newest shooting date and time.

In a case where the shooting date and time is not recorded in the Exif region, the date and time when the data file of the image IM was created may be used instead of the shooting date and time. In a case where the shooting date and time is not recorded in the Exif region and the image IM has been obtained from a website, the date and time when the image IM was obtained from the website may be used instead of the shooting date and time. Furthermore, in a case where the shooting date and time is not recorded in the Exif region, the date and time when the data file of the image IM was created or the date and time when the image IM was obtained from the website may be recorded in a region for recording a shooting date and time in the Exif region.

As illustrated in FIG. 4, the album editing unit 36 trims an image IM in accordance with the shape of the image display cell CE before arranging the image IM in the album page 14. In the example in FIG. 4, the image display cell CE is a unit cell UCE and is a square-shaped frame. On the other hand, the image IM is a rectangle with an aspect ratio of 16:9.

First, in step ST1, the album editing unit 36 reduces the size of the image IM such that the length in the column direction of the image IM matches the length of one side of the image display cell CE. Subsequently, in step ST2, the image display cell CE is placed at the center portion of the reduced image IM. Subsequently, in step ST3, the left and right edge portions (hatched portions) of the image IM other than the center portion at which the image display cell CE has been placed are trimmed away. Finally, in step ST4, the image display cell CE in which the trimmed image IM is displayed is arranged at a position corresponding to a display order in the album page 14. The album editing unit 36 repeatedly performs the series of steps ST1 to ST4 a number of times corresponding to the number of images IM to be arranged in the album page 14.

Figure 5:
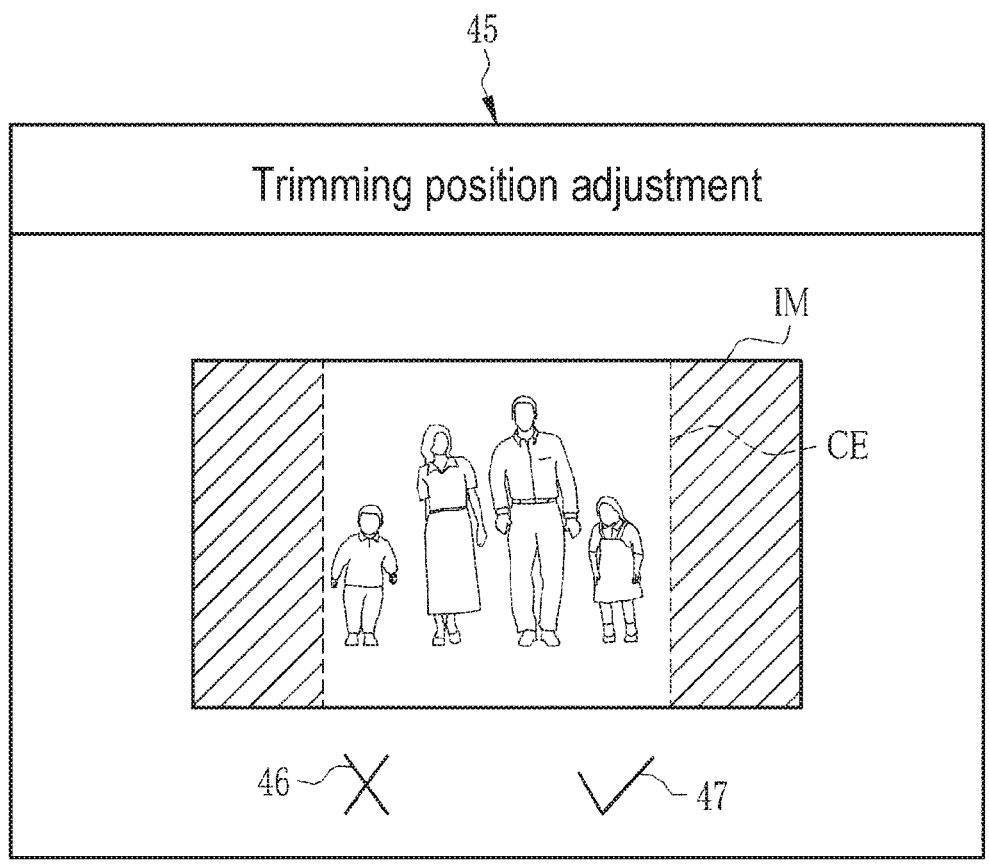
FIG. 5 is a diagram illustrating a trimming position adjustment screen.

When a gesture instruction of consecutively tapping twice an image display cell CE with the finger F (a double-tap instruction) is provided in the album page 14, the album editing unit 36 causes the display 25 to display a trimming position adjustment screen 45 illustrated in FIG. 5. On the trimming position adjustment screen 45, the image display cell CE selected by the double-tap instruction and the image IM thereof are displayed, and a cancel button 46 and a check button 47 are provided below the image display cell CE and the image IM.

Figure 6B:
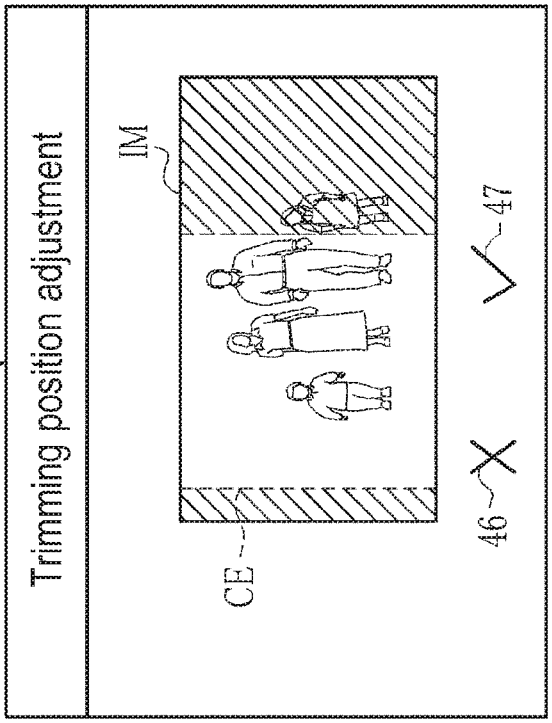
Figure 6A:
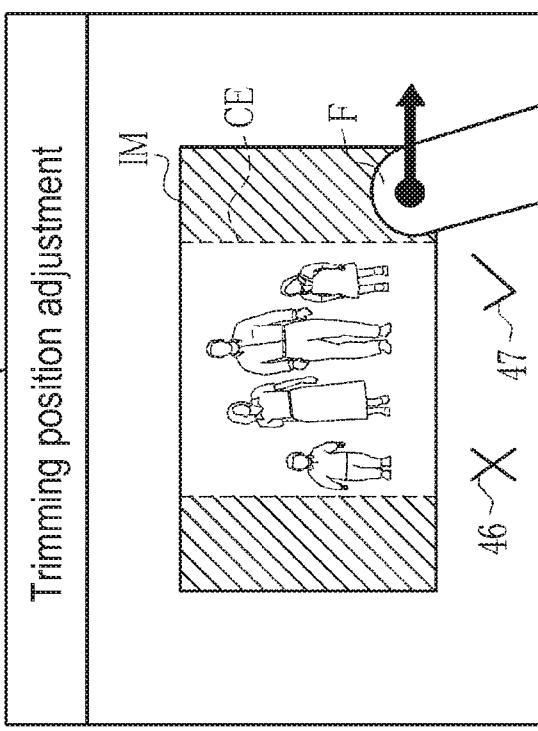

As illustrated in FIGS. 6A and 6B, the trimming position of the image IM can be adjusted on the trimming position adjustment screen 45. Specifically, when a gesture instruction of touching the image IM in the trimming position adjustment screen 45 with the finger F and moving the finger F in a desired direction (here, a right direction) is provided as illustrated in FIG. 6A, the image IM is moved in the movement direction of the finger F with the image display cell CE fixed, as illustrated in FIG. 6B. In this way, the trimming position of the image IM is adjusted.

When the check button 47 is selected after the trimming position of the image IM has been adjusted, the trimming position adjustment screen 45 disappears and the album page 14 appears in which the image IM that has undergone the trimming position adjustment is arranged. When the cancel button 46 is selected, the trimming position adjustment screen 45 disappears without the trimming position of the image IM being adjusted. The adjustment of the trimming position on the trimming position adjustment screen 45 can be performed not only on the image IM displayed in the unit cell UCE but also on an enlarged image IME.

Figure 7:
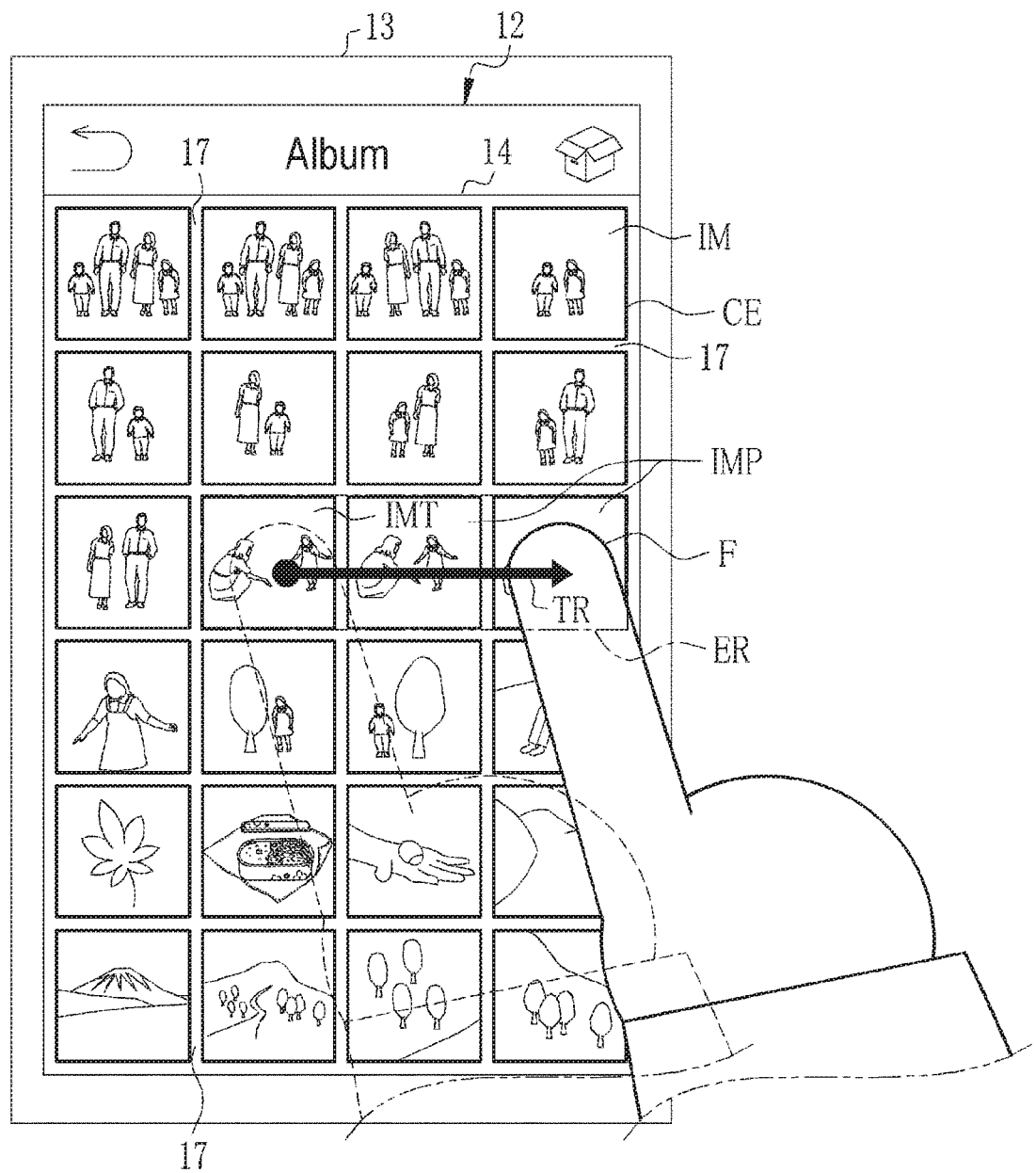
FIG. 7 is a diagram illustrating a state of an enlargement instruction.

In FIG. 7, an enlargement instruction is a swipe instruction of moving a single finger F of the user 11 within the album page 14 starting from an enlargement target image IMT. More specifically, an enlargement instruction starts from a gesture instruction of touching an enlargement target image IMT with the finger F for a predetermined time period (for example, 2 seconds) to select the enlargement target image IMT. Subsequently, a gesture instruction is provided in which the finger F touching the enlargement target image IMT is moved along an enlargement region ER in which the user 11 wants to enlarge the enlargement target image IMT. Finally, a gesture instruction of moving the finger F away from a terminal point of the enlargement region ER is provided.

The enlargement region ER is a region formed by combining the image display cells CE that overlap a trajectory TR of the finger F moved from the image display cell CE of the enlargement target image IMT at a starting point of the finger F of a swipe instruction to the image display cell CE at a terminal point at which the finger F is moved away at the end of the swipe instruction, including the gaps 17. As described above, each image display cell CE is based on the unit cell UCE. Thus, the enlargement region ER formed by combining the image display cells CE that overlap the trajectory TR of the finger F has a size that is a positive integral multiple of the unit cell UCE. To be precise, the enlargement region ER is slightly larger than a positive integral multiple of the unit cell UCE because of the gaps 17, but the gaps 17 are very narrow and ignored.

The instruction receiving unit 35 receives a swipe instruction as described above as an enlargement instruction. The instruction receiving unit 35 outputs, as information about the enlargement instruction, position information of the enlargement target image IMT and position information of the enlargement region ER to the album editing unit 36.

The position information of the enlargement target image IMT is information indicating which image IM of the image display cell CE in the album page 14 has been selected as the enlargement target image IMT. Specifically, the position information of the enlargement target image IMT is address information indicating the row and column in which the image display cell CE of the image IM selected as the enlargement target image IMT is located. Likewise, the position information of the enlargement region ER is address information of the image display cell CE that overlaps the trajectory TR of the finger F.

FIG. 7 illustrates a state where the image IM in the image display cell CE in the third row from the top and the second column from the left in the album page 14 is selected as an enlargement target image IMT and the image display cells CE to the image display cell CE in the third row from the top and the fourth column from the left are designated as an enlargement region ER. In this case, the image IM in the image display cell CE in the third row from the top and the third column from the left and the image IM in the image display cell CE in the third row from the top and the fourth column from the left are to-be-deleted images IMP, which are images IM that overlap the enlargement region ER and that are to be deleted from the album page 14 (see FIG. 8A).

The enlargement processing unit 41 recognizes which image IM is the enlargement target image IMT on the basis of the position information of the enlargement target image IMT. That is, the enlargement processing unit 41 corresponds to a recognizing unit that recognizes the enlargement target image IMT and has a recognition function of recognizing the enlargement target image IMT. In addition, the enlargement processing unit 41 grasps, on the basis of the position information of the enlargement region ER, how many unit cells UCE correspond to the enlargement region ER and which shape the enlargement region ER has.

FIG. 8A illustrates a state before an enlargement process in the example in FIG. 7, and FIG. 8B illustrates a state after the enlargement process. In FIG. 8A, the image display cell CE of the enlargement target image IMT remains a square-shaped unit cell UCE. On the other hand, in FIG. 8B, the enlargement target image IMT after the enlargement process, that is, the image display cell CE of the enlarged image IME (the enlargement region ER), corresponds to three unit cells UCE and is a laterally-long rectangle. When the undo button 15 is selected in FIG. 8B, the state returns to the state before the enlargement process in FIG. 8A. FIG. 8B illustrates an example in which a deletion process has been executed on all the to-be-deleted images IMP by the deletion processing unit 42 and all the to-be-deleted images IMP have been deleted from the album page 14.

Figure 9:
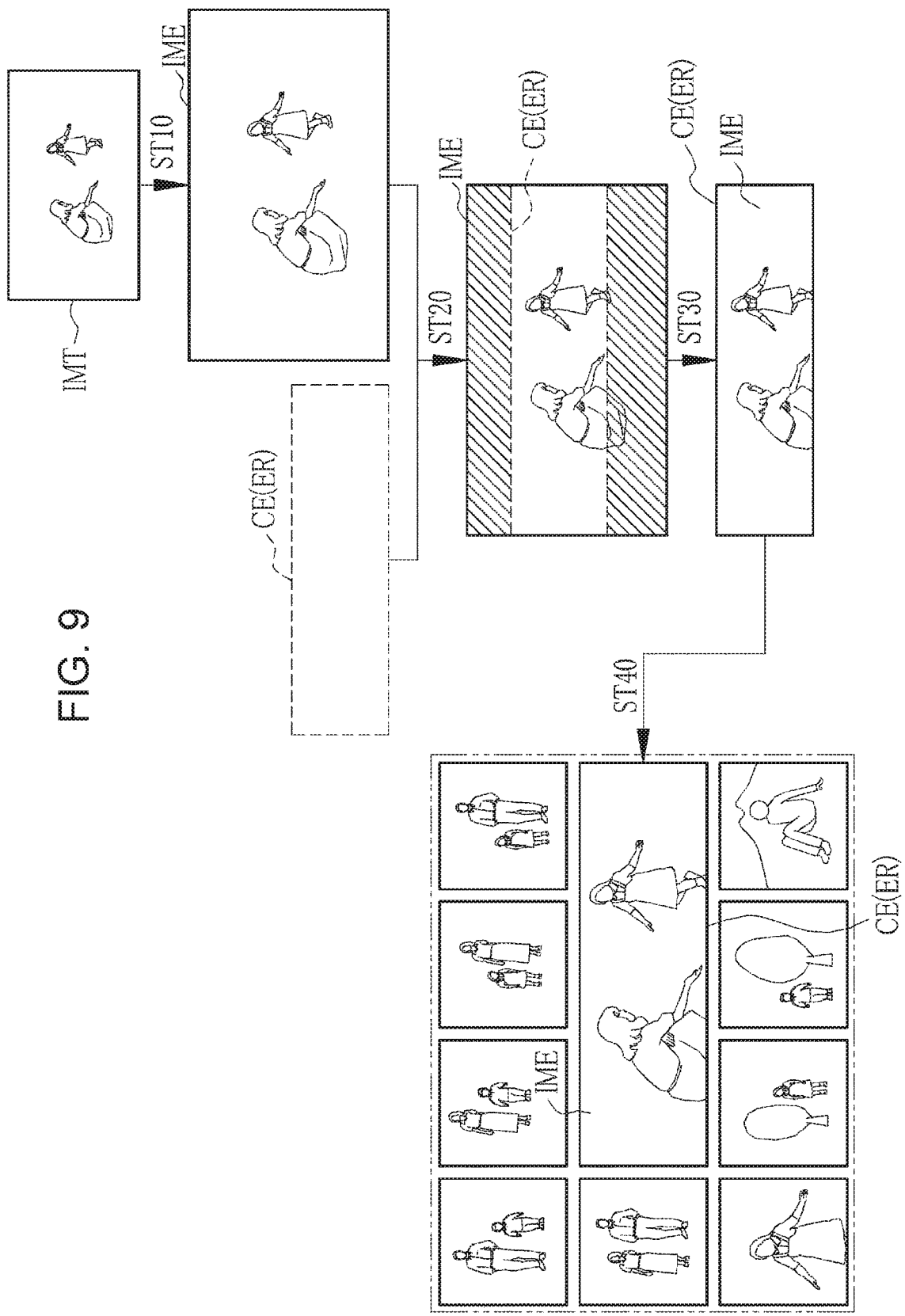
FIG. 9 is an explanatory diagram of an enlargement process.

FIG. 9 illustrates the details of the enlargement process in the example in FIG. 7 and FIGS. 8A and 8B. First, in step ST10, the enlargement processing unit 41 enlarges the enlargement target image IMT such that the length in the row direction of the enlargement target image IMT matches the length in the row direction of the enlargement region ER as a new image display cell CE, thereby creating an enlarged image IME, as in step ST1 in FIG. 4. That is, the enlargement processing unit 41 enlarges the image IM recognized as the enlargement target image IMT in accordance with the size of the enlargement region ER for which the number of corresponding unit cells UCE has been grasped.

Subsequently, in step ST20, the image display cell CE (the enlargement region ER) is placed at the center portion of the enlarged image IME, as in step ST2 in FIG. 4. Subsequently, in step ST30, the upper and lower edge portions (hatched portions) of the enlarged image IME other than the center portion at which the image display cell CE is placed are trimmed away, as in step ST3 in FIG. 4. Finally, in step ST40, the image display cell CE in which the trimmed enlarged image IME is displayed is arranged at the position corresponding to the enlargement region ER in the album page 14, as in step ST4 in FIG. 4.

Figure 10:
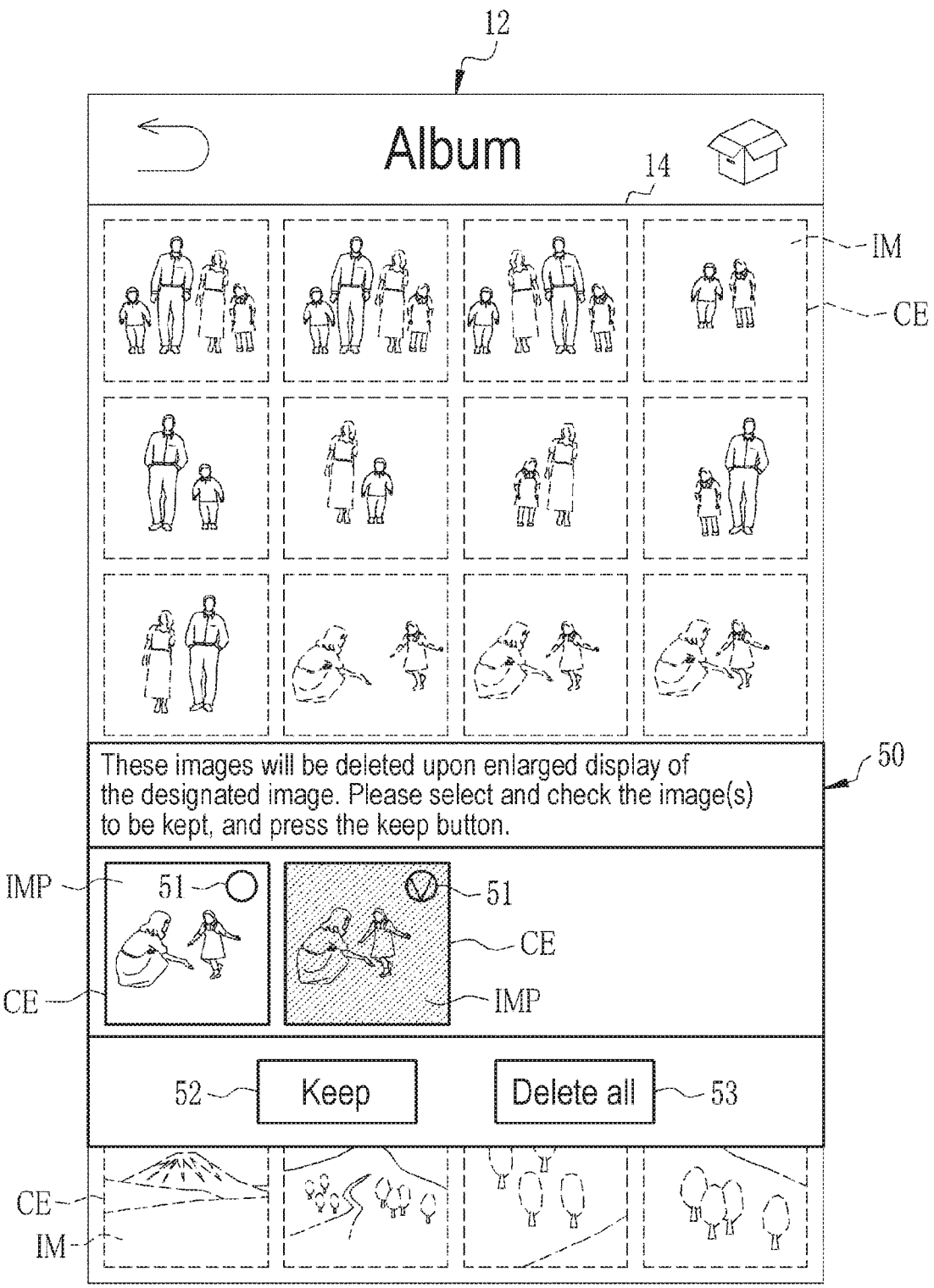
FIG. 10 is a diagram illustrating a state where a to-be-deleted image list is displayed on the album screen.

As illustrated in FIG. 10, the inquiring unit 43 displays a to-be-deleted image list 50, which is a list of to-be-deleted images IMP, on the album screen 12 before the deletion processing unit 42 executes a deletion process. On the to-be-deleted image list 50, the image display cell CE of a to-be-deleted image IMP is displayed. In a case where there are a plurality of to-be-deleted images IMP as in this example, the inquiring unit 43 displays the image display cells CE of the to-be-deleted images IMP by arranging them in the to-be-deleted image list 50. The display order is the same as in the album page 14, for example, from the image IM of the oldest shooting date and time to the image IM of the newest shooting date and time, from the top the bottom and from the left to the right. While the to-be-deleted image list 50 is displayed, the images IM and the image display cells CE in the album page 14 are grayed out as indicated by broken lines.

The image display cell CE of a to-be-deleted image IMP is provided with a check box 51. When the user 11 provides, using the finger F, a gesture instruction to select the image display cell CE of a to-be-deleted image IMP, the image display cell CE enters a selected sate as indicated by hatching, and a check mark is displayed in the check box 51.

At the upper portion of the to-be-deleted image list 50, a message is displayed indicating that the to-be-deleted images IMP will be deleted from the album page 14 upon enlarged display of the enlargement target image IMT and promoting selection of a to-be-deleted image IMP to be kept in the album page 14 without executing a deletion process, that is, promoting a first selection instruction. At the lower portion of the to-be-deleted image list 50, a keep button 52 and a delete all button 53 are displayed. The to-be-deleted image list 50 disappears when the keep button 52 or the delete all button 53 is selected.

When the image display cell CE of a to-be-deleted image IMP to be kept in the album page 14 is selected and the keep button 52 is selected, the inquiring unit 43 receives a first selection instruction. That is, the inquiring unit 43 receives, through the to-be-deleted image list 50, a first selection instruction to select a to-be-deleted image IMP to be kept in the album page 14 without executing a deletion process.

On the other hand, when the delete all button 53 is selected, the inquiring unit 43 receives a delete all instruction to delete all the to-be-deleted images IMP from the album page 14 by executing a deletion process. The deletion processing unit 42 executes a deletion process on a to-be-deleted image IMP for which the first selection instruction has not been received by the inquiring unit 43 through the to-be-deleted image list 50 or on all the to-be-deleted images IMP when a delete all instruction is received. The deletion processing unit 42 does not execute a deletion process on a to-be-deleted image IMP for which the first selection instruction has been received by the inquiring unit 43.

In FIG. 10, the to-be-deleted image list 50 in the example in FIG. 7 to FIG. 9 is displayed. The image display cell CE in the third row from the top and the third column from the left in the album page 14 is displayed on the left side in the to-be-deleted image list 50, and the image display cell CE in the third row from the top and the fourth column from the left in the album page 14 is displayed on the right side in the to-be-deleted image list 50. In addition, the image display cell CE in the third row from the top and the fourth column from the left is selected.

FIG. 11A illustrates a state before an enlargement process similarly to FIG. 8A, and FIG. 11B illustrates a state after an enlargement process in a case where the keep button 52 is selected in the state illustrated in FIG. 10. In FIG. 11B, the image display cell CE in the third row from the top and the fourth column from the left selected as a to-be-deleted image IMP that is to be kept in the album page 14 without executing a deletion process in FIG. 10 is arranged after the enlarged image IME in the display order.

Upon display of the image display cell CE in the third row from the top and the fourth column from the left, the positions of the image display cells CE of the images IM other than the to-be-deleted image IMP after the enlarged image IME are shifted. For example, the image display cell CE in the fourth row from the top and the fourth column from the left, which is arranged immediately below the image display cell CE in the third row from the top and the fourth column from the left, is shifted to the fifth row from the top and the first column from the left after the enlargement process. As in the case in FIGS. 8A and 8B, when the undo button 15 is selected in FIG. 11B, the state returns to the state before the enlargement process in FIG. 11A.

Figure 12:
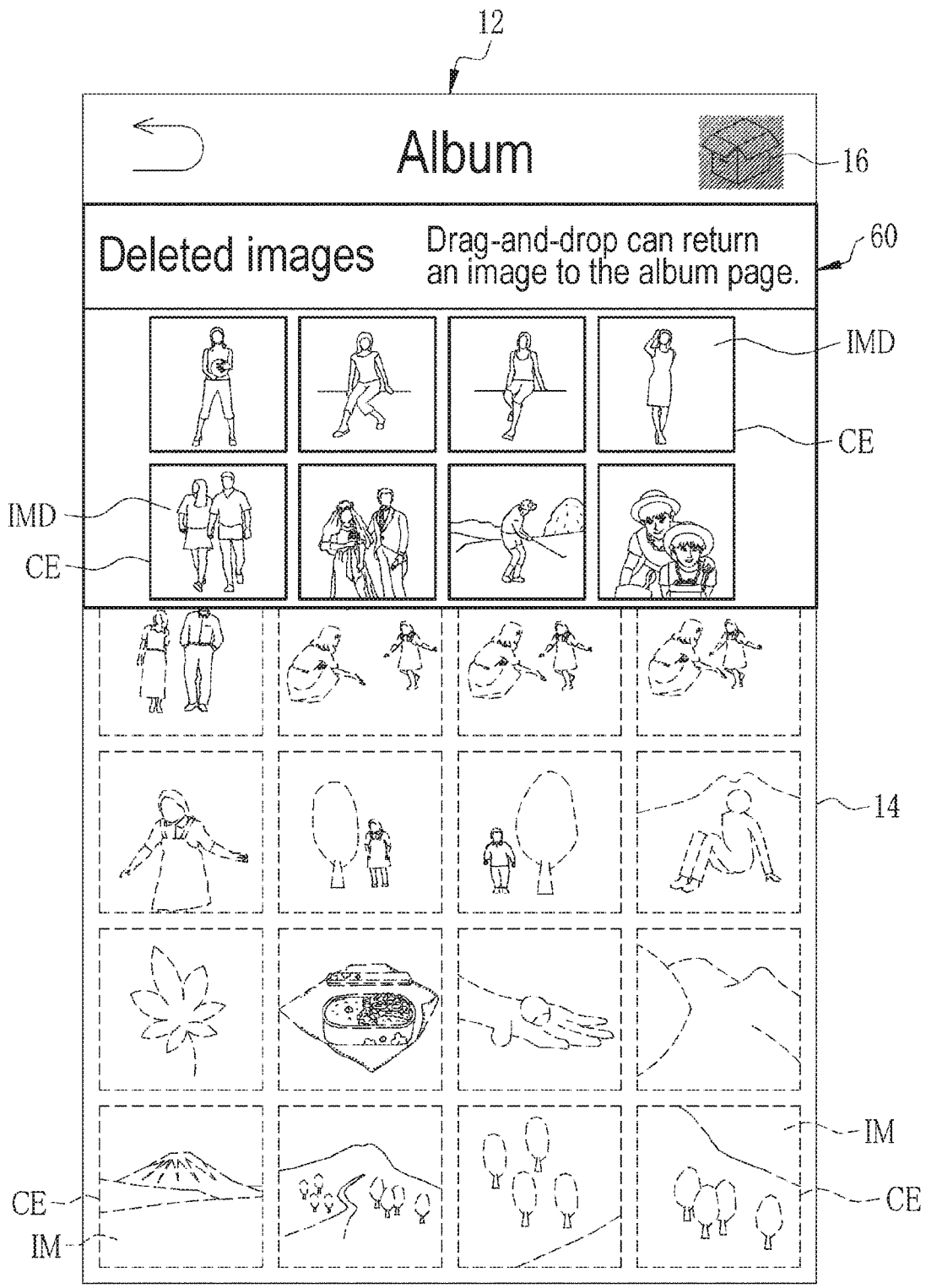
FIG. 12 is a diagram illustrating a state where a deleted image list is displayed on the album screen.

In FIG. 12, when the deleted image list display button 16 is selected as indicated by the hatching, the album editing unit 36 displays the deleted image list 60 on the album screen 12. In the deleted image list 60, the image display cell CE of a deleted image IMD is displayed. In a case where there are a plurality of deleted images IMD, the album editing unit 36 displays the image display cells CE of the deleted images IMD by arranging them in the deleted image list 60 as illustrated. The display order is the same as in the album page 14 and the to-be-deleted image list 50, for example, from the image IM of the oldest shooting date and time to the image IM of the newest shooting date and time, from the top to the bottom and from the left to the right. As in the to-be-deleted image list 50, while the deleted image list 60 is displayed, the images IM and the image display cells CE in the album page 14 are grayed out as indicated by broken lines. The deleted image list 60 disappears when the deleted image list display button 16 is selected again.

Figure 13:
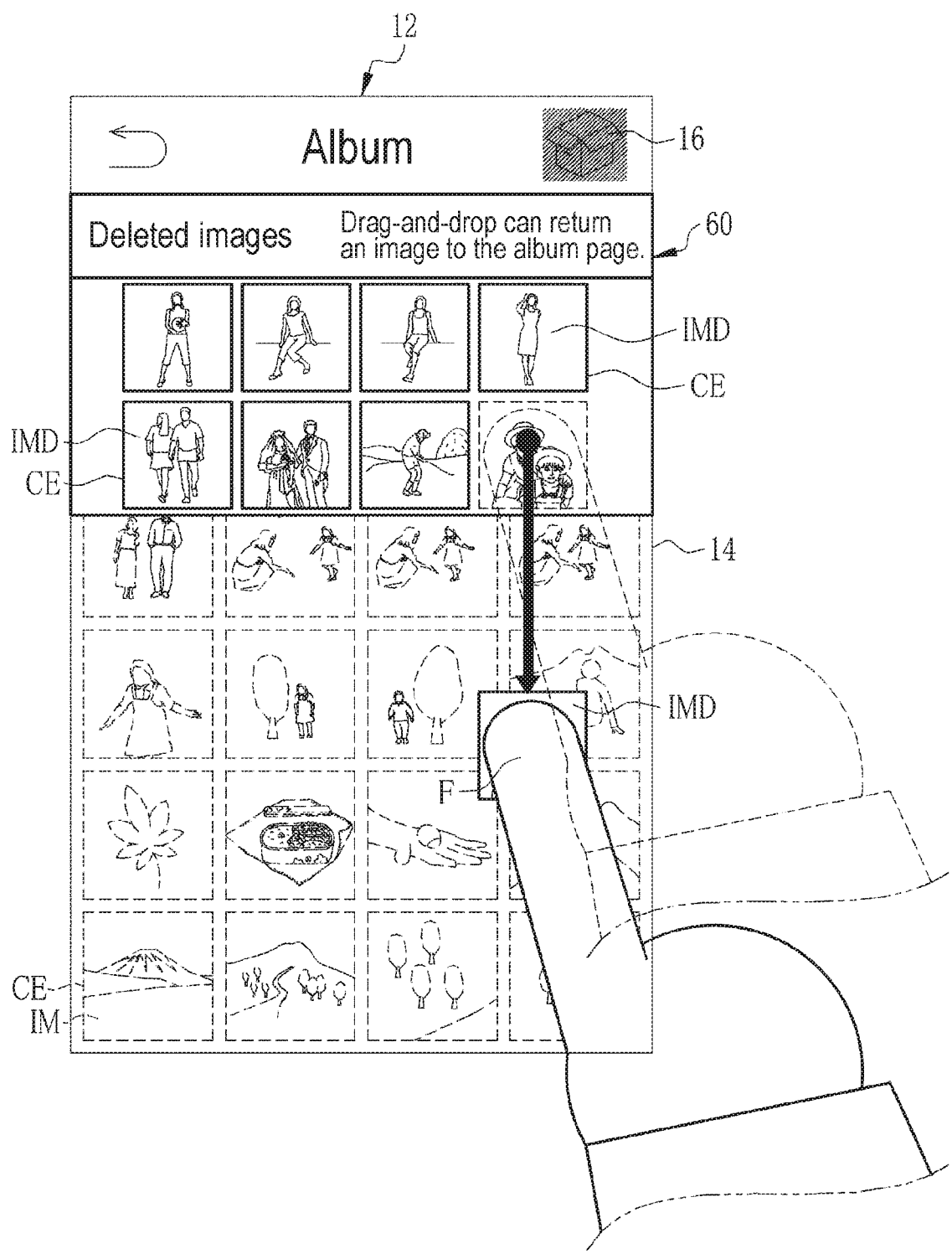
FIG. 13 is a diagram illustrating a state where a deleted image in the deleted image list is dragged and dropped on the album page.

As illustrated in FIG. 13, when a gesture instruction is provided in which a desired image display cell CE in the deleted image list 60 is touched by the finger F and the finger F is moved to the album page 14 with the state being maintained (a drag-and-drop instruction), the album editing unit 36 executes, as an album editing process, a return process of returning the deleted image IMD displayed in the image display cell CE touched by the finger F to the original position in the album page 14.

On the contrary, when a drag-and-drop instruction to move an image display cell CE in the album page 14 to the deleted image list 60 is provided, the deletion processing unit 42 executes a deletion process on the image IM displayed in the image display cell CE for which the drag-and-drop instruction has been provided. That is, in the display state illustrated in FIG. 12, an image IM can be moved between the album page 14 and the deleted image list 60.

In FIG. 14, the album management information 31 includes information about images IM displayed on the album page 14 and information about deleted images IMD. The album management information 31 includes image IDs and layout information stored in association with each other.

The layout information is constituted by address information, trimming position information, and the like. The address information indicates, in the case of an image IM displayed on the album page 14, the row and column in which the image display cell CE of the image IM is arranged in the album page 14. In the case of a deleted image IMD, the address information indicates the row and column in which the image display cell CE of the deleted image IMD is arranged in the deleted image list 60.

Figure 15:
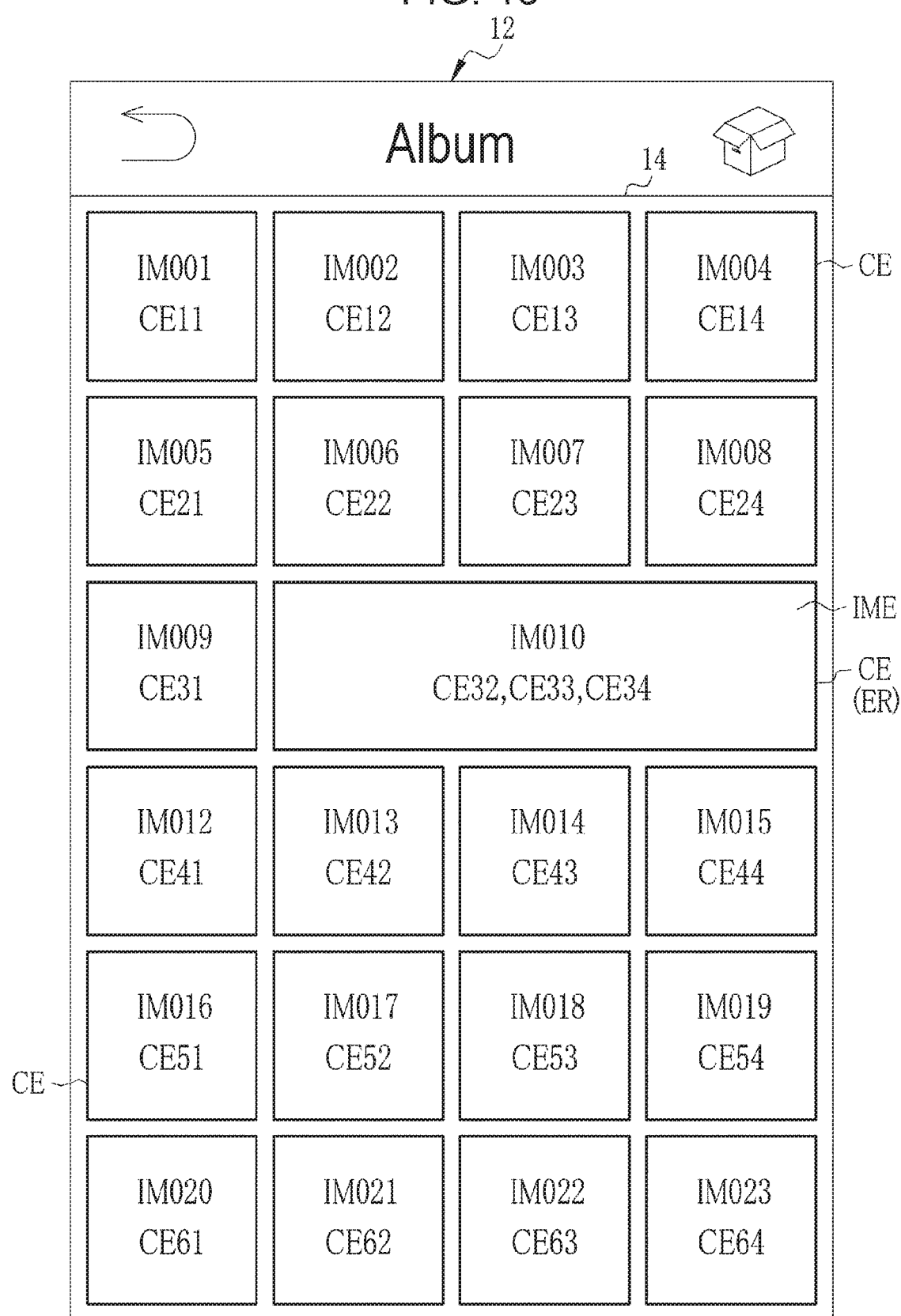
FIG. 15 is a diagram illustrating the album screen in which an image ID and address information are written in each image display cell.

The address information of the images IM displayed on the album page 14 is a combination of characters "CE" and a two-digit number, such as CE11, CE12, CE13, and the like. As illustrated in FIG. 15, in the two-digit number, the first digit represents a row in the album page 14 and the second digit represents a column in the album page 14. For example, the address information of the image display cell CE in the second row from the top and the third column from the left in the album page 14 is CE23.

On the other hand, the address information of the deleted images IMD is a combination of characters "DCE" and a two-digit number, such as DCE11, DCE12, and the like. Similarly to the address information of the images IM displayed on the album page 14, in the two-digit number of the address information of the deleted images IMD, the first digit represents a row in the deleted image list 60 and the second digit represents a column in the deleted image list 60.

With reference to the address information of an image IM displayed on the album page 14, the size and shape of the image display cell CE for displaying the image IM can be grasped. Specifically, among the images IM displayed on the album page 14, the image IM having only one piece of address information stored is an image IM displayed in a square-shaped unit cell UCE. On the other hand, the image IM having a plurality of pieces of address information stored is an enlarged image IME in the image display cell CE which is an enlargement region ER formed by combining the unit cells UCE indicated by the pieces of address information. That is, the address information of the enlarged image IME is the position information of the enlargement target image IMT and the position information of the enlargement region ER that are output from the instruction receiving unit 35 to the album editing unit 36.

For example, for the image IM whose image ID is IM010, pieces of address information CE32, CE33, and CE34 are stored. Thus, it is understood from FIG. 15 that the image display cell CE of the image IM of IM010 is a rectangle-shaped enlargement region ER illustrated also in FIG. 8B and so forth, formed by combining in the row direction three unit cells UCE in the third row from the top and the second to fourth columns from the left.

FIG. 7 to FIG. 9 and FIGS. 11A and 11B illustrate an example in which the unit cells UCE are combined in the row direction to perform enlarged display in response to an enlargement instruction of linearly moving the finger F in the row direction. However, as illustrated in FIG. 16A to FIG. 21B, variation in enlargement instruction and enlarged display is not limited to the example in FIG. 7 to FIG. 9 and FIGS. 11A and 11B.

Figure 16B:
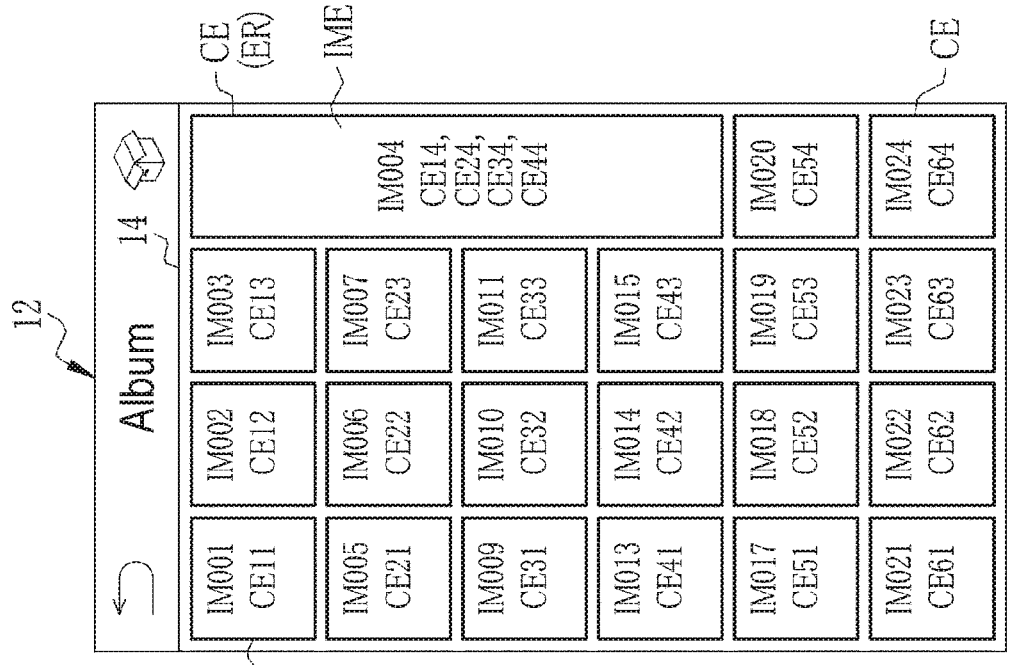
Figure 16A:
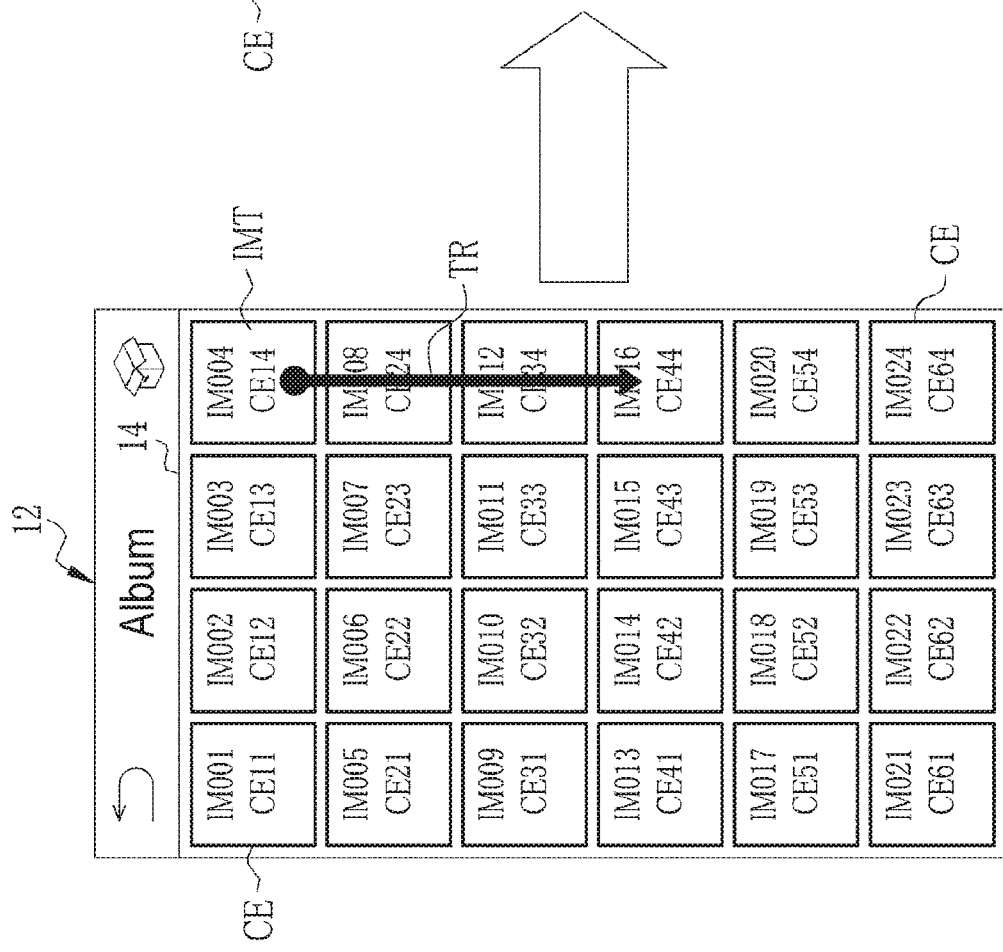

FIGS. 16A and 16B illustrate an example in which enlarged display is performed by combining unit cells UCE not in the row direction but in the column direction in response to an enlargement instruction of linearly moving the finger F not in the row direction but in the column direction. As indicated by a trajectory TR in FIG. 16A, the enlargement instruction is provided by moving the finger F in the column direction from the image display cell CE of the image IM whose image ID is IM004 and whose address information is CE14 to the image display cell CE of the image IM whose image ID is IM016 and whose address information is CE44. In this case, as illustrated in FIG. 16B, the image IM whose image ID is IM004, which is an enlargement target image IMT, is displayed in an enlarged view in an enlargement region ER that is formed by combining the image display cells CE of CE14, CE24, CE34, and CE44 in the column direction.

In FIGS. 16A and 16B, the images IM that are displayed in the image display cells CE of CE24, CE34, and CE44 and whose image IDs are IM008, IM012, and IM016 are to-be-deleted images IMP. FIGS. 16A and 16B illustrate a case as an example where the delete all button 53 is selected in the to-be-deleted image list 50 and all the to-be-deleted images IMP is deleted. The same applies to the following FIG. 17A to FIG. 21B.

Figure 17A:
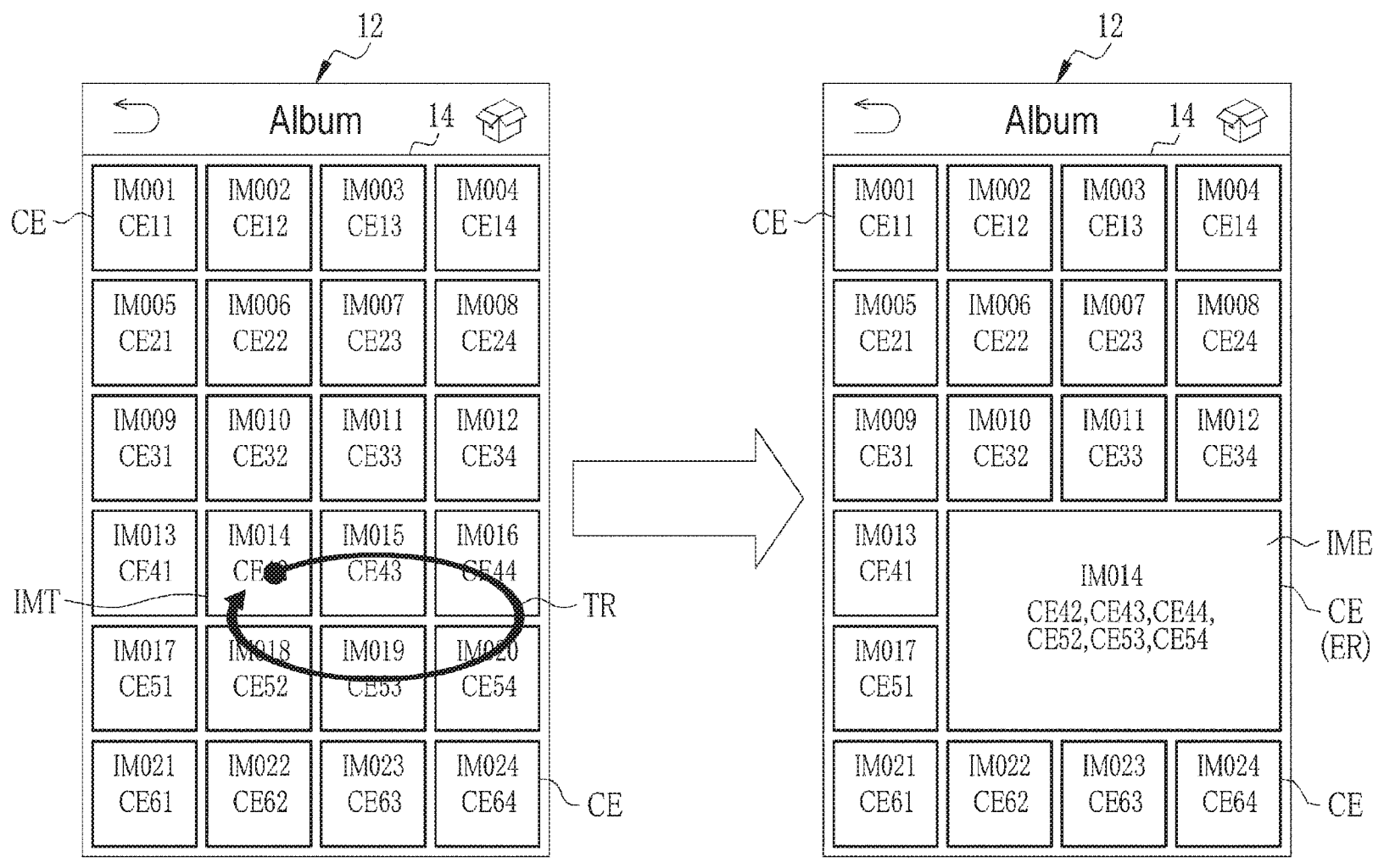

FIGS. 17A and 17B illustrate an example in which enlarged display is performed by combining unit cells UCE over a plurality of rows and a plurality of columns, not in only one row or only one column, in response to an enlargement instruction of moving the finger F over a plurality of rows and a plurality of columns, not in only one row or only one column. As indicated by a trajectory TR in FIG. 17A, the enlargement instruction is provided by moving the finger F to draw an oval clockwise starting from the image display cell CE of the image IM whose image ID is IM014 and whose address information is CE42 and returning to the image display cell CE of the image IM whose image ID is IM014 via the image display cells CE of CE43, CE44, CE54, CE53, and CE52. In this case, as illustrated in FIG. 17B, the image IM whose image ID is IM014, which is an enlargement target image IMT, is displayed in an enlarged view in an enlargement region ER that is formed by combining the image display cells CE of CE42, CE43, CE44, CE52, CE53, and CE54 in matrix directions.

In FIGS. 17A and 17B, the images IM that are displayed in the image display cells CE of CE43, CE44, CE52, CE53, and CE54 and whose image IDs are IM015, IM016, IM018, IM019, and IM020 are to-be-deleted images IMP.

Figure 18B:
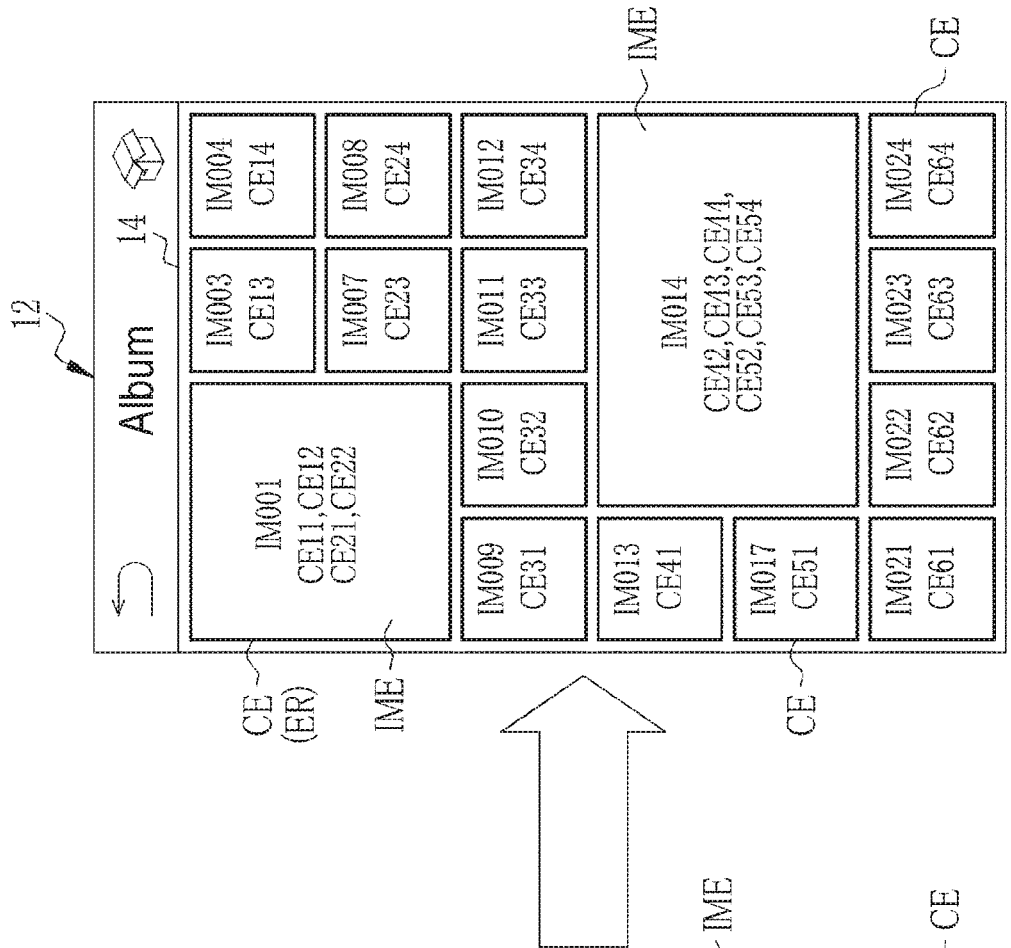
Figure 18A:
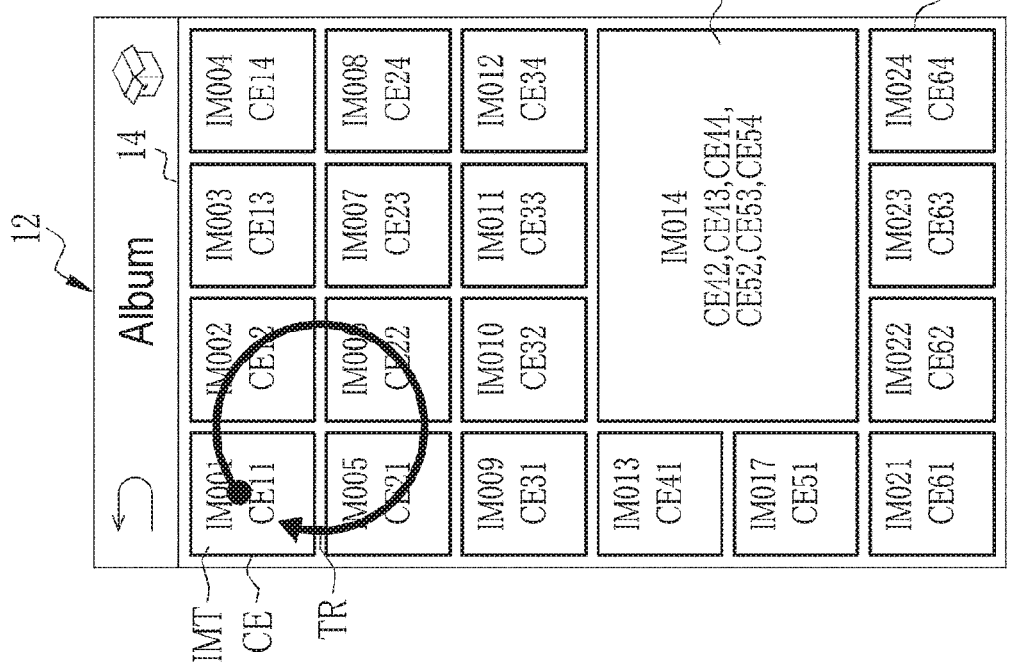

FIGS. 18A and 18B illustrate an example in which an enlargement instruction and enlarged display are performed a plurality of times within the album page 14. FIG. 18A illustrates, like FIG. 17B, a state where the image IM whose image ID is IM014 is displayed in an enlarged view in the enlargement region ER that is formed by combining the image display cells CE of CE42, CE43, CE44, CE52, CE53, and CE54 in the matrix directions. Also illustrated is, as indicated by a trajectory TR, a case where an enlargement instruction is provided by moving the finger F to draw a circle clockwise starting from the image display cell CE of the image IM whose image ID is IM001 and whose address information is CE11 and returning to the image display cell CE of the image IM whose image ID is IM001 via the image display cells CE of CE12, CE22, and CE21. In this case, as illustrated in FIG. 18B, the image IM whose image ID is IM001, which is an enlargement target image IMT, is displayed in an enlarged view in an enlargement region ER that is formed by combining the image display cells CE of CE11, CE12, CE21, and CE22 in the matrix directions.

In FIGS. 18A and 18B, the images IM that are displayed in the image display cells CE of CE12, CE21, and CE22 and whose image IDs are IM002, IM005, and IM006 are to-be-deleted images IMP.

FIGS. 19A and 19B illustrate an example in which an enlarged image IME is designated as an enlargement target image IMT. As indicated by a trajectory TR in FIG. 19A, an enlargement instruction is provided by moving the finger F to draw an oval clockwise starting from the image display cell CE of the enlarged image IME whose image ID is IM014 and whose pieces of address information are CE42, CE43, CE44, CE52, CE53, and CE54 and returning to the image display cell CE of the image IM whose image ID is IM014 via the image display cells CE of CE64, CE63, and CE62. In this case, as illustrated in FIG. 19B, the image IM whose image ID is IM014, which is an enlarged image IME and is an enlargement target image IMT, is displayed in an enlarged view in an enlargement region ER that is formed by combining the image display cells CE of CE42, CE43, CE44, CE52, CE53, CE54, CE62, CE63, and CE64 in the matrix directions.

In FIGS. 19A and 19B, the images IM that are displayed in the image display cells CE of CE62, CE63, and CE64 and whose image IDs are IM022, IM023, and IM024 are to-be-deleted images IMP.

Figures 20A, 20B:
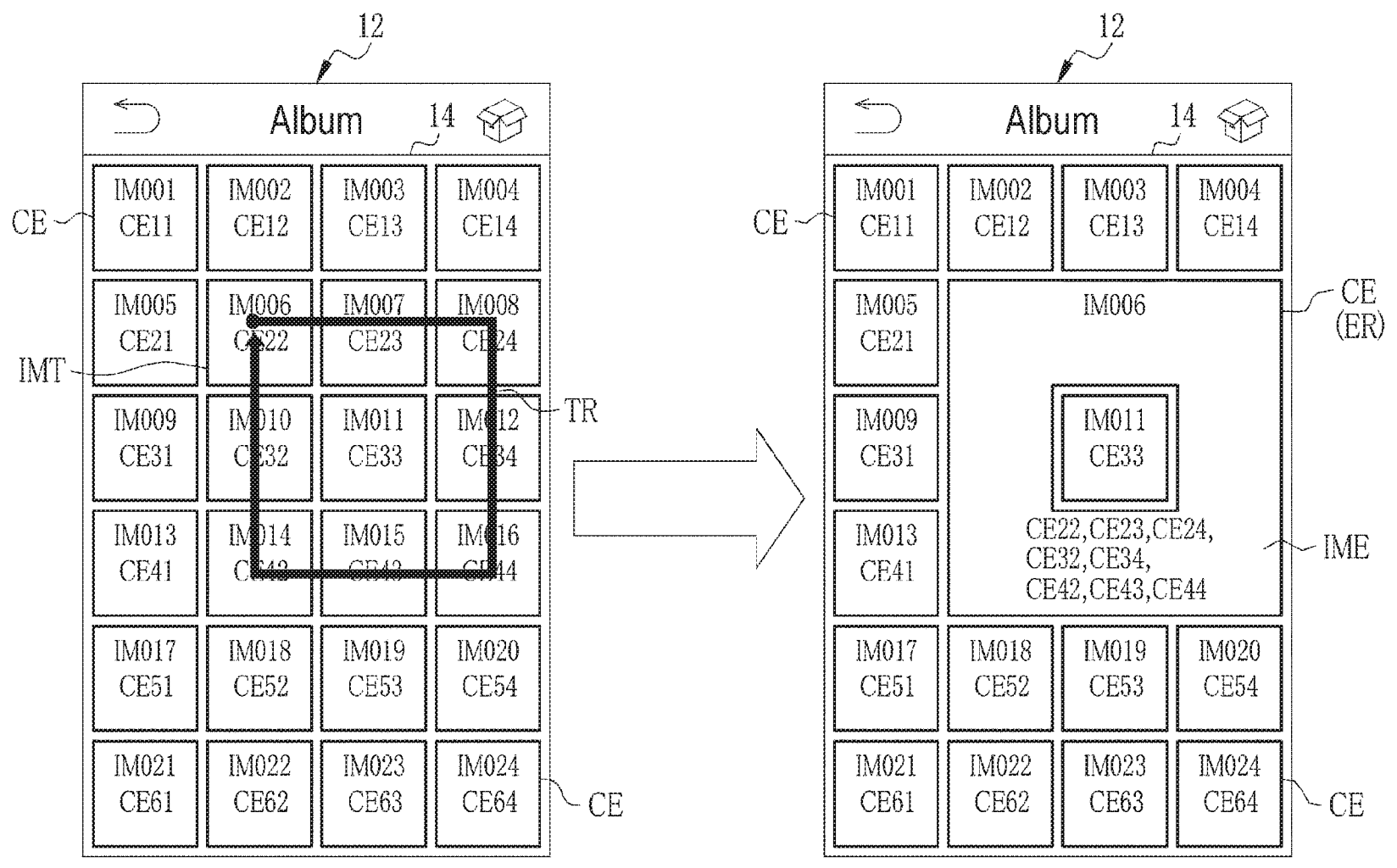

FIGS. 20A and 20B illustrate an example of a case where the finger F is moved along image display cells CE to draw a loop. As indicated by a trajectory TR in FIG. 20A, an enlargement instruction is provided by moving the finger F to draw a square clockwise starting from the image display cell CE of the image IM whose image ID is IM006 and whose address information is CE22 and returning to the image display cell CE of the image IM whose image ID is IM006 via the image display cells CE of CE23, CE24, CE34, CE44, CE43, CE42, and CE32. That is, the finger F is moved along the eight image display cells CE surrounding the image display cell CE of CE33 to draw a loop. In this case, as illustrated in FIG. 20B, the image IM whose image ID is IM006, which is an enlargement target image IMT, is displayed in an enlarged view in a loop-shaped enlargement region ER that is formed by combining the image display cells CE of CE22, CE23, CE24, CE32, CE34, CE42, CE43, and CE44 in the matrix directions.

In FIGS. 20A and 20B, the images IM that are displayed in the image display cells CE of CE23, CE24, CE32, CE34, CE42, CE43, and CE44 and whose image IDs are IM007, IM008, IM010, IM012, IM014, IM015, and IM016 are to-be-deleted images IMP.

Figure 21B:
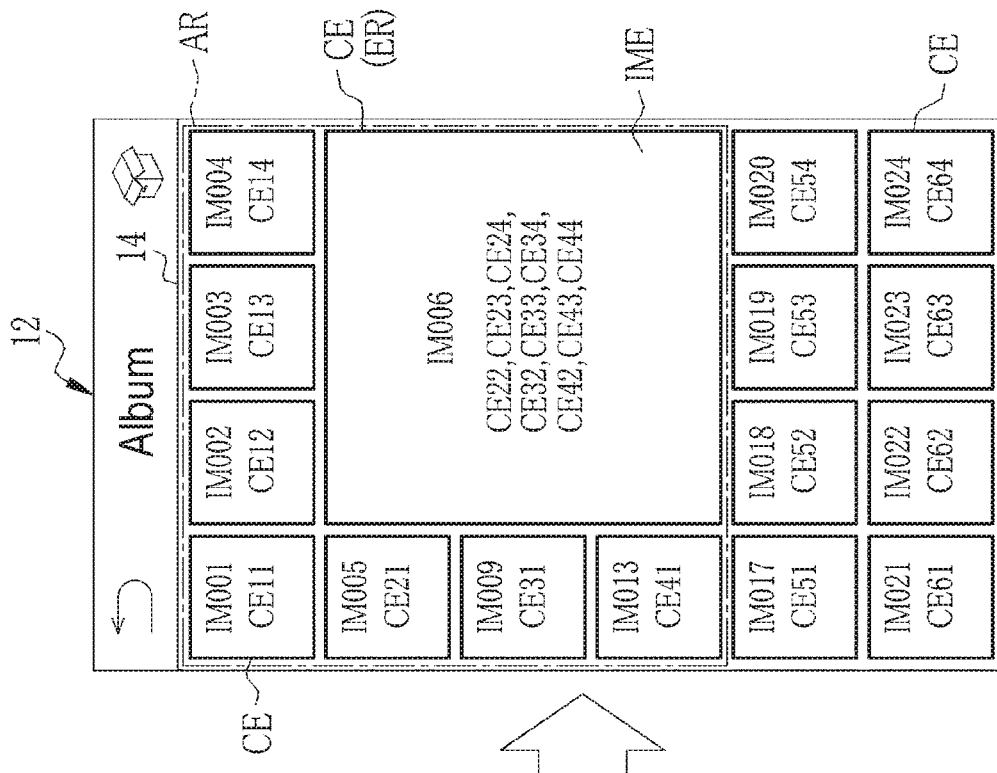
Figure 21A:
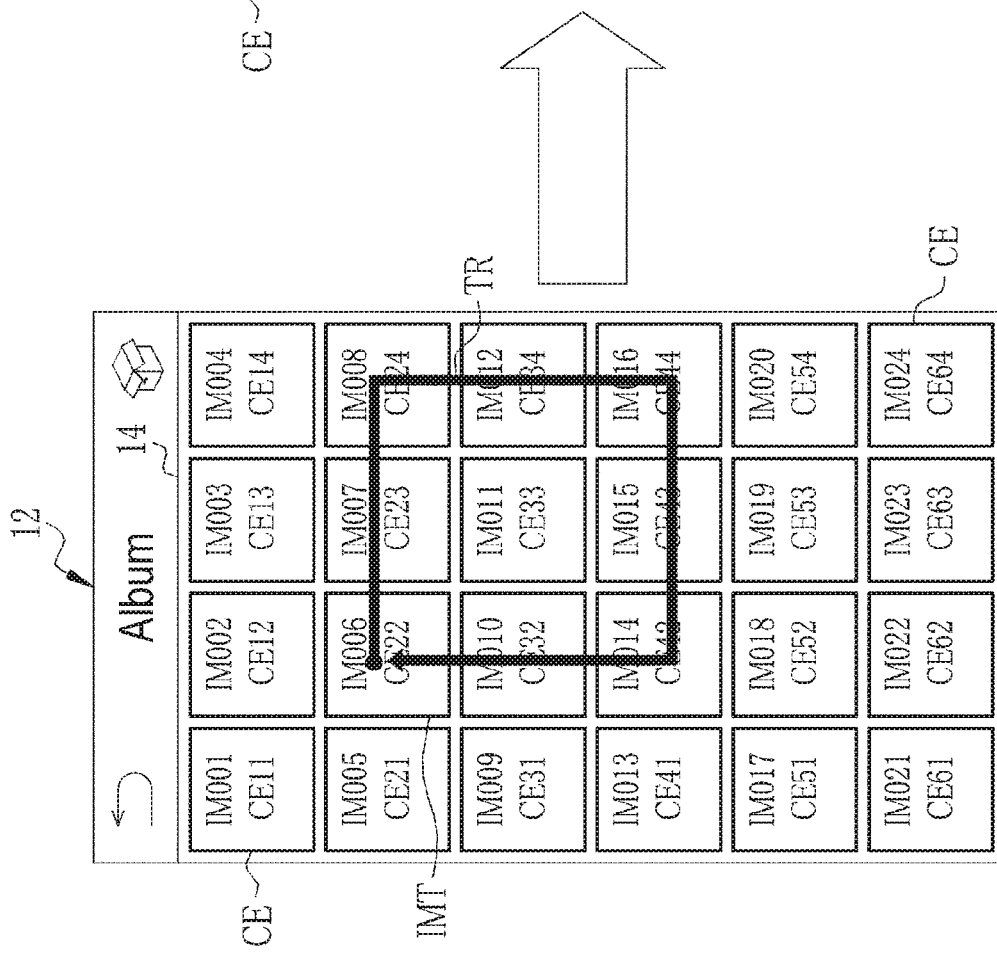

FIGS. 21A and 21B illustrate another example of a case where the finger F is moved along image display cells CE to draw a loop, as in FIGS. 20A and 20B. In FIGS. 20A and 20B, the enlargement region ER is a loop-shaped region, but FIGS. 21A and 21B are different. That is, as illustrated in FIG. 21B, the image IM whose image ID is IM006, which is an enlargement target image IMT, is displayed in an enlarged view in a square-shaped enlargement region ER that is formed by combining the image display cells CE of CE22, CE23, CE24, CE32, CE33, CE34, CE42, CE43, and CE44 in the matrix directions.

In FIGS. 21A and 21B, the images IM that are displayed in the image display cells CE of CE23, CE24, CE32, CE33, CE34, CE42, CE43, and CE44 and whose image IDs are IM007, IM008, IM010, IM011, IM012, IM014, IM015, and IM016 are to-be-deleted images IMP.

Either the mode illustrated in FIGS. 20A and 20B or the mode illustrated in FIGS. 21A and 21B may be adopted. Both the modes illustrated in FIGS. 20A and 20B and FIGS. 21A and 21B may be adopted and switched therebetween in accordance with a selection by the user 11.

As described above, there are variations in enlargement instruction and enlarged display. Thus, an enlargement region ER may have a shape suitable for an image IM, for example, the enlargement region ER may be long in the row direction for an image IM of mountains taken in a panoramic view, or may be long in the column direction for an image IM of a vertically long building taken in a skyward direction.

Although not illustrated, an enlarged image IME may become a to-be-deleted image IMP depending on an enlargement instruction.

The album editing process executed by the album editing unit 36 is not limited to the above-described processes. For example, the album editing process may be a process of changing the display order of image display cells CE in the album page 14, a process of displaying an image IM in the album page 14 in an enlarged view on the entire display 25, a process of performing scroll display of the album page 14, the to-be-deleted image list 50, or the deleted image list 60, or the like.

The process of changing the display order of image display cells CE is executed in response to, for example, a gesture instruction to select the image display cell CE of a desired image IM by using the finger F, display a dialog provided with an option of permitting change of the display order of the image display cell CE, and select the option in the dialog. Also, the process of displaying an image IM in the album page 14 in an enlarged view on the entire display 25 is executed in response to a gesture instruction to select the image display cell CE of a desired image IM by using the finger F, display a dialog provided with an option of displaying the image IM in an enlarged view on the entire display 25, and select the option in the dialog. The scroll display process is executed in response to, for example, a gesture instruction of flicking the inside of the album page 14 or the like in an up-down direction using the finger F (a flick instruction). The user 11 displays a desired image IM in an enlarged view, deletes an unnecessary image IM, or changes the display order of image display cells CE, thereby arranging the images IM in the album page 14 in accordance with his/her preferences.

As representatively illustrated in FIG. 21B, the user 11 is able to designate an electronic album region AR, which is a rectangular region in the album page 14 that is currently displayed on the album screen 12 and store the designated electronic album region AR as a new image IM in the image storage unit 32 or set the image IM as a standby image of the smartphone 10. In addition, the electronic album region AR can be transmitted to a print order reception server on the network 27 so as to be printed.

The electronic album region AR has a row-direction width that is fixed as in the album page 14 and has a column-direction width that is variable. In addition, the electronic album region AR can be moved in the column direction in units of unit cells UCE.

Figure 22:
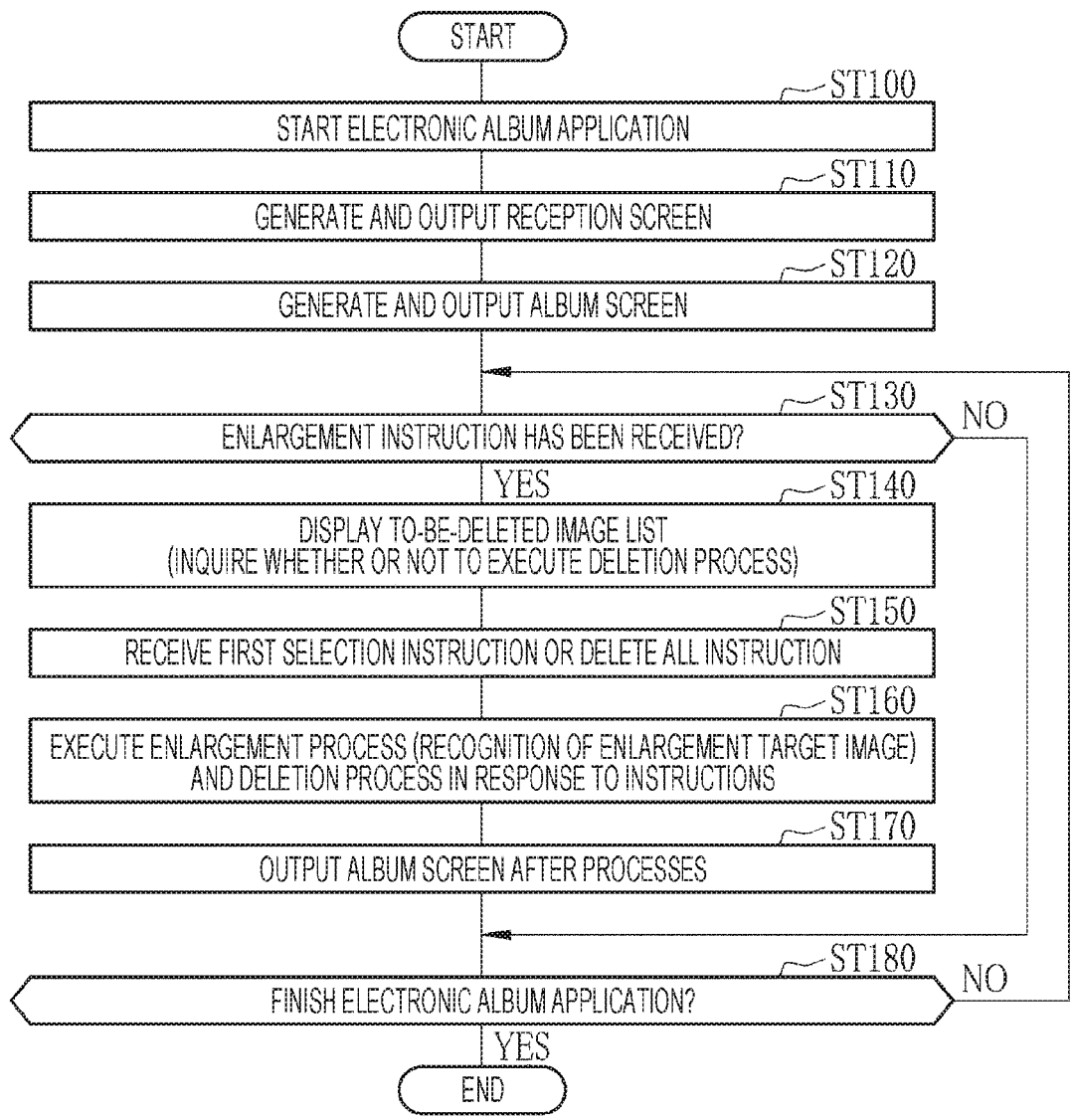
FIG. 22 is a flowchart illustrating a process procedure of the smartphone functioning as an electronic album apparatus.

Next, the function of the smartphone 10 having the above-described configuration will be described with reference to the flowchart in FIG. 22. First, in step ST100, upon startup of the electronic album application 30, the instruction receiving unit 35 and the album editing unit 36 are established in the CPU 22 as illustrated in FIG. 3. Accordingly, the smartphone 10 functions as an electronic album apparatus.

After the startup of the electronic album application 30, a reception screen is generated by the screen generating unit 40 and is output to the display 25 (step ST110). In a case where no particular designation is given on the reception screen, all the images IM are read out from the image storage unit 32 by the album editing unit 36 and are arranged in the album page 14. On the other hand, in a case where an attribute is designated on the reception screen, images IM having the designated attribute are searched for in the image storage unit 32 by the album editing unit 36, and the images IM obtained through the search are arranged in the album page 14. In this way, the album screen 12 including the album page 14 in which a plurality of images IM are arranged is generated by the screen generating unit 40 and is output to the display 25 as illustrated in FIG. 1 and so forth (step ST120, a screen generation step).

The instruction receiving unit 35 waits for a swipe instruction of moving one finger F of the user 11 within the album page 14, which is an enlargement instruction (step ST130). When an enlargement instruction is received by the instruction receiving unit 35 (YES in step ST130, an instruction reception step), the to-be-deleted image list 50 is displayed on the album screen 12 by the inquiring unit 43 as illustrated in FIG. 10 (step ST140, an inquiry step).

A first selection instruction to select a to-be-deleted image IMP to be kept in the album page 14 without executing a deletion process, or a delete all instruction to delete all the to-be-deleted images IMP from the album page 14 by executing a deletion process is provided through the to-be-deleted image list 50 and is received by the inquiring unit 43 (step ST150). The enlargement processing unit 41 and the deletion processing unit 42 execute an enlargement process (recognition of an enlargement target image IMT) and a deletion process in response to the enlargement instruction and the first selection instruction or the delete all instruction (step ST160, a recognition step and an album editing step). For example, as illustrated in FIG. 8B and so forth, the enlargement processing unit 41 displays the enlarged image IME in an enlarged view in the enlargement region ER. In addition, the deletion processing unit 42 executes a deletion process on a to-be-deleted image IMP for which the first selection instruction has not been received by the inquiring unit 43 through the to-be-deleted image list 50, or on all the to-be-deleted images IMP in a case where the delate all instruction has been received.

The album editing unit 36 outputs the album screen 12 to the display 25 after the enlargement process and the deletion process (step ST170). The series of steps ST130 to ST170 are repeated until the electronic album application 30 is finished (YES in step ST180).

As described above, in the smartphone 10 functioning as an electronic album apparatus, the to-be-deleted image list 50 is displayed before executing a deletion process of deleting, from the album page 14, a to-be-deleted image IMP that overlaps the enlargement region ER of the enlargement target image IMT, and whether or not to execute a deletion process on the to-be-deleted image IMP is inquired through the to-be-deleted image list 50, which is user-friendly compared with a case where the to-be-deleted image IMP is deleted without any notice to the user 11.

The to-be-deleted image list 50 includes to-be-deleted images IMP that are compactly arranged. Thus, in a case where a first selection instruction to select a to-be-deleted image IMP to be kept in the album page 14 without executing a deletion process is received through the to-be-deleted image list 50, the user 11 is able to easily provide the first selection instruction.

In a case where there is an image to be kept in the album page 14 among to-be-deleted images IMP, a first selection instruction may be provided through the to-be-deleted image list 50. On the other hand, in a case where the to-be-deleted images IMP are images IM having similar content consecutively captured at the same shooting location, a delete all instruction is provided. Accordingly, the images IM having similar content can be collectively and easily deleted from the album page 14, and the images IM in the album page 14 can be efficiently sorted.

In the album page 14, image display cells CE whose size is changed to a positive integral multiple of a unit cell UCE are arranged in a grid pattern on the basis of unit cells UCE. The enlargement region ER of the enlargement target image IMT is a region having a size that is a positive integral multiple of a unit cell UCE. Thus, images IM can be neatly displayed on the album page 14.

The instruction receiving unit 35 receives, as an enlargement instruction, a swipe instruction of moving one finger F along the enlargement region ER within the album page 14 starting from the enlargement target image IMT. Such a swipe instruction enables a relatively specific instruction to be provided, and is thus particularly effective in the case of using a mobile information terminal having the display 25 with a relatively small size, such as the smartphone 10, as an electronic album apparatus.

In the to-be-deleted image list 50 illustrated in FIG. 10, the inquiring unit 43 receives a first selection instruction to select a to-be-deleted image IMP to be kept in the album page 14 without executing a deletion process. In contrast, in a to-be-deleted image list 65 illustrated in FIG. 23, the inquiring unit 43 receives a second selection instruction to select a to-be-deleted image IMP to be deleted from the album page 14 by executing a deletion process, instead of the first selection instruction.

Figure 23:
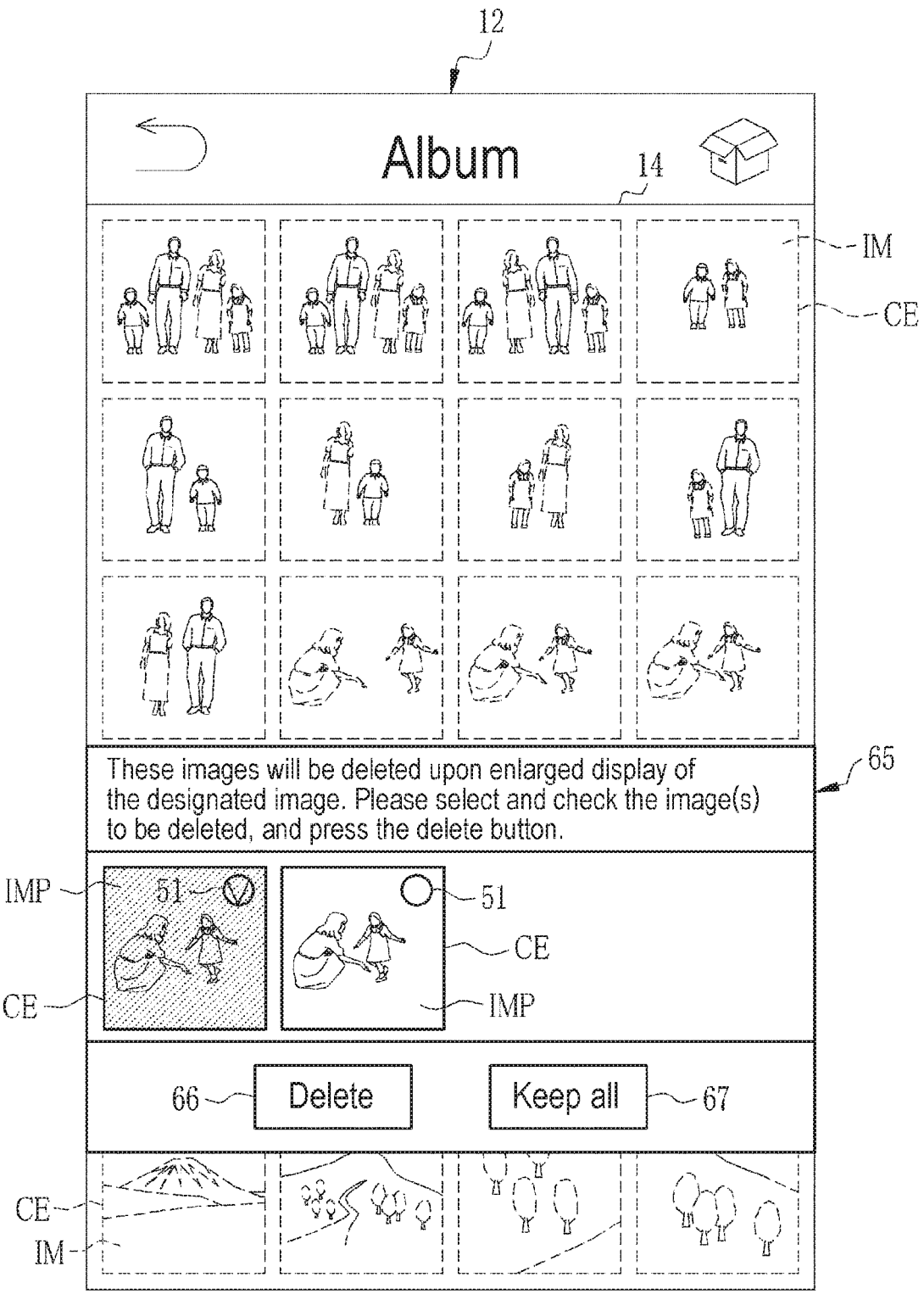
FIG. 23 is a diagram illustrating another example of a to-be-deleted image list.

In FIG. 23, at the upper portion of the to-be-deleted image list 65, a message is displayed promoting selection of a to-be-deleted image IMP to be deleted from the album page 14 by executing a deletion process, that is, promoting a second selection instruction, instead of the message promoting a first selection instruction in the to-be-deleted image list 50. In addition, the to-be-deleted image list 65 is provided with a delete button 66 and a keep all button 67, instead of the keep button 52 and the delete all button 53 in the to-be-deleted image list 50.

When the image display cell CE of a to-be-deleted image IMP to be deleted from the album page 14 is selected and the delete button 66 is selected, the inquiring unit 43 receives a second selection instruction. That is, the inquiring unit 43 receives, through the to-be-deleted image list 65, a second selection instruction to select a to-be-deleted image IMP to be deleted from the album page 14 by executing of a deletion process.

On the other hand, when the keep all button 67 is selected, the inquiring unit 43 receives a keep all instruction to keep all the to-be-deleted images IMP in the album page 14 without executing a deletion process on all the to-be-deleted images IMP. The deletion processing unit 42 executes a deletion process on the to-be-deleted image IMP for which the second selection instruction has been received by the inquiring unit 43 through the to-be-deleted image list 65. On the contrary, the deletion processing unit 42 does not execute a deletion process on the to-be-deleted image IMP for which the second selection instruction has not been received by the inquiring unit 43 or on all the to-be-deleted images IMP if a keep all instruction has been received.

In this way, the instruction received by the inquiring unit 43 may be either a first selection instruction or a second selection instruction. Alternatively, the delete all button 53 in the to-be-deleted image list 50 may be provided in the to-be-deleted image list 65. Conversely, the keep all button 67 in the to-be-deleted image list 65 may be provided in the to-be-deleted image list 50.

In a second embodiment and a third embodiment described below, a first evaluation value indicating whether to execute a deletion process is obtained for each to-be-deleted image IMP, and the to-be-deleted image IMP is displayed in a display format corresponding to the first evaluation value in the to-be-deleted image list. Second Embodiment In the second embodiment illustrated in FIG. 24 to FIG. 31, only a to-be-deleted image IMP whose first evaluation value is within a preset first range is displayed on the to-be-deleted image list.

Figure 24:
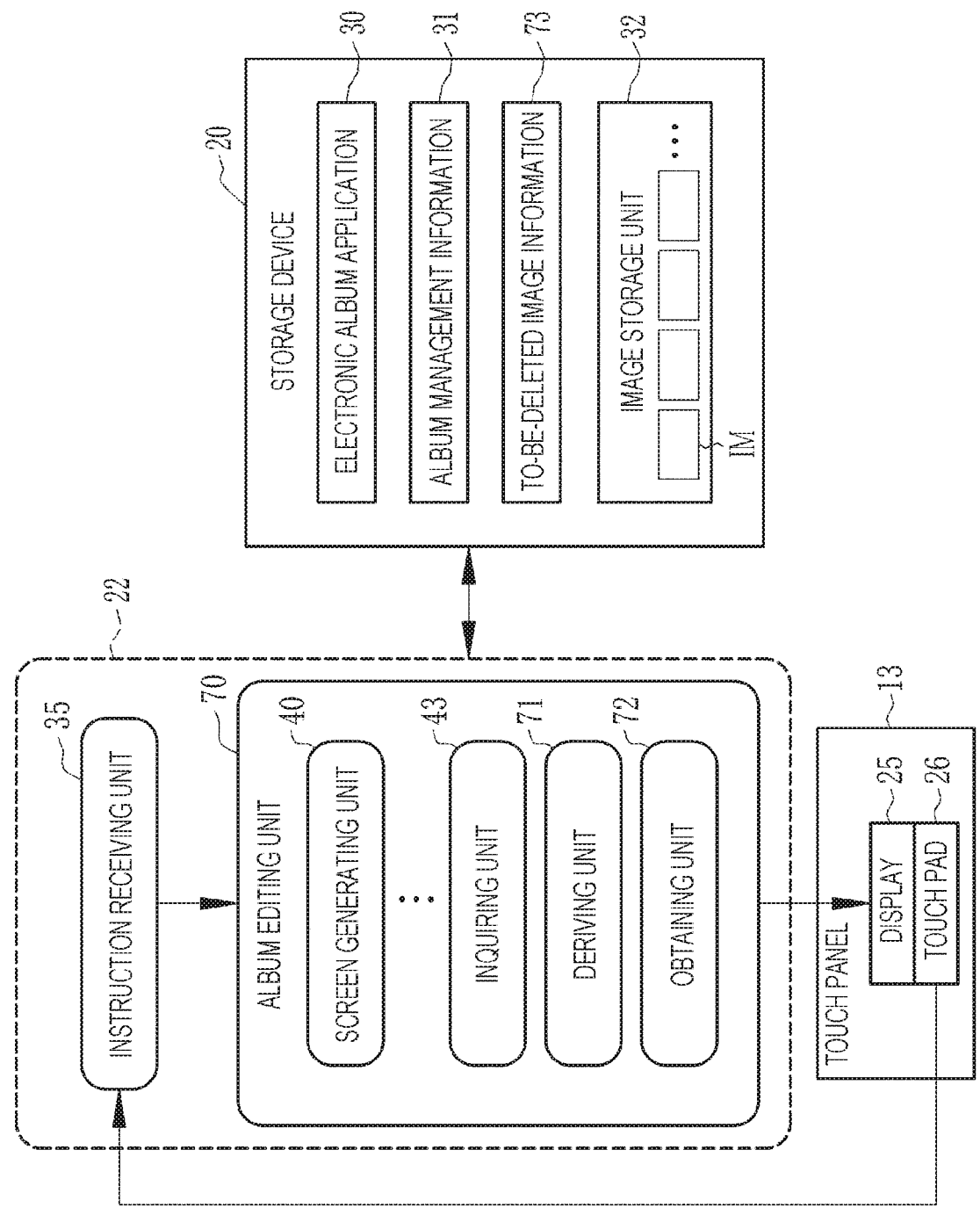
FIG. 24 is a block diagram of a storage device and CPU of a smartphone according to a second embodiment.

In FIG. 24, an album editing unit 70 according to this embodiment includes, in addition to the individual units 40 to 43 according to the above-described first embodiment (the enlargement processing unit 41 and the deletion processing unit 42 are not illustrated), a deriving unit 71 that derives a first evaluation value and an obtaining unit 72 that obtains the first evaluation value. The storage device 20 stores to-be-deleted image information 73 in addition to the electronic album application 30 and so forth.

Figure 25:
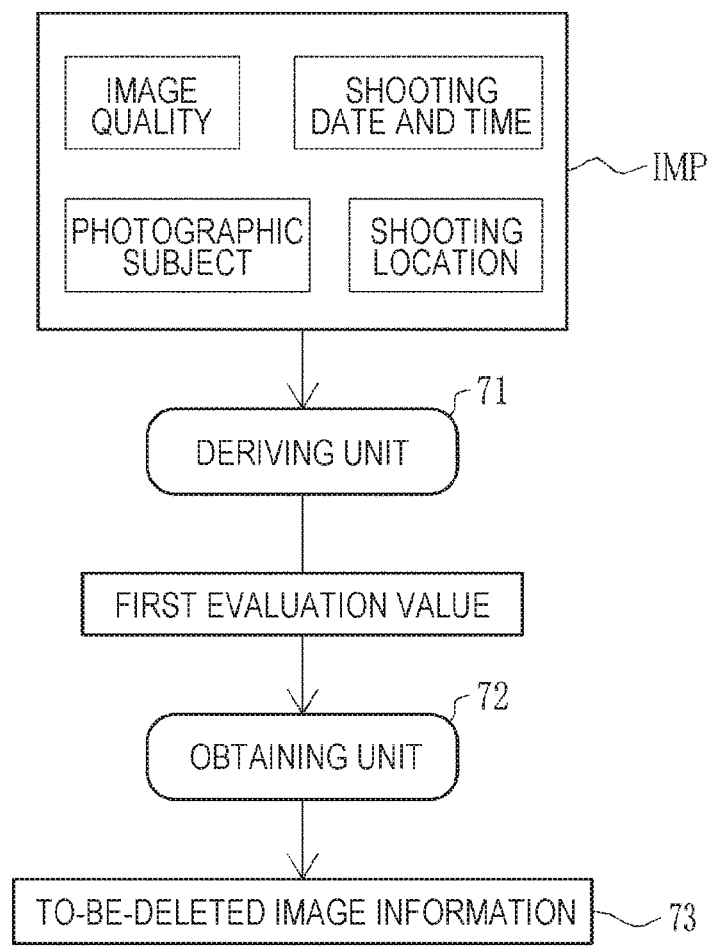
FIG. 25 is a diagram for describing the functions of a deriving unit and an obtaining unit.

As illustrated in FIG. 25, the deriving unit 71 derives a first evaluation value on the basis of at least any one of the image quality of the to-be-deleted image IMP, the photographic subject of the to-be-deleted image IMP, the shooting date and time of the to-be-deleted image IMP, or the shooting location of the to-be-deleted image IMP. The deriving unit 71 outputs the first evaluation value to the obtaining unit 72. The obtaining unit 72 obtains the first evaluation value from the deriving unit 71 and then stores the obtained first evaluation value in the to-be-deleted image information 73.

The deriving unit 71 derives a first evaluation value in which, for example, a minimum score is 0 and a maximum score is 10. Thus, as the first evaluation value is closer to 10, the to-be-deleted image IMP has a higher priority of being subjected to a deletion process, that is, being deleted from the album page 14. Conversely, as the first evaluation value is closer to 0, the to-be-deleted image IMP has a lower priority of being subjected to a deletion process, in other words, has a higher priority of being kept in the album page 14 without executing a deletion process.

In derivation of a first evaluation value based on the image quality, it is determined whether or not the brightness, saturation, tint, unsharpness, blur, composition, and the like of the to-be-deleted image IMP are appropriate. In a case where it is determined that these are appropriate, the first evaluation value is decreased. In a case where it is determined that these are not appropriate, the first evaluation value is increased.

In derivation of a first evaluation value based on the photographic subject, for example, the face of a person in the to-be-deleted image IMP is extracted. In a case where the extracted person is not a specific person registered in advance, the first evaluation value is increased. In a case where the number of faces of persons extracted is smaller than a preset threshold value and/or in a case where the face of a person extracted is smaller than a preset threshold value, the first evaluation value is increased. Furthermore, in a case where the face of a person extracted is not full-faced and/or in a case where the face of a person extracted is not located at the center portion of the to-be-deleted image IMP, the first evaluation value is increased.

In derivation of a first evaluation value based on the shooting date and time or the shooting location, for example, the first evaluation value is increased in a case where an image IM whose shooting date and time or shooting location is substantially the same as that of the to-be-deleted image IMP is displayed on the album page 14. Such a method for deriving a first evaluation value is known as described in, for example, JP5655112B, and thus the detailed description thereof is omitted.

As illustrated in FIG. 26, the to-be-deleted image information 73 includes the image IDs of individual to-be-deleted images IMP stored in association with the first evaluation values. FIG. 26 illustrates an example of the to-be-deleted image information 73 including the first evaluation values of eight to-be-deleted images IMP whose image IDs are IM050 to IM057. It is understood from this example that the to-be-deleted image IMP whose image ID is IM050 has a first evaluation value of 9.8, which is closest to 10, and has the highest priority of being subjected to a deletion process. In contrast, it is understood that the to-be-deleted image IMP whose image ID is IM056 has a first evaluation value of 1.9, which is closest to 0, and has the lowest priority of being subjected to a deletion process, in other words, has the highest priority of being kept in the album page 14.

Figure 27:
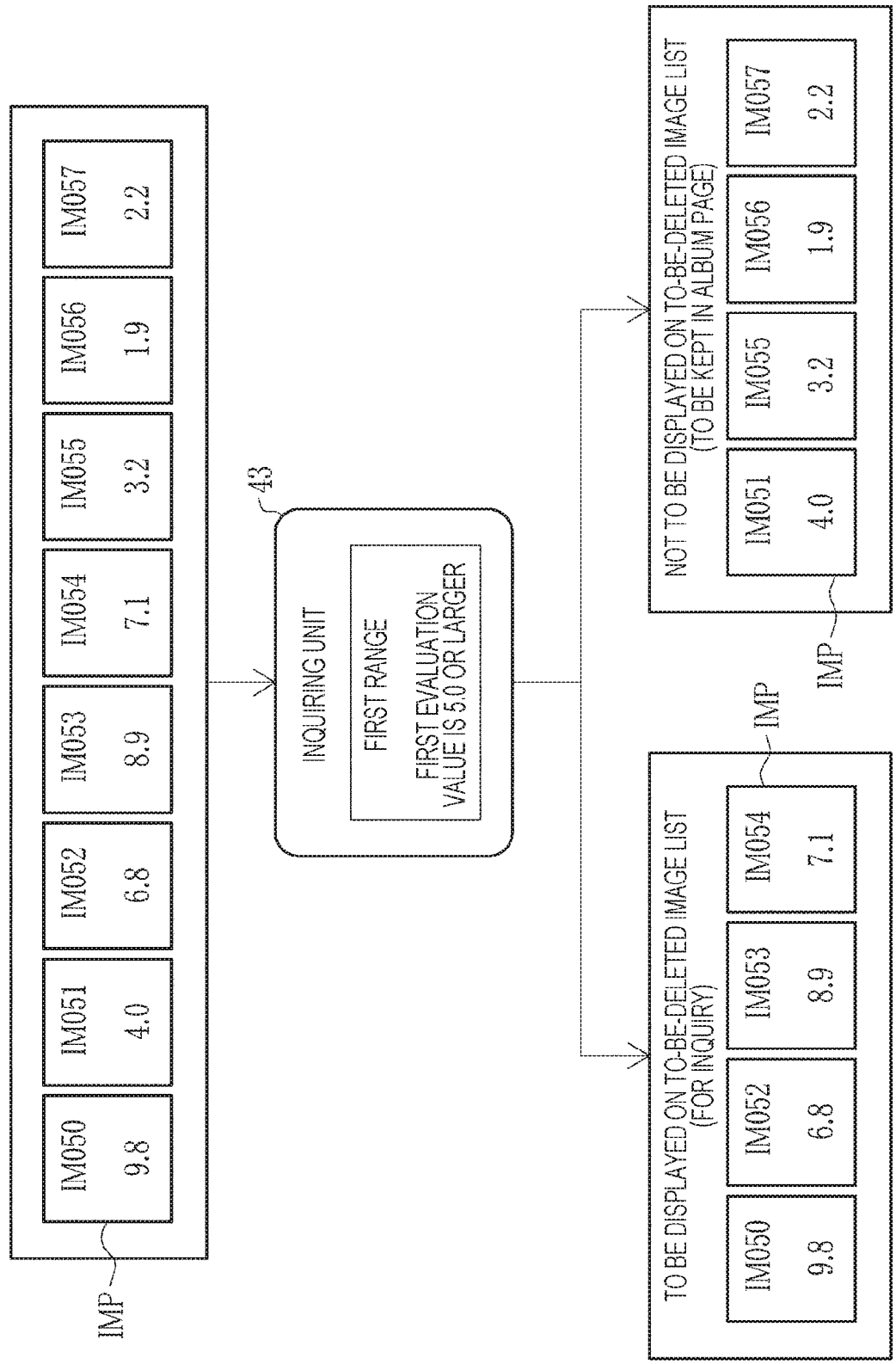
FIG. 27 is a diagram illustrating a state where an inquiring unit determines whether or not to display individual to-be-deleted images on a to-be-deleted image list on the basis of first evaluation values and a first range.

As illustrated in FIG. 27, the inquiring unit 43 determines, on the basis of the first evaluation values and the preset first range, whether or not to display the individual to-be-deleted images IMP on the to-be-deleted image list 50. That is, the inquiring unit 43 determines to display a to-be-deleted image IMP whose first evaluation value is within the first range on the to-be-deleted image list 50 and determines not to display a to-be-deleted image IMP whose first evaluation value is out of the first range on the to-be-deleted image list 50. The to-be-deleted image IMP determined by the inquiring unit 43 not to be displayed on the to-be-deleted image list 50 is kept in the album page 14.

FIG. 27 illustrates a state where a first evaluation value of 5.0 or larger is set as the first range and it is determined whether or not to display each of the to-be-deleted images IMP whose image IDs are IM050 to IM057 illustrated in FIG. 26 on the to-be-deleted image list 50. The to-be-deleted images IMP whose image IDs are IM050, IM052, IM053, and IM054 and whose first evaluation values are larger than or equal to 5.0 and are within the first range are determined to be displayed on the to-be-deleted image list 50. On the other hand, the to-be-deleted images IMP whose image IDs are IM051, IM055, IM056, and IM057 and whose first evaluation values are smaller than 5.0 and are out of the first range are determined not to be displayed on the to-be-deleted image list 50.

Figure 28:
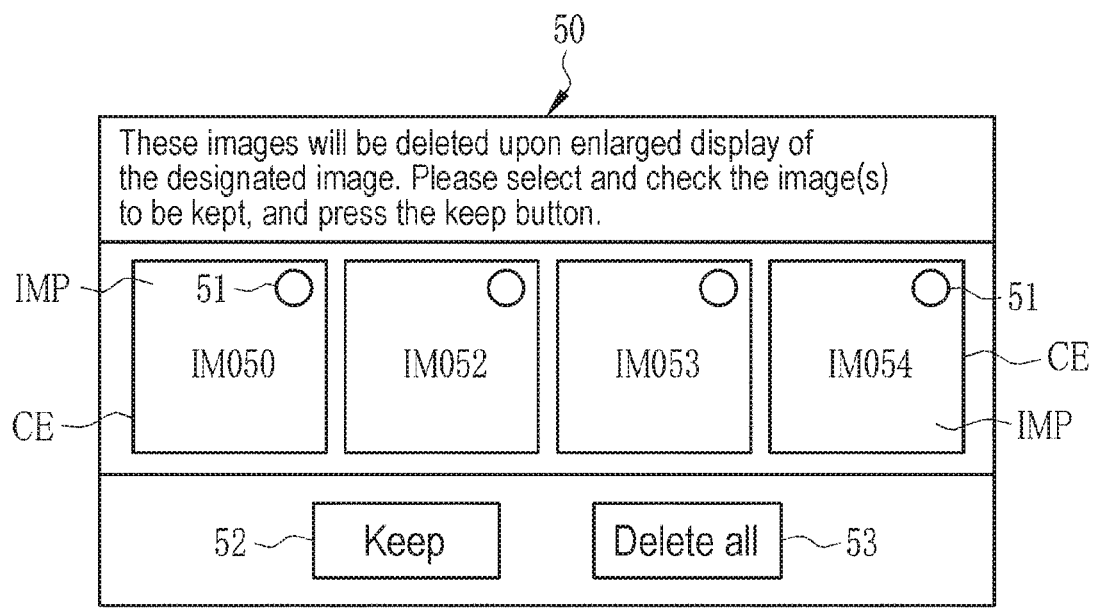
FIG. 28 is a diagram illustrating a to-be-deleted image list displaying only to-be-deleted images whose first evaluation values are within the first range.

In FIG. 28, only the to-be-deleted images IMP determined to be displayed by the inquiring unit 43 are displayed on the to-be-deleted image list 50. The to-be-deleted image list 50 in FIG. 28 is an example of the case illustrated in FIG. 26 and FIG. 27. Thus, only the to-be-deleted images IMP whose image IDs are IM050, IM052, IM053, and IM054 are displayed.

In this way, only the to-be-deleted images IMP whose first evaluation values are within the first range are displayed on the to-be-deleted image list 50. Thus, the number of to-be-deleted images IMP as candidates in a first selection instruction is decreased, and the burden of the user 11 who provides the first selection instruction can be reduced.

In such a case where the first range is defined as a certain value or larger, a to-be-deleted image IMP whose first evaluation value is within the first range has higher priority of being subjected to a deletion process so as to be deleted from the album page 14 than a to-be-deleted image IMP whose first evaluation value is out of the first range. Thus, it is estimated that, on the to-be-deleted image list 50, a first selection instruction to keep an image in the album page 14 without executing a deletion process is less likely to be provided, and the delete all button 53 will be selected in many cases. Also from this point of view, it is considered that the burden of the user 11 can be reduced.

The display order of the image display cells CE of the to-be-deleted images IMP in the to-be-deleted image list 50 may be determined in accordance with the first evaluation values, for example, the image display cells CE of the to-be-deleted images IMP may be arranged in ascending order of the first evaluation value.

In a case where it is determined that the first evaluation values of all the to-be-deleted images IMP are out of the first range and that all the to-be-deleted images IMP are not to be displayed on the to-be-deleted image list 50, it is not necessary to display the to-be-deleted image list 50. Alternatively, as in the above-described first embodiment, all the to-be-deleted images IMP may be displayed on the to-be-deleted image list 50, and the user 11 may be allowed to determine whether or not to delete the to-be-deleted images IMP.

Figure 29:
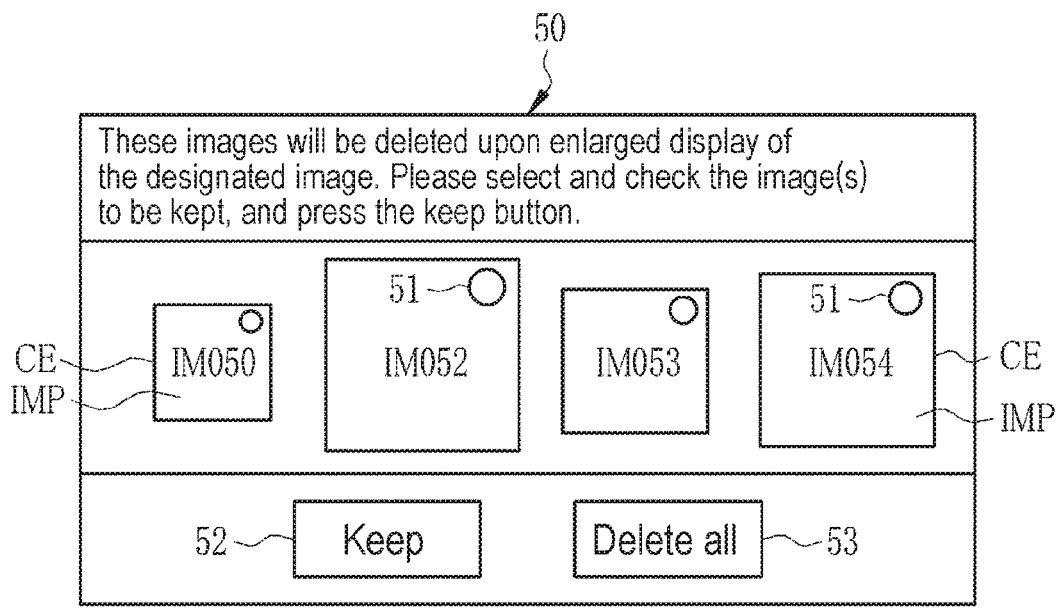
FIG. 29 is a diagram illustrating a to-be-deleted image list displaying to-be-deleted images in a display format in which the magnitudes of first evaluation values are identifiable.

As illustrated in FIG. 29, on the to-be-deleted image list 50, the to-be-deleted images IMP (image display cells CE) may be displayed in a display format in which the magnitudes of the first evaluation values are identifiable by increasing or decreasing the size of each to-be-deleted image IMP in accordance with the magnitude of the first evaluation value. Specifically, the inquiring unit 43 increases the size of the image display cell CE of the to-be-deleted image IMP as the first evaluation value decreases.

The to-be-deleted image list 50 in FIG. 29 is an example of the case illustrated in FIG. 26 and FIG. 27, like FIG. 28. Thus, the size of the image display cell CE of the to-be-deleted image IMP whose image ID is IM050 and whose first evaluation value is the largest is the smallest. The size increases in the order of the to-be-deleted image IMP whose image ID is IM053 and the to-be-deleted image IMP whose image ID is IM054, and the size of the image display cell CE of the to-be-deleted image IMP whose image ID is IM052 and whose first evaluation value is the smallest is the largest.

As a result of displaying the to-be-deleted images IMP in a display format in which the magnitudes of the first evaluation values are identifiable, the magnitudes of the first evaluation values are obvious. The first evaluation value is important information for the user 11 to provide a first selection instruction. Thus, when the magnitudes of the first evaluation values are obvious, a first selection instruction can be smoothly provided.

Contrary to FIG. 29, the size of the image display cell CE of the to-be-deleted image IMP may be increased as the first evaluation value increases. However, the to-be-deleted image list 50 receives a first selection instruction to select a to-be-deleted image IMP to be kept in the album page 14 without executing a deletion process. Thus, on the to-be-deleted image list 50, it is preferable to increase the size of the image display cell CE of the to-be-deleted image IMP which has a smaller first evaluation value and is to be kept in the album page 14 and for which a first selection instruction is more likely to be provided.

The display transparency of the to-be-deleted image IMP having a large first evaluation value may be increased so that the to-be-deleted image IMP is transparently displayed. Alternatively, the image display cell CE may be bordered and the color of the border may be changed in accordance with the first evaluation value, and thereby the to-be-deleted image IMP may be displayed in a display format in which the magnitude of the first evaluation value is identifiable. The first evaluation value may be displayed on the to-be-deleted image list 50.

Figure 30:
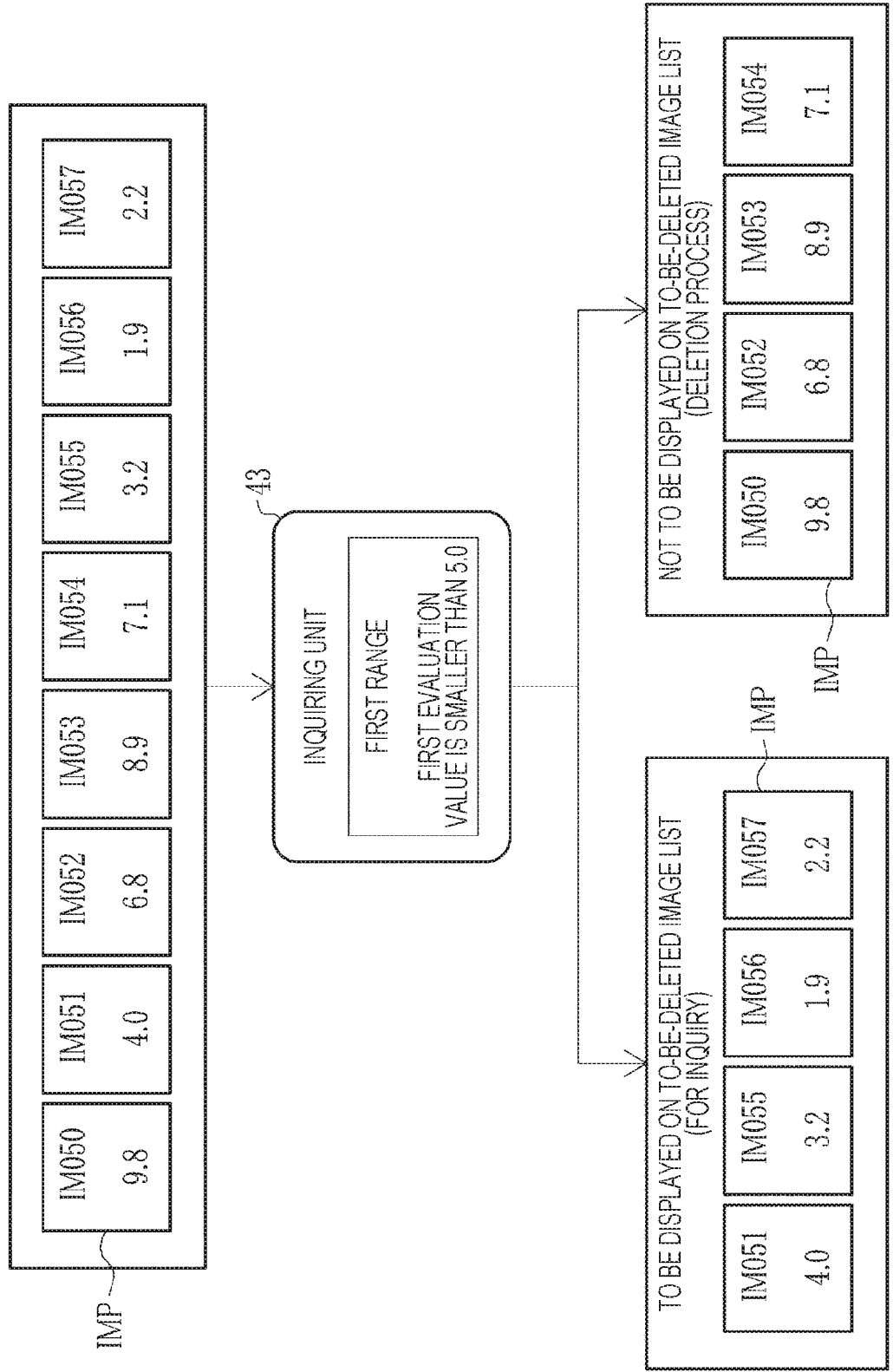
FIG. 30 is a diagram illustrating another example of a state where the inquiring unit determines whether or not to display individual to-be-deleted images on a to-be-deleted image list on the basis of first evaluation values and a first range.

The to-be-deleted image list 65 for receiving a second selection instruction illustrated in FIG. 23 may be used instead of the to-be-deleted image list 50. In this case, as illustrated in FIG. 30, for example, the first range of the first evaluation value is smaller than 5.0 contrary to the case in FIG. 27, and the to-be-deleted image IMP displayed on the to-be-deleted image list 65 is an image to be kept in the album page 14. In addition, in this case, the to-be-deleted image IMP determined not to be displayed on the to-be-deleted image list 65 by the inquiring unit 43 is subjected to a deletion process by the deletion processing unit 42.

Figure 31:
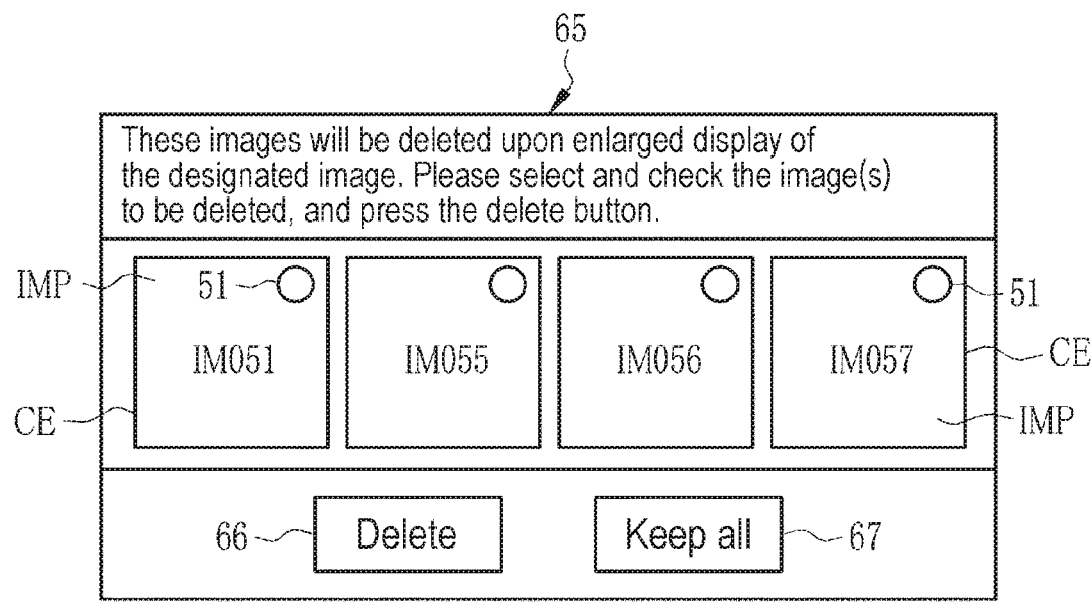
FIG. 31 is a diagram illustrating another example of a to-be-deleted image list displaying only to-be-deleted images whose first evaluation values are within the first range.

In this case, as illustrated in FIG. 31, only the to-be-deleted images IMP whose image IDs are IM051, IM055, IM056, and IM057 and whose first evaluation values are smaller than 5.0 and are within the first range are displayed on the to-be-deleted image list 65.

Also in the mode illustrated in FIG. 30 and FIG. 31, it is estimated that, on the to-be-deleted image list 65, a second selection instruction to delete an image from the album page 14 by executing a deletion process is less likely to be provided and the keep all button 67 will be selected in many cases. Thus, it is considered that the burden of the user 11 can be reduced.

The mode of displaying the to-be-deleted images IMP in a display format in which the magnitudes of the first evaluation values are identifiable, illustrated in FIG. 29, may be applied to the to-be-deleted image list 65 in FIG. 31.

Third Embodiment

Figure 32:
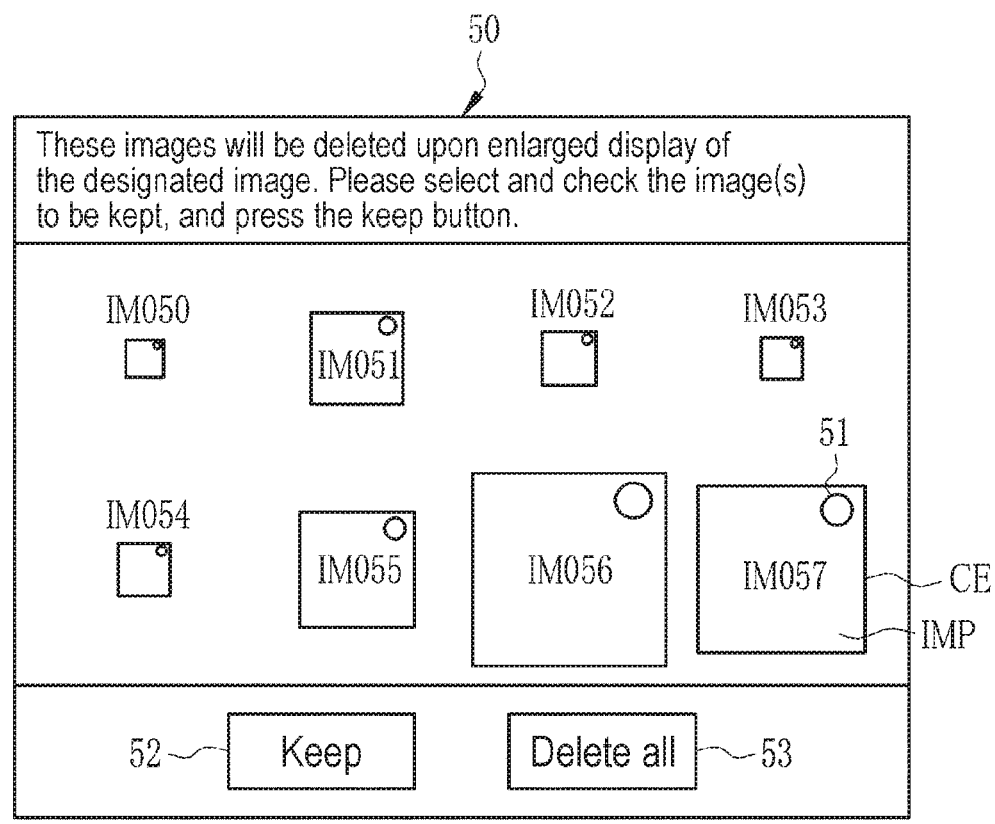
FIG. 32 is a diagram illustrating a to-be-deleted image list displaying all to-be-deleted images such that the size of the image display cell of a to-be-deleted image increases as the first evaluation value decreases.

In the third embodiment illustrated in FIG. 32, the inquiring unit 43 displays all the to-be-deleted images IMP on the to-be-deleted image list 50 in a display format in which the magnitudes of the first evaluation values are identifiable.

In FIG. 32, all the to-be-deleted images IMP are displayed on the to-be-deleted image list 50. As in the mode illustrated in FIG. 29, the size of the image display cell CE of each to-be-deleted image IMP increases as the first evaluation value decreases. The to-be-deleted image list 50 in FIG. 32 is an example of the case illustrated in FIG. 26 and FIG. 27, like FIG. 28, FIG. 29, and FIG. 31. Thus, the size of the image display cell CE of the to-be-deleted image IMP whose image ID is IM050 and whose first evaluation value is the largest is the smallest, and the size of the image display cell CE of the to-be-deleted image IMP whose image ID is IM056 and whose first evaluation value is the smallest is the largest.

In this way, all the to-be-deleted images IMP are displayed in a display format in which the magnitudes of the first evaluation values are identifiable. Thus, the magnitudes of the first evaluation values are obvious, and a first selection instruction can be smoothly provided as in the case of FIG. 29.

As in the above-described first embodiment, the user 11 is allowed to determine whether or not to delete a to-be-deleted image IMP. Thus, as in the above-described second embodiment, the situation can be prevented from occurring where the to-be-deleted image IMP determined not to be displayed on the to-be-deleted image list 50 by the inquiring unit 43 is kept in the album page 14 regardless of the intention of the user 11, or where the to-be-deleted image IMP determined not to be displayed on the to-be-deleted image list 65 by the inquiring unit 43 is deleted from the album page 14 regardless of the intention of the user 11.

Figure 33:
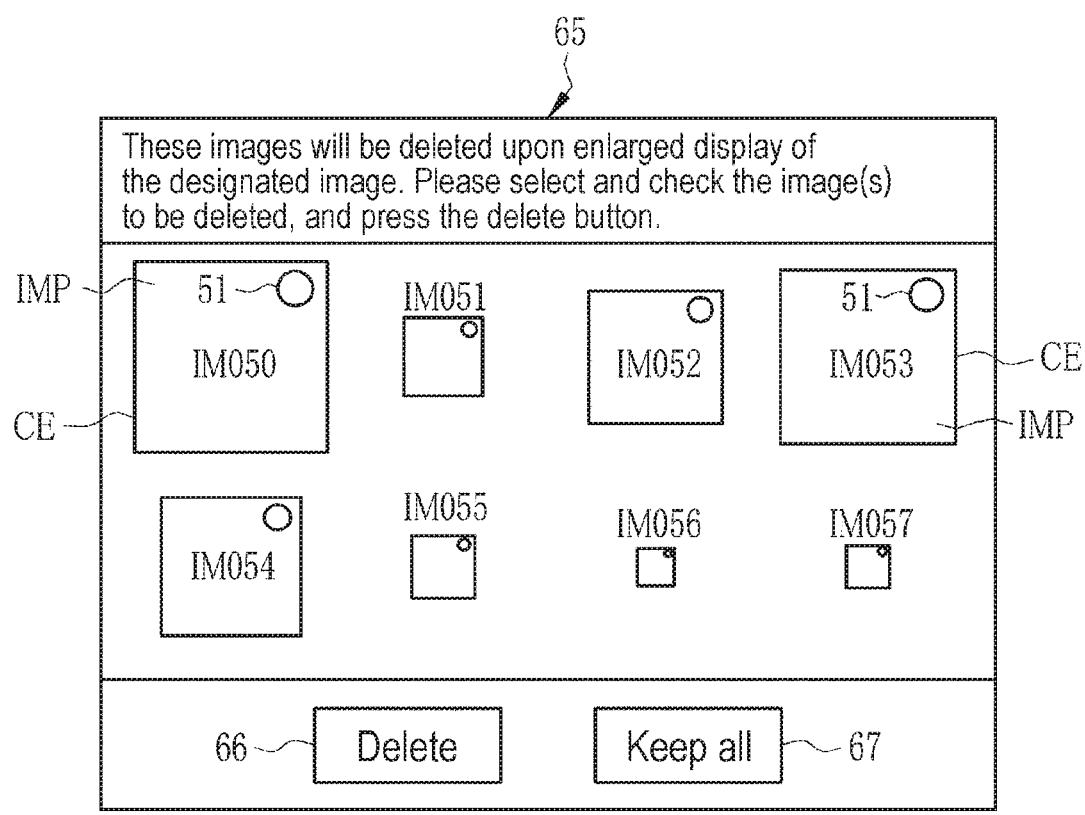
FIG. 33 is a diagram illustrating a to-be-deleted image list displaying all to-be-deleted images such that the size of the image display cell of a to-be-deleted image increases as the first evaluation value increases.

As illustrated in FIG. 33, the to-be-deleted image list 65 may be used instead of the to-be-deleted image list 50. In this case, contrary to FIG. 32, the size of the image display cell CE of the to-be-deleted image IMP increases as the first evaluation value increases. The to-be-deleted image list 65 in FIG. 33 is an example of the case illustrated in FIG. 26 and FIG. 27, like FIG. 28, FIG. 29, FIG. 31, and FIG. 32. Thus, the size of the image display cell CE of the to-be-deleted image IMP whose image ID is IM050 and whose first evaluation value is the largest is the largest, and the size of the image display cell CE of the to-be-deleted image IMP whose image ID is IM056 and whose first evaluation value is the smallest is the smallest.

In the above-described second and third embodiments, a first evaluation value indicating whether or not to execute a deletion process is used. Instead of the first evaluation value, a second evaluation value indicating whether or not to be kept in the album page 14 without executing a deletion process may be used.

The second evaluation value is a value indicating the scale of value fully opposite to the first evaluation value. Thus, for example, derivation of a second evaluation value based on the image quality is fully opposite to the description of the first evaluation value given above, for example, the second evaluation value is increased in a case where it is determined that the brightness, saturation, tint, unsharpness, blur, composition, and the like of the to-be-deleted image IMP are appropriate, whereas the second evaluation value is decreased in a case where it is determined that the brightness, saturation, tint, unsharpness, blur, composition, and the like of the to-be-deleted image IMP are inappropriate.

Figure 34:
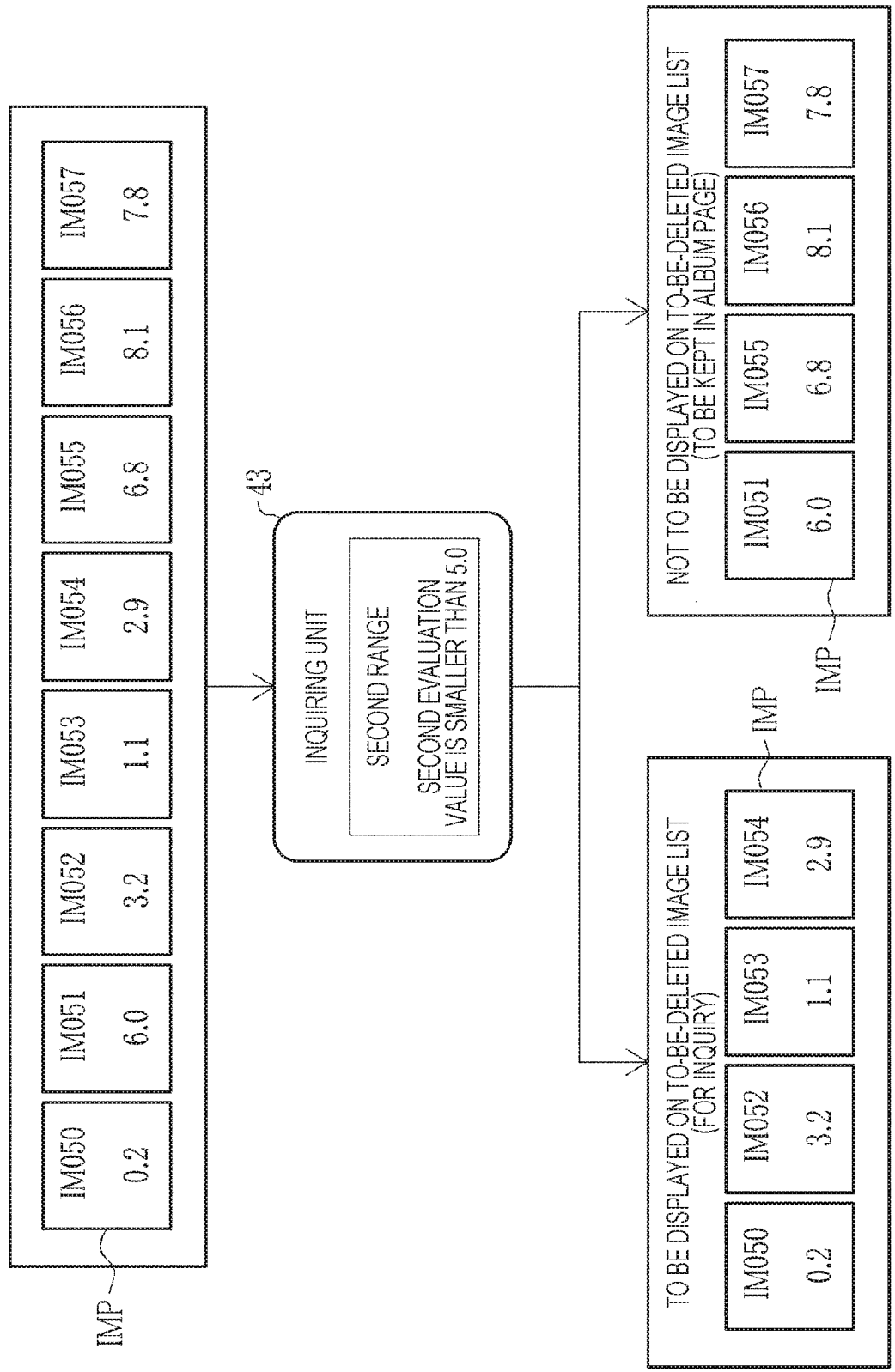
FIG. 34 is a diagram illustrating a state where the inquiring unit determines whether or not to display individual to-be-deleted images on a to-be-deleted image list on the basis of second evaluation values and a second range.

FIG. 34 illustrates an example in which a second evaluation value is used in the above-described second embodiment. In this case, the inquiring unit 43 determines to display the to-be-deleted image IMP whose second evaluation value is within a second range on the to-be-deleted image list 50 and determines not to display the to-be-deleted image IMP whose second evaluation value is out of the second range on the to-be-deleted image list 50. The to-be-deleted image IMP determined not to be displayed on the to-be-deleted image list 50 by the inquiring unit 43 is kept in the album page 14.

FIG. 34 illustrates a state where a second evaluation value of smaller than 5.0 is set as the second range and it is determined whether or not to display individual to-be-deleted images IMP whose image IDs are IM050 to IM057 on the to-be-deleted image list 50. The to-be-deleted images IMP whose image IDs are IM050, IM052, IM053, and IM054 and whose second evaluation values are smaller than 5.0 and are within the second range are determined to be displayed on the to-be-deleted image list 50. On the other hand, the to-be-deleted images IMP whose image IDs are IM051, IM055, IM056, and IM057 and whose second evaluation values are larger than or equal to 5.0 and are out of the second range are determined not to be displayed on the to-be-deleted image list 50. In this case, the to-be-deleted image list 50 is the same as that illustrated in FIG. 28.

In a case where the second evaluation value is used in the third embodiment, for example, on the to-be-deleted image list 50, the size of the image display cell CE of the to-be-deleted image IMP increases as the second evaluation value increases. Alternatively, on the to-be-deleted image list 65, the size of the image display cell CE of the to-be-deleted image IMP increases as the second evaluation value decreases.

In this way, the evaluation value that determines the display format of a to-be-deleted image IMP may be either the first evaluation value indicating whether or not to execute a deletion process or the second evaluation value indicating whether or not to be kept in the album page 14 without executing a deletion process.

To inquire whether or not to execute a deletion process on to-be-deleted images IMP, the user 11 may be caused to make a selection from among two choices, delete all or keep all.

The deriving unit 71 need not necessarily be established in the CPU 22 of the smartphone 10. The deriving unit 71 may be established in a CPU of a computer other than the smartphone 10. In this case, a first evaluation value or a second evaluation value derived by the deriving unit 71 of the other computer is taken into the smartphone 10 via the network 27 or the like.

Figure 35A:
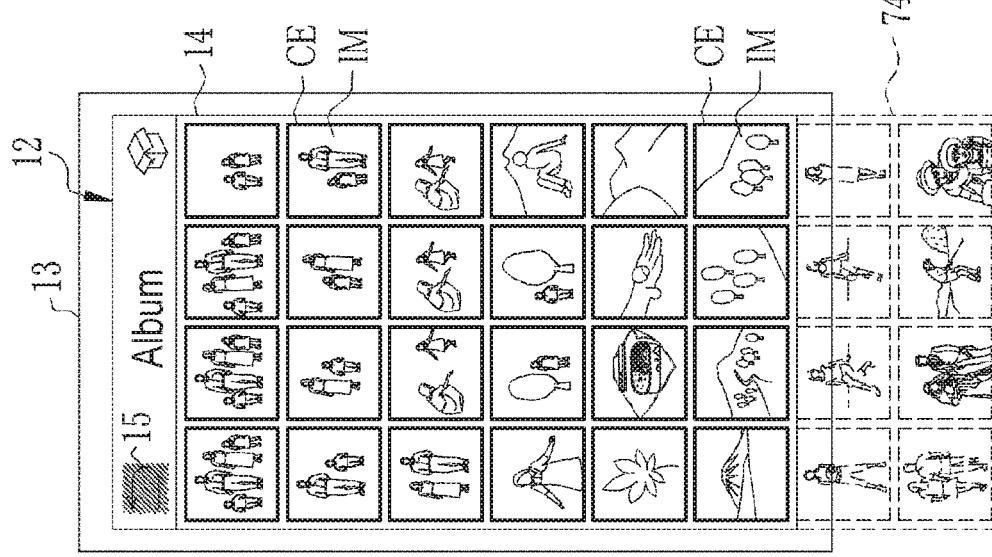
Figure 35B:
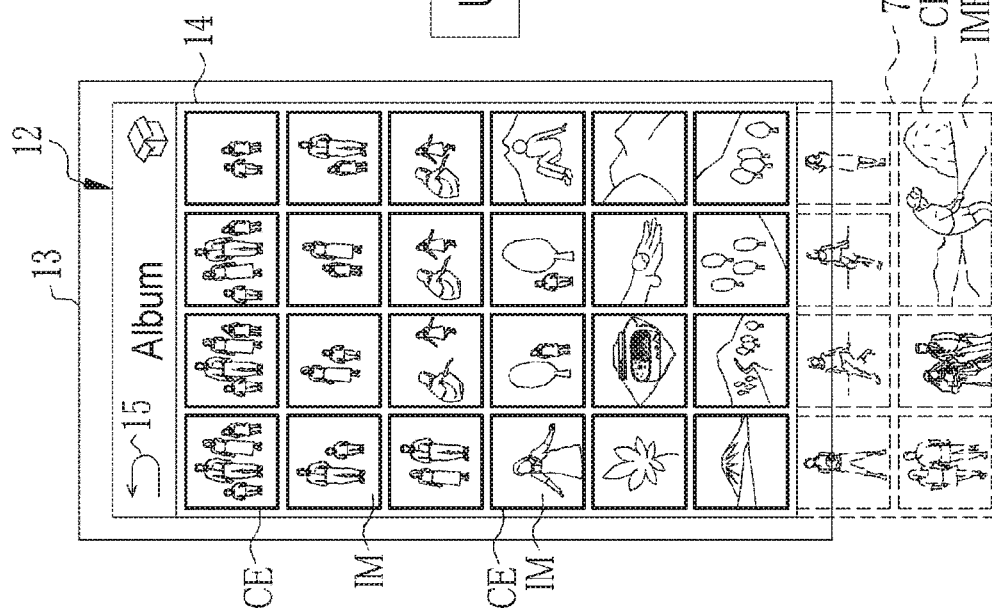

As illustrated in FIG. 35A, a case is considered where the image display cell CE of an enlarged image IME as a target of undoing of an enlargement process is present in a hidden portion 74. When the undo button 15 is selected in this state, the enlarged image IME is returned to the state before the enlargement process in the hidden portion 74, as illustrated in FIG. 35B. Because the enlarged image IME is returned to the state before the enlargement process in the hidden portion 74, the user 11 is unable to determine whether or not the enlarged image IME has actually been returned to the state before the enlargement process. Thus, the user 11 needs to scroll to display the hidden portion 74 by providing a scroll instruction to determine whether the enlarged image IME has been returned to the state before the enlargement process.

Figure 36A:
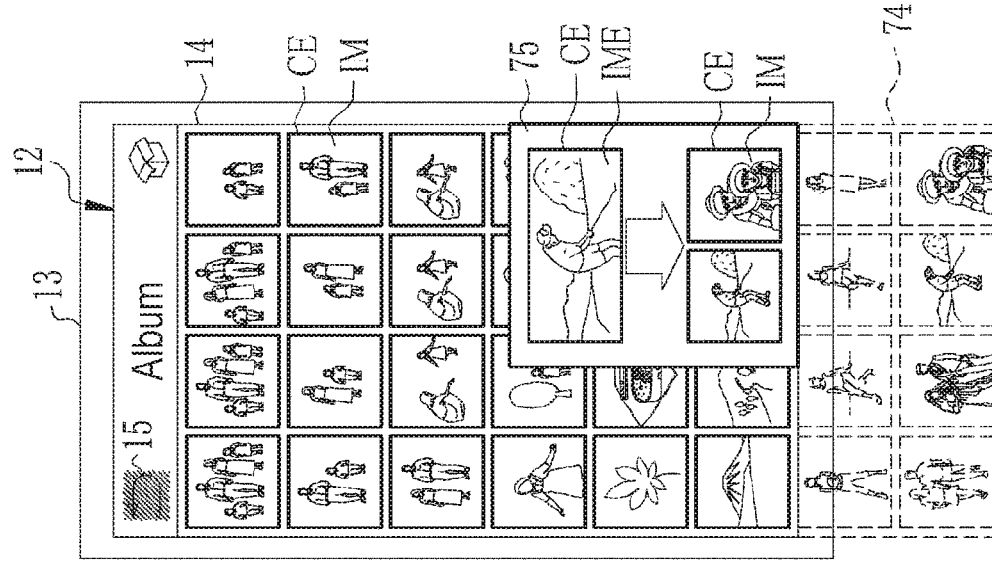
Figure 36B:
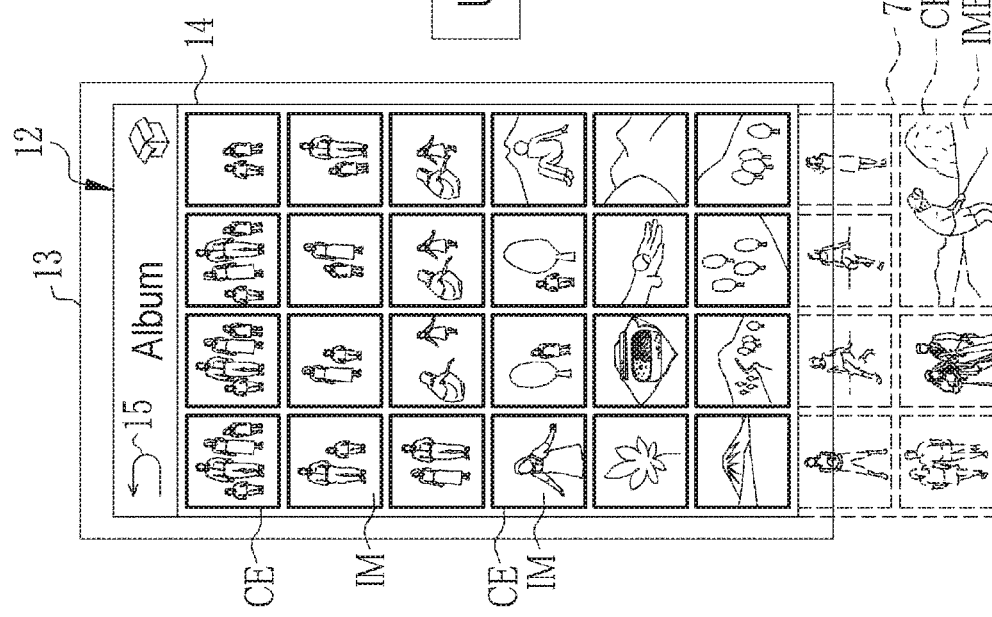

As illustrated in FIG. 36B, when the undo button 15 is selected in a state where the image display cell CE of the enlarged image IME as a target of undoing of an enlargement process is present in the hidden portion 74, the album editing unit 36 pop-up displays an undo display dialog 75 on the album screen 12. In the undo display dialog 75, the image display cell CE of the enlarged image IME as a target of undoing of an enlargement process and the image display cells CE of images IM in the state before the enlargement process are displayed with a down-pointing arrow therebetween. The undo display dialog 75 is displayed for a predetermined time period (for example, 3 seconds) and then automatically disappears.

According to the undo display dialog 75, it is obvious that the enlarged image IME has been returned to the state before the enlargement process. Thus, the user 11 does not need to scroll to display the hidden portion 74 by providing a scroll instruction to determine whether the enlarged image IME has been returned to the state before the enlargement process.

Figure 37:
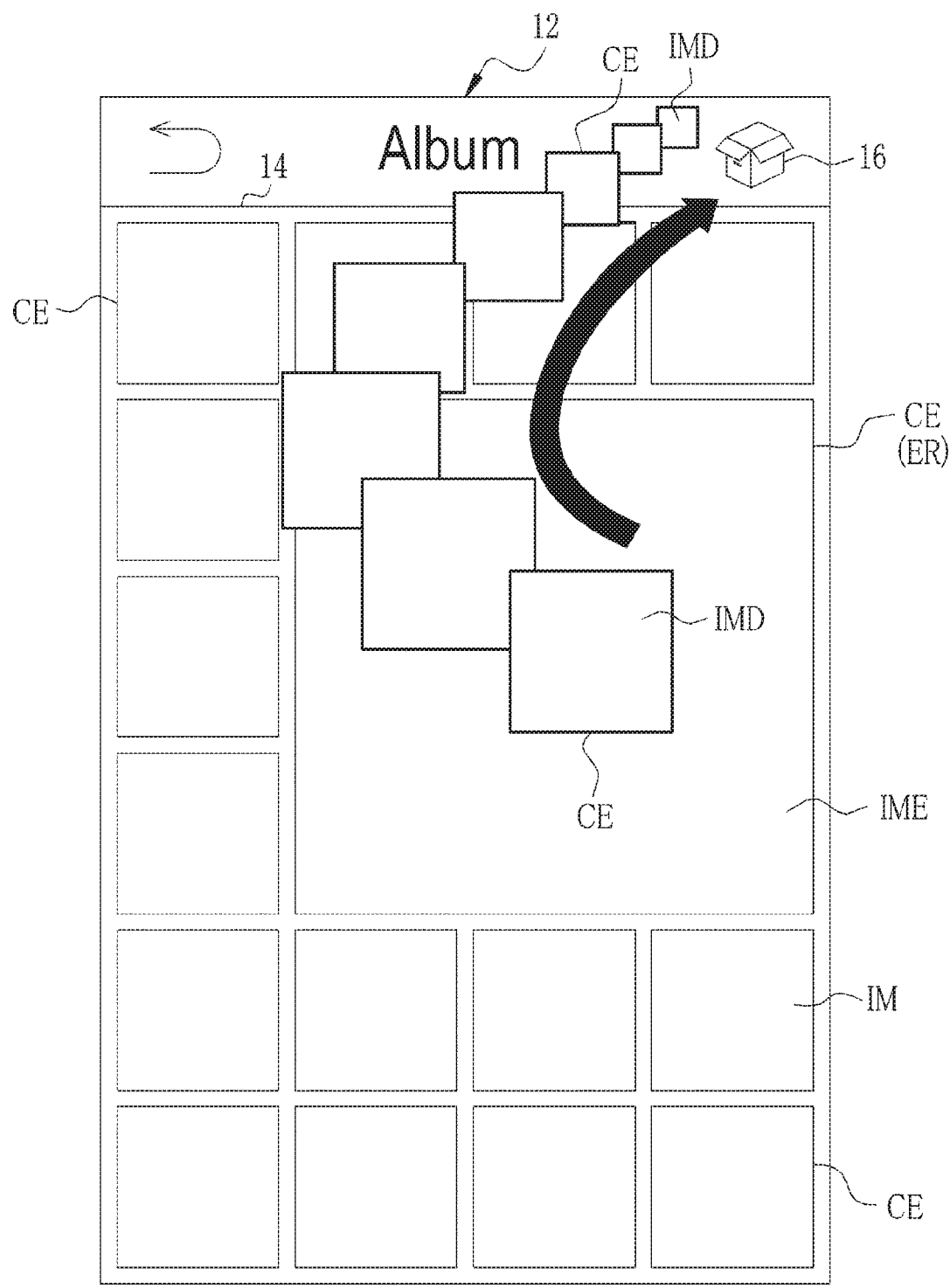
FIG. 37 is a diagram illustrating a state where animation is displayed depicting that the image display cell of a deleted image is thrown into a deleted image list display button.

As illustrated in FIG. 37, in the case of executing a deletion process to delete a deleted image IMD from the album page 14, animation may be displayed depicting that the image display cell CE of the deleted image IMD is thrown into the deleted image list display button 16 that is corrugated-box-shaped. Accordingly, it is obvious which image IM is to be deleted from the album page 14.

Instead of or in addition to a swipe instruction, a gesture instruction of touching the image display cell CE of an enlargement target image IMT with two fingers F (for example, a thumb and a forefinger) and extending the image display cell CE with the two fingers F (a pinch-out instruction) may be provided as an enlargement instruction.

Alternatively, as indicated by a trajectory TR in FIG. 38A, a gesture instruction of touching the image display cell CE of an enlargement target image IMT with one finger F and spirally moving the finger F within the image display cell CE may be provided as an enlargement instruction, in addition to a swipe instruction. When the enlargement target image IMT is to be enlarged in the row direction, the finger F is moved so as to elongate the spiral in the row direction. When the enlargement target image IMT is to be enlarged in the column direction, the finger F is moved so as to elongate the spiral in the column direction. When the enlargement target image IMT is to be enlarged in the row direction and the column direction, the finger F is moved so as to elongate the spiral in a slanting direction.

In this case, as illustrated in FIG. 38B, the images IM arranged after the enlargement target image IMT are not subjected to a deletion process, but the display positions of the image display cells CE are merely changed. That is, when the spiral gesture instruction is received, a to-be-deleted image IMP is not generated. Thus, it is not necessary to display the to-be-deleted image list in this case.

In this way, two types of enlargement instructions, the one for generating a to-be-deleted image IMP and the one for not generating a to-be-deleted image IMP, may be used. In a case where the user 11 does not intend to delete other images IM when enlarging an enlargement target image IMT, the user 11 may provide a spiral gesture instruction illustrated in FIG. 38A so as not to generate a to-be-deleted image IMP. Thus, it is possible to flexibly respond to various intentions of the user 11.

A swipe instruction with a forefinger and a swipe instruction with a thumb may be made distinguishable from each other on the basis of fingerprint recognition, a difference in the area touched with a finger, or the like. The swipe instruction with a forefinger may be defined as an instruction in which a to-be-deleted image IMP is generated, and the swipe instruction with a thumb may be defined as an instruction in which a to-be-deleted image IMP is not generated.

The unit cells UCE are not limited to square-shaped but may be rectangle-shaped. In addition, the image display cells CE may be arranged with no gaps 17 therebetween.

In each of the above-described embodiments, a selection instruction to select an enlargement target image IMT is a gesture instruction of touching the image display cell CE of the enlargement target image IMT with the finger F for a predetermined time period, but the present invention is not limited thereto. A selection instruction to select an enlargement target image IMT may be a gesture instruction of tapping once the image display cell CE of the enlargement target image IMT with the finger F (a single-tap instruction). In this case, a swipe instruction following the single-tap instruction is recognized as an enlargement instruction and is distinguished from a scroll instruction, which is a gesture instruction of flicking the inside of the album page 14 or the like in an up-down direction using the finger F.

In addition, the following method can be adopted as a selection instruction to select an enlargement target image IMT. That is, first, a dialog is displayed having an option of shifting to an enlargement process mode of enlarging a desired image IM. Subsequently, after a gesture instruction to select the option of shifting to the enlargement process mode has been provided, a gesture instruction of touching with the finger F for a predetermined time period or a swipe instruction not accompanied with a single-tap instruction is received as an enlargement instruction. In this case, the image IM in the image display cell CE touched with the finger F for the first time in the swipe instruction (the image display cell CE at the starting point of the swipe instruction) is recognized as an enlargement target image IMT.

Before shifting to the enlargement process mode (after the enlargement process mode is cancelled), a swipe instruction to the album page 14 is received as a scroll instruction, like a flick instruction. In this case, after shifting to the enlargement process mode, an enlargement instruction can be provided only by a swipe instruction without providing a gesture instruction of touching with the finger F for a predetermined time period or a single-tap instruction.

The following method may be used to distinguish an enlargement instruction and a scroll instruction from each other. That is, a scroll bar is provided at an edge portion of the album page 14 or the like. Only a gesture instruction to the scroll bar is received as a scroll instruction, and a gesture instruction to a portion in which image display cells CE are arranged outside the scroll bar is not received as a scroll instruction. In this way, a gesture instruction to the scroll bar is received as a scroll instruction, and a gesture instruction to a portion other than the scroll bar is received as an enlargement instruction or the like, and thus an enlargement instruction and a scroll instruction can be distinguished from each other. In this case, as in the case of providing the above-described enlargement process mode, a gesture instruction of touching with the finger F for a predetermined time period or a swipe instruction not accompanied with a single-tap instruction may be received as an enlargement instruction.

As illustrated in FIGS. 16A and 16B and so forth, in the case of providing a swipe instruction of linearly moving the finger F in the column direction as an enlargement instruction, the distinction from a flick instruction of flicking with the finger F in the column direction (a scroll instruction) is a particular issue. However, the enlargement instruction and the scroll instruction can be clearly distinguished from each other by using the above-described various methods.

The smartphone 10 is used as an example of the electronic album apparatus, but the present invention is not limited thereto. The electronic album apparatus may be another mobile information terminal having a touch panel, such as a tablet computer or a notebook personal computer.

A network server on the network 27 may have the functions of the electronic album apparatus. In this case, a mobile information terminal such as the smartphone 10 transmits a gesture instruction such as an enlargement instruction to the network server, and receives the screen data of the album screen 12 from the network server. The mobile information terminal reproduces the screen data of the album screen 12 and displays the screen data on a web browser, for example.

The mobile information terminal has limited resources, whereas the network server has relatively abundant resources. Thus, if the network server has the functions of the electronic album apparatus, a remarkable increase in processing speed can be expected. Thus, as long as the environment of the network 27 has sufficient capacity, it is more preferable to cause the network server to have the functions of the electronic album apparatus than to cause the mobile information terminal to have the functions of the electronic album apparatus.

Alternatively, the mobile information terminal and the network server may be caused to share the functions of the electronic album apparatus. For example, the mobile information terminal may be caused to have the functions of the instruction receiving unit 35, the enlargement processing unit 41, and the deletion processing unit 42, and the network server may be caused to have the functions of the screen generating unit 40 and the inquiring unit 43.

Also, the image storage unit 32 need not necessarily be disposed in the storage device of the electronic album apparatus, and may be disposed in an image storage server on the network 27. In this case, the album editing unit 36 accesses the image storage server via the network 27 and reads out an image IM from the image storage unit 32 in the image storage server.

In this way, the hardware configuration of the computer system can be appropriately changed in accordance with required performance, such as processing capacity, safety, reliability, or the like. Furthermore, not only the hardware configuration but also various applications such as the electronic album application 30 can of course be doubled or can be stored in a plurality of storage devices in a distributed manner for the purpose of ensuring safety or reliability.

In each of the above-described embodiments, the hardware structure of a processing unit that executes various processes, such as the instruction receiving unit 35, the album editing unit 36, the screen generating unit 40, the enlargement processing unit 41, the deletion processing unit 42, the inquiring unit 43, the deriving unit 71, and the obtaining unit 72 is, for example, the CPU 22 which is a general-purpose processor that executes software (the electronic album application 30) and functions as various processing units, as described above.

Instead of all or some of the functions implemented by the CPU 22, the following various processors may be used. The various processors include, for example, a programmable logic device (PLD), which is a processor whose circuit configuration is changeable after manufacturing, such as a field programmable gate array (FPGA); a dedicated electric circuit, which is a processor having a circuit configuration designed specifically for executing specific processing, such as an application specific integrated circuit (ASIC); and the like. The hardware structure of these various processors is, more specifically, electric circuitry including a combination of circuit elements, such as semiconductor elements.

From the description given above, the invention described in the following appendix can be grasped.

Appendix 1

An electronic album apparatus including:
a screen generating processor that generates an album screen to be displayed on a touch panel display, the album screen including an album page in which a plurality of images are arranged;
an instruction receiving processor that receives a gesture instruction to the touch panel display, the instruction receiving processor receiving, as the gesture instruction, an enlargement instruction to display an image among the plurality of images in an enlarged view within the album page;
an album editing processor that executes an album editing process including an enlargement process of enlarging an enlargement target image which is the image for which the enlargement instruction has been provided, and a deletion process of deleting one or more images among the plurality of images from the album page, the one or more images being different from the enlargement target image and overlapping an enlargement region which is a region of the enlargement target image that has been enlarged; and
an inquiring processor that inquires, before execution of the deletion process, whether or not to execute the deletion process on the one or more images which overlap the enlargement region and which are to be deleted from the album page, the one or more images being one or more to-be-deleted images.

The above-described various embodiments and various modification examples can be combined as appropriate. The present invention includes, in addition to a program, a storage medium storing the program.

REFERENCE SIGNS LIST

10 smartphone
11 user
12 album screen
13 touch panel display (touch panel)
14 album page
15 undo button
16 deleted image list display button
17 gap
20 storage device
21 memory
22 CPU
23 communication unit
24 data bus
25 display
26 touch pad
27 network
30 electronic album application (electronic album application program)
31 album management information
32 image storage unit
35 instruction receiving unit
36, 70 album editing unit
40 screen generating unit
41 enlargement processing unit (recognizing unit)
42 deletion processing unit
43 inquiring unit
45 trimming position adjustment screen
46 cancel button
47 check button
50, 65 to-be-deleted image list
51 check box
52 keep button
53 delete all button
60 deleted image list
66 delete button
67 keep all button
71 deriving unit
72 obtaining unit 73 to-be-deleted image information
74 hidden portion
75 undo display dialog
IM image
IMT enlargement target image
IMP to-be-deleted image
IME enlarged image
IMD deleted image
CE image display cell
UCE unit cell
F finger
TR trajectory
ER enlargement region
AR electronic album region
ST1 to ST4, ST10 to ST40, ST100 to ST180 step

What is claimed is:

1. An electronic album apparatus comprising:
 a processor configured to function as:
  a screen generating unit that generates an album screen to be displayed on a touch panel display, the album screen including an album page in which a plurality of images are arranged;
  an instruction receiving unit that receives a gesture instruction to the touch panel display, the instruction receiving unit receiving, as the gesture instruction, an enlargement instruction to display an image among the plurality of images in an enlarged view within the album page;
  a recognizing unit that recognizes an enlargement target image which is the image for which the enlargement instruction has been provided;
  an album editing unit that executes an album editing process including an enlargement process of enlarging the enlargement target image recognized by the recognizing unit and a deletion process of deleting one or more images among the plurality of images from the album page, the one or more images being different from the enlargement target image and overlapping an enlargement region which is a region of the enlargement target image that has been enlarged; and
 an inquiring unit that inquires, before execution of the deletion process, whether or not to execute the deletion process on the one or more images which overlap the enlargement region and which are to be deleted from the album page, the one or more images being one or more to-be-deleted images.

2. The electronic album apparatus according to claim 1, wherein the inquiring unit displays a list of the one or more to-be-deleted images on the album screen and receives, through the list, a first selection instruction to select, from among the one or more to-be-deleted images, an image to be kept in the album page without executing the deletion process, or a second selection instruction to select, from among the one or more to-be-deleted images, an image to be deleted from the album page by executing the deletion process.

3. The electronic album apparatus according to claim 2, further comprising:
 an obtaining unit that obtains, for each to-be-deleted image, a first evaluation value indicating whether to execute the deletion process on the to-be-deleted image or a second evaluation value indicating whether to keep the to-be-deleted image in the album page without executing the deletion process, wherein
 the inquiring unit displays, on the list, the to-be-deleted image in a display format corresponding to the first evaluation value or the second evaluation value.

4. The electronic album apparatus according to claim 3, wherein the inquiring unit displays, on the list, only the to-be-deleted image whose first evaluation value is within a preset first range or only the to-be-deleted image whose second evaluation value is within a preset second range.

5. The electronic album apparatus according to claim 4, wherein the inquiring unit displays, on the list, the to-be-deleted image in a display format in which a magnitude of the first evaluation value or the second evaluation value is identifiable.

6. The electronic album apparatus according to claim 3, wherein the inquiring unit displays, on the list, all the one or more to-be-deleted images in a display format in which magnitudes of the first evaluation values or the second evaluation values are identifiable.

7. The electronic album apparatus according to claim 3, wherein the first evaluation value or the second evaluation value is derived on the basis of at least any one of an image quality of the to-be-deleted image, a photographic subject of the to-be-deleted image, a shooting date and time of the to-be-deleted image, or a shooting location of the to-be-deleted image.

8. The electronic album apparatus according to claim 1, wherein the screen generating unit generates the album page in which image display cells are arranged in a grid pattern on the basis of a unit cell whose size is defined in advance, the image display cells displaying the plurality of images, each image display cell having a size that is changed to a positive integral multiple of the unit cell.

9. The electronic album apparatus according to claim 8, wherein the enlargement region is a region having a size that is a positive integral multiple of the unit cell.

10. The electronic album apparatus according to claim 1, wherein the instruction receiving unit receives, as the enlargement instruction, a swipe instruction of moving one finger along the enlargement region within the album page starting from the enlargement target image.

11. An operation method for an electronic album apparatus, comprising:
 a screen generation step of generating an album screen to be displayed on a touch panel display, the album screen including an album page in which a plurality of images are arranged;
 an instruction reception step of receiving a gesture instruction to the touch panel display, the instruction reception step receiving, as the gesture instruction, an enlargement instruction to display an image among the plurality of images in an enlarged view within the album page;
 a recognition step of recognizing an enlargement target image which is the image for which the enlargement instruction has been provided;
 an album editing step of executing an album editing process including an enlargement process of enlarging the enlargement target image recognized in the recognition step and a deletion process of deleting one or more images among the plurality of images from the album page, the one or more images being different from the enlargement target image and overlapping an enlargement region which is a region of the enlargement target image that has been enlarged; and
 an inquiry step of inquiring, before execution of the deletion process, whether or not to execute the deletion process on the one or more images which overlap the enlargement region and which are to be deleted from the album page, the one or more images being one or more to-be-deleted images.

12. A non-transitory computer readable medium for storing a computer-executable program causing a computer to function as an electronic album apparatus, the computer-executable program causing a computer to execute:

a screen generation function of generating an album screen to be displayed on a touch panel display, the album screen including an album page in which a plurality of images are arranged;

an instruction reception function of receiving a gesture instruction to the touch panel display, the instruction reception function receiving, as the gesture instruction, an enlargement instruction to display an image among the plurality of images in an enlarged view within the album page;

a recognition function of recognizing an enlargement target image which is the image for which the enlargement instruction has been provided;

an album editing function of executing an album editing process including an enlargement process of enlarging the enlargement target image recognized by the recognition function and a deletion process of deleting one or more images among the plurality of images from the album page, the one or more images being different from the enlargement target image and overlapping an enlargement region which is a region of the enlargement target image that has been enlarged; and an inquiry function of inquiring, before execution of the deletion process, whether or not to execute the deletion process on the one or more images which overlap the enlargement region and which are to be deleted from the album page, the one or more images being one or more to-be-deleted images.

* * * * *